US012482928B2

(12) United States Patent
Choudhury et al.

(10) Patent No.: US 12,482,928 B2
(45) Date of Patent: Nov. 25, 2025

(54) EMBEDDED ANTENNAS STRUCTURES FOR WIRELESS COMMUNICATIONS AND RADAR

(71) Applicant: Intel Corporation, Santa Clara, CA (US)

(72) Inventors: Debabani Choudhury, Thousand Oaks, CA (US); Jose Rodrigo Camacho Perez, Guadalajara (MX); Shuhei Yamada, Hillsboro, OR (US); Vida Ilderem Burger, Phoenix, AZ (US); Bryce D. Horine, Portland, OR (US); Harry Skinner, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 283 days.

(21) Appl. No.: 17/762,749

(22) PCT Filed: Dec. 27, 2019

(86) PCT No.: PCT/US2019/068676
§ 371 (c)(1),
(2) Date: Mar. 23, 2022

(87) PCT Pub. No.: WO2021/133408
PCT Pub. Date: Jul. 1, 2021

(65) Prior Publication Data

US 2022/0352622 A1 Nov. 3, 2022

(51) Int. Cl.

| | |
|---|---|
| ***H01Q 1/32*** | (2006.01) |
| ***B60Q 1/00*** | (2006.01) |
| ***H01Q 3/34*** | (2006.01) |

(52) U.S. Cl.
CPC ......... *H01Q 1/3208* (2013.01); *B60Q 1/0017* (2013.01); *H01Q 3/34* (2013.01)

(58) Field of Classification Search
CPC ........ H01Q 1/3208; H01Q 3/34; H01Q 1/525; H01Q 3/242; H01Q 3/2647; H01Q 3/44;
(Continued)

(56) References Cited

U.S. PATENT DOCUMENTS

| | | | | |
|---|---|---|---|---|
| 3,755,815 A * | 8/1973 | Stangel | .................... | H01Q 3/34 343/754 |
| 6,788,273 B1 * | 9/2004 | Schultz | .................. | B82Y 20/00 343/872 |

(Continued)

FOREIGN PATENT DOCUMENTS

| | | |
|---|---|---|
| JP | S53015046 A | 2/1978 |
| JP | H06069708 A | 3/1994 |

(Continued)

OTHER PUBLICATIONS

JP Search Report by Registered Search Organisation for corresponding JP patent application No. 2022520566, dated Dec. 14, 2023, 40 pages (for informational purposes only).

(Continued)

*Primary Examiner* — Hoang V Nguyen
(74) *Attorney, Agent, or Firm* — Viering, Jentschura & Partner mbB

(57) ABSTRACT

Various antennas elements including antennas arrays can support various communication technologies and can be integrated into different components or subcomponents of a vehicle, including various vehicle light assemblies. The vehicular antennas elements include low profile and/or concealed antenna elements that are inconspicuous aesthetically and do not affect or substantially affect vehicle aerodynamics.

20 Claims, 45 Drawing Sheets

(58) Field of Classification Search
CPC .. H01Q 13/085; H01Q 15/0086; H01Q 19/06; H01Q 21/205; H01Q 1/3275; H01Q 3/46; H01Q 21/28; H01Q 1/32; H01Q 21/24; B60Q 1/0017; H04W 4/40
See application file for complete search history.

(56) References Cited

U.S. PATENT DOCUMENTS

| | | | | |
|---|---|---|---|---|
| 7,015,865 | B2 * | 3/2006 | Isaacs | G02B 1/007 343/757 |
| 8,350,777 | B2 * | 1/2013 | Morton | H01Q 1/42 343/872 |
| 8,654,028 | B2 * | 2/2014 | Kanno | H01Q 15/0013 343/872 |
| 10,270,508 | B2 | 4/2019 | Polehn et al. | |
| 11,276,915 | B2 | 3/2022 | Camacho Perez et al. | |
| 2002/0036587 | A1 * | 3/2002 | Martin | H01Q 15/06 343/909 |
| 2008/0165079 | A1 * | 7/2008 | Smith | B82Y 20/00 343/911 R |
| 2008/0272955 | A1 * | 11/2008 | Yonak | H01Q 15/0086 342/54 |
| 2008/0296710 | A1 * | 12/2008 | Tonucci | G02F 1/015 257/421 |
| 2009/0135086 | A1 * | 5/2009 | Fuller | G01S 13/885 343/909 |
| 2009/0315802 | A1 * | 12/2009 | Johansen | H01P 1/047 343/893 |
| 2010/0079354 | A1 * | 4/2010 | Lam | H01Q 19/06 343/909 |
| 2010/0277398 | A1 * | 11/2010 | Lam | H01Q 15/0086 343/909 |
| 2011/0199273 | A1 * | 8/2011 | Kim | H01Q 21/08 343/753 |
| 2012/0274525 | A1 * | 11/2012 | Lam | H01Q 19/06 343/754 |
| 2012/0327516 | A1 | 12/2012 | Abbaspour-Tamijani | |
| 2013/0154803 | A1 * | 6/2013 | Koch | H01Q 1/2216 340/10.1 |
| 2017/0012359 | A1 | 1/2017 | Jung et al. | |
| 2017/0047649 | A1 | 2/2017 | Himmelstoss | |
| 2018/0006360 | A1 | 1/2018 | Camacho Perez et al. | |
| 2019/0089419 | A1 | 3/2019 | Kim et al. | |
| 2019/0089433 | A1 * | 3/2019 | Polehn | H04B 7/0617 |
| 2019/0305422 | A1 * | 10/2019 | Choudhury | H01Q 3/44 |
| 2021/0167512 | A1 * | 6/2021 | Lee | H04B 7/0408 |

FOREIGN PATENT DOCUMENTS

| | | | | |
|---|---|---|---|---|
| JP | H11231037 | A | 8/1999 | |
| JP | 2009266733 | A | 11/2009 | |
| JP | 2011514121 | A | 4/2011 | |
| JP | 2017517993 | A | 6/2017 | |
| JP | 2019047341 | A | 3/2019 | |
| WO | WO-2006023195 | A2 * | 3/2006 | B82Y 20/00 |
| WO | WO-2019135736 | A1 * | 7/2019 | H01Q 21/065 |

OTHER PUBLICATIONS

JP Office Action for corresponding JP patent application No. 2022520566, dated Jan. 19, 2024, 11 pages (for informational purposes only).

Hamid, S. et al. "Accuracy Estimations of a Negative Refractive Index Cylindrical Lens Antenna Designing", Proceedings of the 2016 IEEE-APS Topical Conference on Antennas and Propagation in Wireless Communication, IEEE, 2016, 5 pages.

International Search Report issued for the corresponding International Application No. PCT/US2019/068676, dated Nov. 30, 2020, 3 pages (for informational purposes only).

Ryan Y. Miyamoto et al., "Digital Wireless Sensor Server Using and Adaptive Smart-Antenna/Retrodirective Array", IEEE Transactions on Vehicular Technology, dated Sep. 2003, 8 pages, vol. 52, No. 5.

J.B. Pendry, "Negative Refraction Makes a Perfect Lens", Physical Review Letters, dated Oct. 30, 2000, 4 pages, vol. 85, No. 18.

E. D. Sharp, "Van Atta reflector array", IRE Transactions on Antenna and Propagation, Jul. 1960, 3 pages.

Victor Veselago et al., "Negative Refractive Index Materials", Journal of Computational and Theopretical Nanoscience, dated 2006, pp. 1-30, vol. 3.

E. Sulic, "Embedded Antenna Technology in Smart Polymeric Composite Structures", RMIT University, dated Oct. 2012, 307 pages.

Hella Kgaa Hueck & Co.,"Legal regulations for cars and trailers based on ECE regulation 48", 48 pages.

Kalaagi, Mohammed et al.: "Design of Dual Polarized Retrodirective Metasurfaces", 2018 IEEE Radio and Antenna Days of the Indian Ocean (Radio), Radio Society, Oct. 15, 2018, 2 pages.

Extended European search report, issued for the corresponding European patent application No. 19957093.8, dated Sep. 8, 2023, 9 pages (for informational purposes only).

* cited by examiner

700

2100

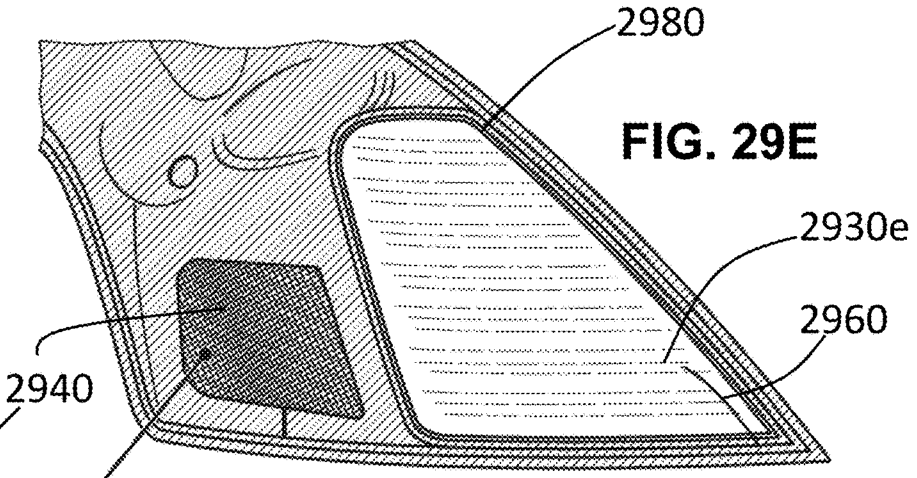
FIG. 29E
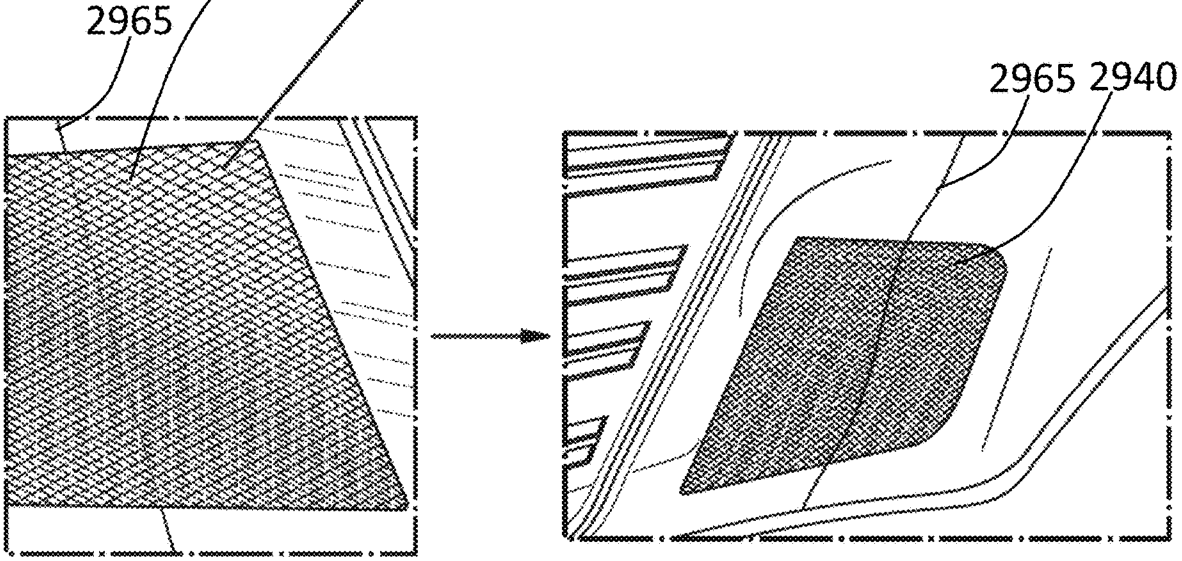
FIG. 29F
FIG. 29G

Vehicle Chassis integrated Universal Control Bus

- Co-existence of sub-10GHz (MHz to 10GHz), 10-30GHz, mmW and subTHz systems all around the vehicles.
- Co-existence of communication and radar systems
- Coexistence of omni-antennas, arrays, and directional antenna systems

EMBEDDED ANTENNAS STRUCTURES FOR WIRELESS COMMUNICATIONS AND RADAR

RELATED APPLICATIONS

The present application is a national stage entry according to USC § 371 of PCT Application No. PCT/US2019/068676, filed on Dec. 27, 2019, which is incorporated by reference herein in its entirety.

TECHNICAL FIELD

Various embodiments relate generally to wireless communications and wireless technologies.

BACKGROUND

Vehicle embedded radar and communication systems are required to have precise antenna beam control to enable beam searching and tracking processes for optimal performance. In general, a narrower antenna beamwidth reduces spatial ambiguity, results in better resolution and accurate sensing capability in radar sensing applications. Also in wireless communication technology, the higher directivity helps to achieve improved link budget and the narrow beamwidth helps to make the communication secure. However it becomes more challenging to implement the beam search and tracking processes with intensely narrowed antenna beamwidth. In current wireless systems, sector level sweep (SLS) with beam broadening/refinement technique is used to overcome such a problem. However this process often involves complex signal processing and requires scanning time to identify optimal scan angle. Also the system needs to have fine resolution phase shifter to support such precise beam controlling.

Further, academic and industrial researchers including wireless OEMs and service providers are proposing to enable V2X scenarios that needs vehicular embedded antenna system architecture definition. Driving factors for connected vehicles need to address requirements from automotive companies, including the aerodynamics; aesthetics;, coverage with no blind-spots; reliable performance in a challenging and dynamic environment; and so on. Enablement of low-cost, high-volume manufacturing (HVM) of mmW antenna system modules, meeting many stringent requirements from auto-companies is a MUST for the success of antenna system embodiment in connected vehicles of future.

In addition, the advent of 5G to the auto industry implies the increasing demand for communication systems and antennas on the vehicle. This implies the need to integrate an increasing number of antennas to provide 360 deg coverage for most bands (e.g. 0.9-7 GHz, 28 GHz, 39 GHz, etc.) without impacting the aesthetics or aerodynamics of the vehicles in the future. This challenge gets further complicated considering the need to integrate these wireless radio systems within a wide variety of vehicles sharing the roads: from cars, to trucks and others models like convertibles, three-wheelers/auto-rickshaws, motorcycles and even bicycles.

Cars, SUVs, and other vehicles, especially autonomous vehicles, need to be always connected with a reliable and fast wireless connectivity with ultra-high bandwidth. A vehicular communication system, such as V2X, relies on wireless connectivity to provide secure, interference-free, and ubiquitous connectivity to ensure reliable communication between vehicles and infrastructure to enhance traffic safety.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 29A-I show exemplary aspects of a light assembly according to at least one exemplary embodiment of the present disclosure.

It should be noted that like reference numbers may be used to depict the same or similar elements, features, and structures throughout some of the drawings.

DESCRIPTION

Figure 1:
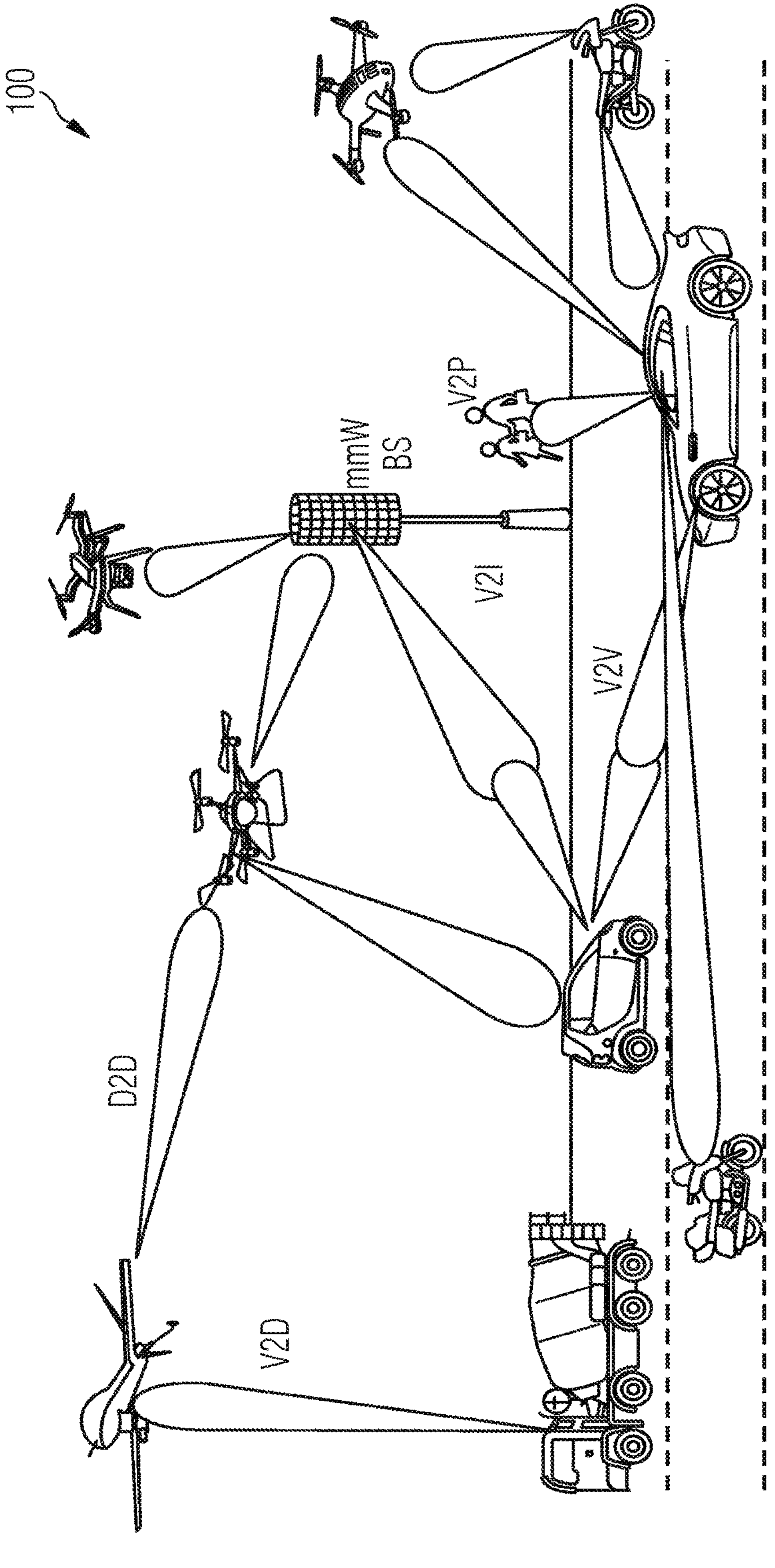
FIG. 1 shows an exemplary vehicular to everything (V2X) connectivity network scenario according to at least on exemplary embodiment of the present disclosure.

The following detailed description refers to the accompanying exemplary drawings that show, by way of illustration, specific details and embodiments in which the invention may be practiced.

The word "exemplary" is used herein to mean "serving as an example, instance, or illustration." Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]" "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipment (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, e.g. Wi-Fi, the examples provided herein may be similarly applied to various other radio communication technologies, both existing and not yet formulated, particularly in cases where such radio communication technologies share similar features as disclosed regarding the following examples. Various exemplary radio communication technologies that the aspects described herein may utilize include, but are not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication arrangement/Extended Total Access Communication arrangement (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication arrangements such as Intelligent-Transport-Systems, and other existing, developing, or future radio communication technologies. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA, "Licensed Shared Access," in higher frequencies, e.g. above 6 GHz, and SAS, "Spectrum Access System," in higher frequencies, and may be used in various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz71 GHz band, any band between 65.88 GHz and 71 GHz, bands currently allocated to automotive radar applications such as 76-81 GHz, and future bands including 94-300 GHz and above. Besides cellular applications, specific applications for vertical markets may be addressed such as PMSE (Program Making and Special Events), medical, health, surgery, automotive, low-latency, drones, etc. applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. Aspects described herein can also use radio communication technologies with different Single Carrier or OFDM flavors (CP-OFDM, SC-FDMA, SC-OFDM, filter bank-based multicarrier (FBMC), OFDMA, etc.) and in particular 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network" and "wireless network" as utilized herein encompasses both an access section of a network (e.g., a radio access network (RAN) section) and a core section of a network (e.g., a core network section).

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

FIG. 1 shows an exemplary connectivity network scenario 100 for Vehicle-to-Everything (V2X) according to some aspects and illustrates the complex requirements and elements needed to implement efficient multi-dimensional vehicular communications. Network scenario 100 illustrates several exemplary different communication interactions, including Vehicle-to-Drone (V2D), Drone-to-Drone (D2D), Vehicle-to-Infrastructure (V2I), Vehicle-to-Vehicle (V2V), and Vehicle-to-Pedestrian (V2P).

As shown network scenario 100, embedded radar and communications systems are required to have precise antenna beam control to enable beam searching and tracking processes for optimal performance. In general, a narrower beam reduces spatial ambiguity, thereby resulting in better resolution and accurate sensing capability in radar sensing applications. Furthermore, for wireless communications, the higher directivity provides for improved link budget and the narrower beam widths help to ensure more secure communications. However, the more narrow the beams, the more challenging it is to implement the beam search and tracking processes.

Current wireless systems implement a sector level sweep (SLS) with beam broadening and refinement techniques to overcome this problem. However, this process often involves complex signal processing and requires a scanning time to identify optimal scan angles. Also, these techniques require a fine resolution phase shifter to support the precise beam controlling which they are intended to achieve.

In order to provide the highly directional and narrow beams needed for V2X communications, a retro-directive array (RDA) system may be used to automatically steer the beam towards the direction of an incoming received signal. The RDA system works by receiving a signal, at a reception antenna, phase conjugating it, and mixing it with a baseband signal and transmitting the signal back in the same direction it came from.

Figure 2:
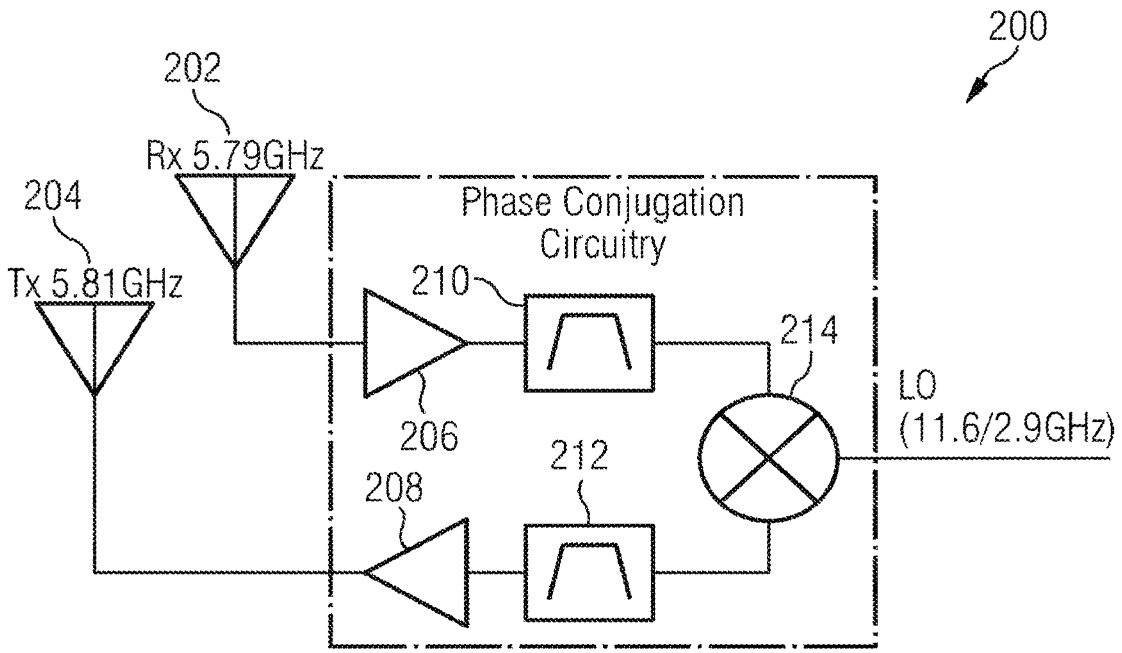
FIG. 2 shows an exemplary Retro-Directive Array (RDA) system according to at least one exemplary embodiment of the present disclosure.

FIG. 2 shows an exemplary RDA system 200 according to some aspects. It is appreciated that RDA system 200 may be simplified for purposes of this explanation.

RDA system 200 may include an antenna array including multiple antenna elements 202-204 in addition to radio frequency (RF) transceiver signal processing components 206-214. In RDA system 200, an antenna array with two antennas, one reception (Rx) antenna 202 and one transmission antenna 204, is shown, but it is appreciated that other antenna configurations, including those with a shared antenna (for both transmission and reception), may also be included. RDA system 200 may include one or more amplifiers 206-208, e.g. an input amplifier 206 (such as a low noise amplifier LNA) and an output amplifier 208 (such as a power amplifier PA). RDA system 200 may include phase conjugation circuitry including one or more band-pass filters 210-212 for the reception (Rx) directions and the transmission (Tx) direction, respectively, and also include a mixer 214 for mixing outgoing baseband signals from a local oscillator (LO) with information obtained from the signals received by the RDA system 200.

The RDA system may determine which direction to transmit an outgoing signal (i.e. output signal) based on information obtained from a received signal (i.e. input signal). For example, another communication device may transmit a first signal, e.g. a pilot signal, to a wireless communication device with RDA system 200. The RDA system 200 receives the first signal at its antenna array, e.g. at Rx antenna 202. The received signal (fRF) in each path contains phase information depending on the angle of arrival (AoA) at RDA system 200 and this information is mixed with a baseband signal provided via a local oscillator (LO) by the mixer 214. The down converted signal (fLO-fRF) results in having a conjugated phase with the received signal. In other words, if the phase of the received first signal (e.g., received pilot signal) is +30 degrees, the output signal of the phase conjugation circuitry of RDA system 200 is −30 degrees. By implementing this technique, it is possible to steer a beam without phase shifters.

However, in order to achieve the conjugated phase signal with down-conversion, RDA system 200 requires either double the frequency of the received signal fRF (11.6 GHz) or harmonic mixers with half the fRF frequency for the LO signal (2.9 GHz). In general, a higher LO frequency is unfavorable since it suffers higher propagation losses and introduces higher phase and/or amplitude noises and imbalances in the signal distribution network. And, on the other hand, the performance of harmonic mixers depend on the driving signal level, and to avoid any losses at the mixer, it requires relatively high input LO signal power. Thus, in general, solutions with harmonic mixers require higher levels of power amplification, thereby increasing overall system power consumptions, and also increase the amplitudes and/or phase noises and imbalances in LO signal distribution.

According to some aspects, devices and methods are disclosed which realize phase conjugation of incoming signals by using a negative refractive-index engineered material (NIM) (also known as negative-index metamaterials) applied on one or more antenna elements of an antenna array. An NIM is a material with properties including negative values for both permittivity, ε, and magnetic permeability, μ. NIM materials are constructed of periodic base parts called unit cells, which are typically significantly smaller than the wavelength of the radiation or signals which they are being used for. In general, the unit cells are stacked or planar and configured in a particular repeated pattern to make up the NIM. The specifications for the response of each unit cell are predetermined prior to construction and are based on the intended response of the NIM. For example, according to aspects of this disclosure, the NIM may be selected and/or constructed so that the permittivity ε and permeability μ are equal to (or at least substantially equal to) −1.

Each of the cells may be composed of wires and/or split ring resonators. These wires and/or split ring resonators may be composed of metals, e.g. copper, disposed in a strict geometric order. The size of these elements and distances between the elements are smaller than the frequency wavelengths in which the RDA antenna system may operate.

In some aspects, the NIM may be composed of photonic crystals. Photonic crystals are metamaterials composed or dielectric or metallic components (which may be referred to as “atoms”) arranged in a two-dimensional or three-dimensional lattice. For example, the NIM may be composed of a dielectric material, e.g. a Silicon-based slab patterned with cylindrical holes at the nanoscale level arranged on a square lattice.

In some aspects, the NIM may be composed of composite metamaterials. Composite metamaterials are composed of artificially designed arrays of LC oscillators mounted on electronic circuit plates. Different combinations of conductive elements may be arranged on a substrate to produce the composite metamaterials, or configurations with transmission lines may be used. For example, split-ring resonators (SRRs) combined with straight wires may be fabricated using printed copper circuits, wherein the SRRs may include dimensions (e.g. diameter) in the millimeter range or in the nanometer range. Splits in the rings provide resonance at a wavelength larger than the ring diameter and a smaller ring inside of a larger ring provides a larger capacitance. It is appreciated that other shapes may be used, e.g. square style SRRs. An exemplary SRR is shown in 310 of FIG. 3.

In some aspects, the NIM may include composite metamaterials with nanostructured arrays which may include, for example, arrays of nanosized metallic elements (e.g., noble metal columns) arranged on a dielectric layer above a metallic layer (e.g. a noble metal layer) above a substrate. The unit cell size may be in the range of 300-900 nanometers. An example of this is shown in 320 of FIG. 3, wherein the distances between the pillars may be in the range of 300-900 nm.

Figure 3:
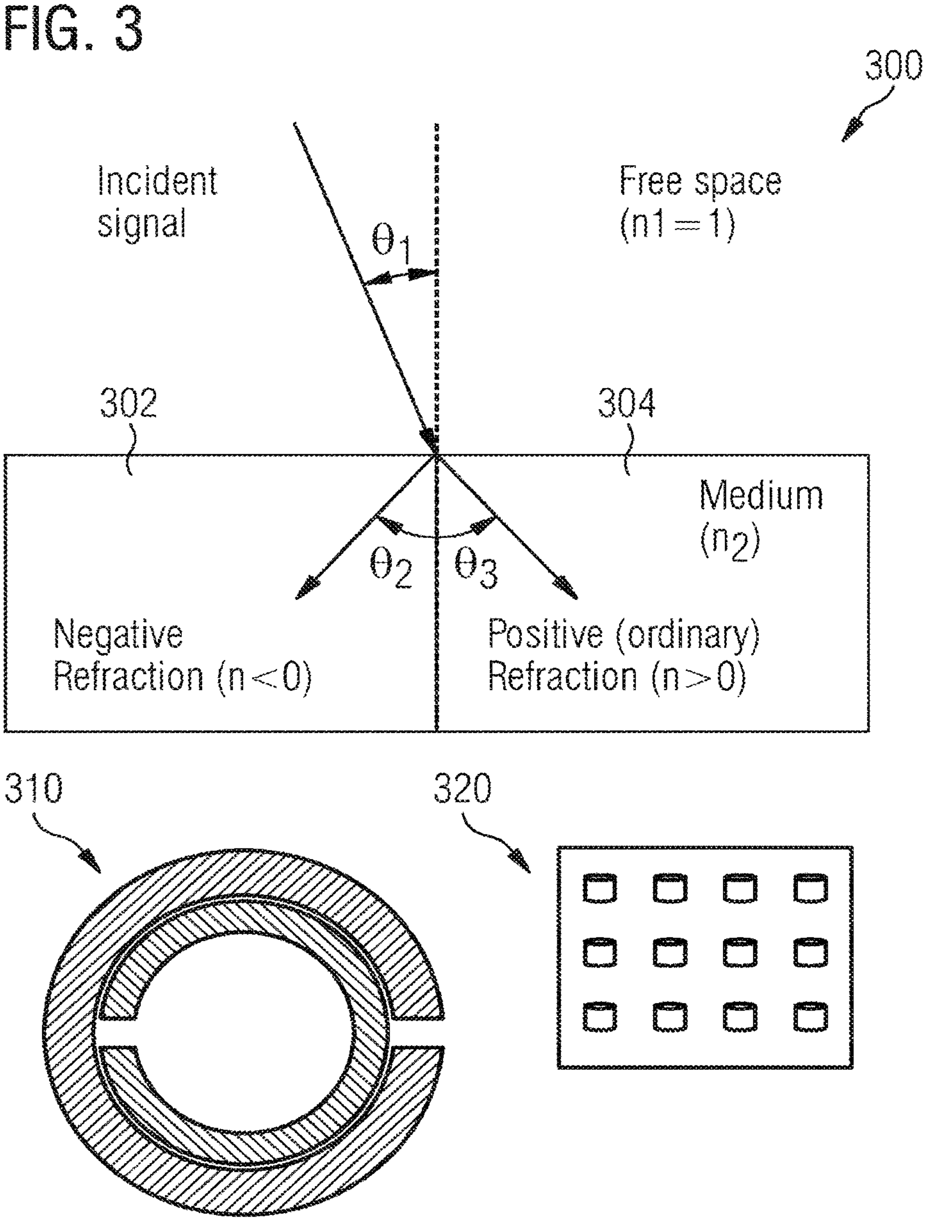
FIG. 3 shows an exemplary illustration of negative refraction.

FIG. 3 shows an exemplary illustration 300 of negative refraction according to some aspects. It is appreciated that illustration 300 may be simplified for purposes of this explanation.

According to some aspects, signals hitting and traveling through NIM result in an inverted angle of arrival (AoA). By carefully designing and applying the material property of the NIM, this inverted AoA can be used to achieve a phase conjugated signal so that it can be used in a RDA system without the need for further circuitry or the aforementioned frequency requirements (e.g., a LO with double the received signal frequency). The AoA of an incident signal may be defined as θ1 as shown in FIG. 3, while an NIM 302 may provide a negative refraction of the incident signal with an angle defined by θ2. The right side of FIG. 3 shows an ordinary medium with a positive refractive index (n>0) which provides an angle of refraction of θ3.

NIMs may be designed to have simultaneously negative values for permittivity and permeability and, therefore, exhibit the property of negative refraction as shown on the left portion of illustration 300. The devices and techniques according to aspects of this disclosure utilize the negative refraction properties of NIMs in order to realize phase conjugation for RDA systems so that the system does not require harmonic mixers and/or high frequency LO signal distribution, thereby simplifying the RDA system by reducing the number of signal processing components that are needed. Accordingly, the devices and techniques proposed herein are able to achieve phase conjugation without the need for frequency and/or harmonic mixers needed in current RDA systems. Therefore, the devices and techniques of this disclosure provide for solutions to phase conjugation in RAD systems without the requirement of LO signal distribution as well as the amplitude and/or phase noise imbalances introduced by frequency and harmonic mixers. In addition, in comparison with other conventional methods such as Van Atta arrays, the devices provided herein do not require long transmission lines for signal distribution networks, e.g. Van Atta Arrays require long transmission lines to connect antenna elements which must be uniformly spaced to produce a phase gradient in order to reradiate energy back in the AoA. Van Atta arrays also make it difficult to realize 2-dimensional beam steering capability due to the requirement that all signal feedlines must have a same length.

The refractive index of a material may be expressed as $n=\pm\sqrt{\varepsilon_r\mu_r}$, where $\varepsilon_r$ is the permittivity and $\mu_r$ is the permeability. In general, the positive sign is used, i.e., $n=+\sqrt{\varepsilon_r\mu_r}$. When both $\varepsilon_r$ and $\mu_r$ are negative, the negative sign is used, i.e. $n=-\sqrt{\varepsilon_r\mu_r}$. With respect to the positive and negative refractions, the angle of refraction (θ2 for a negative refraction and θ3 for a positive refraction) for an incident signal with an AoA of θ1 on a material is shown in FIG. 3.

In order to achieve phase conjugation (i.e., the inverted phase) of the incident signal using negative refraction, the material property of the NIM may be expressed as:

$$-\frac{\sin\theta_2}{\sin\theta_1}=\frac{n_1}{n_2}$$

where $n_1$ and $n_2$ are the refraction index of free space and the medium, respectively, and $\theta_1$ and $\theta_2$ are the angle of incident signal and refraction, respectively. In order to achieve phase conjugation, $\theta_2$ needs to be $-\theta_1$, therefore, the refraction index of the NIM applied to an antenna according to some aspects of this disclosure can be expressed as:

$$-\frac{\sin\theta_1}{\sin\theta_1}=\frac{1}{n_2}$$

$$\therefore n_2=-1\sqrt{\varepsilon_r\mu_r}=-1$$

Figure 4:
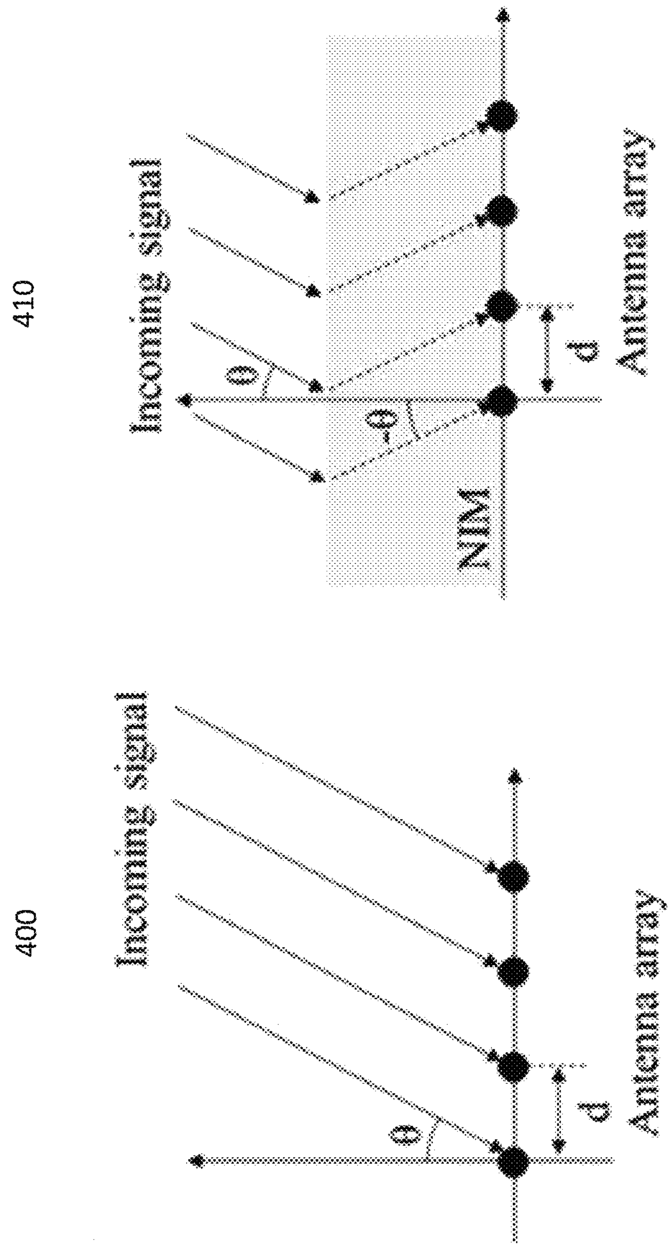
FIG. 4 shows an antenna array according to at least one exemplary embodiment of the present disclosure.

Accordingly, for an NIM having both a permittivity and a permeability of −1, a signal may pass through the NIM with a conjugated phase as shown in FIG. 4. It is appreciated that FIG. 4 may be simplified for purposes of this explanation.

The left side of FIG. 4 provides an illustration 400 of an antenna array with antenna elements (shown as black circles) spaced "d" distance apart configured to receive an incoming signal. The left-most antenna element in antenna array may receive the incoming signal at an angle of θ. It is appreciated that for purposes of this explanation, the AoA of the incident signal is shown as being similar for all antenna elements, but the phase of incoming signal may be different for each antenna element, as the most left side signal received by the most left side antenna element traveled a longer distance than the most right side of the signal and antenna.

The right side of FIG. 4 provides an illustration 410 of an antenna array with an NIM (shaded area) over the antenna elements (shown as black circles) spaced "d" distance apart according to some aspects. The incoming signal first hits the NIM at an angle of θ, and due to the negative refractive properties of the NIM, is refracted towards the antenna array at an angle of −θ, i.e., the incoming signal is already phase conjugated upon its reception at the antenna array. Thus, an RDA system with an NIM over the antenna array as illustrated in 410 may be able to implement RDA techniques without the use of frequency and/or harmonic mixers or long transmission lines since the incoming signal is already phase conjugated upon its receipt at the antenna array.

Figure 5:
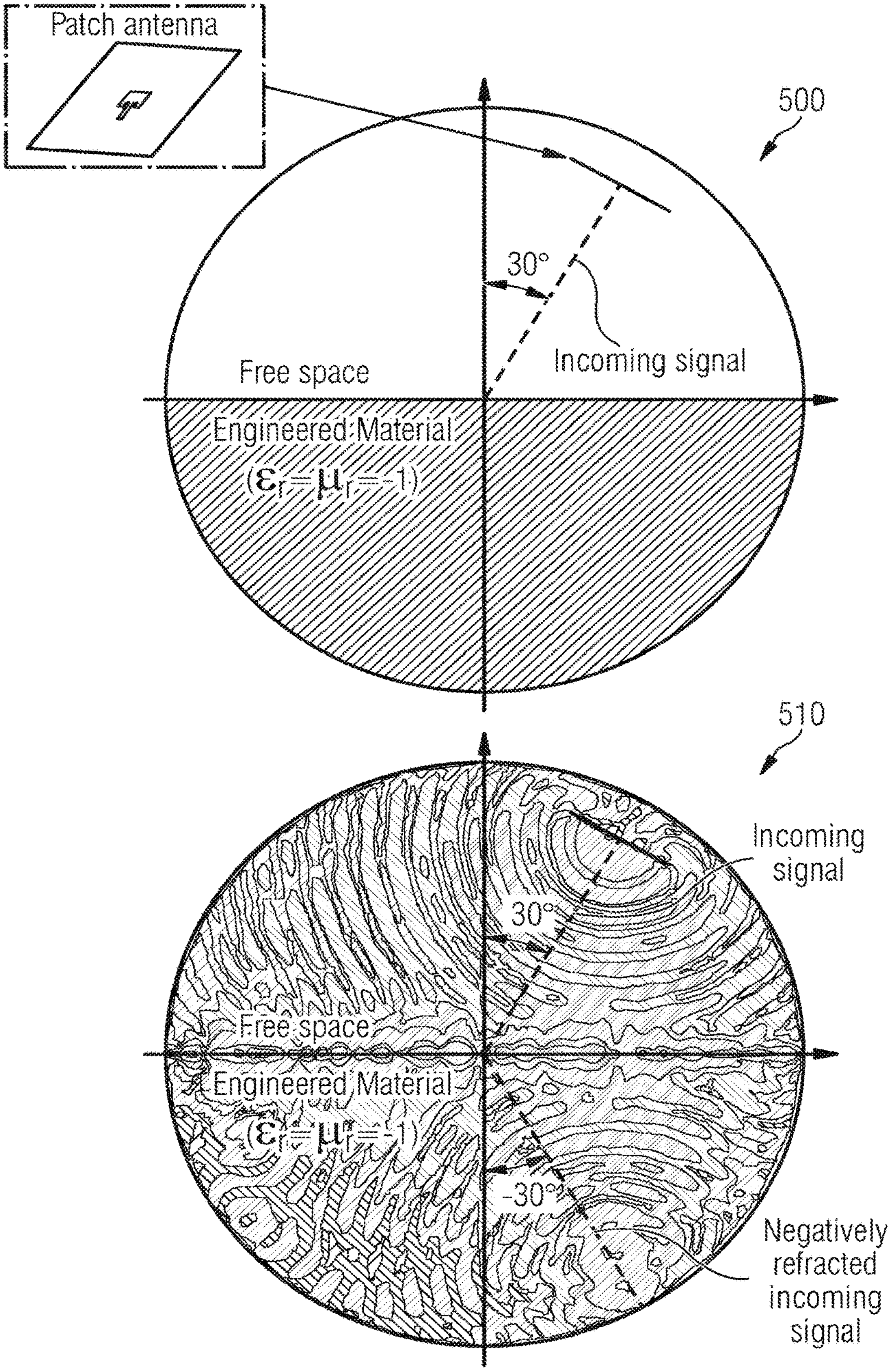
FIG. 5 shows exemplary diagrams including a diagram model of an NIM material and radiation results according to at least one exemplary embodiment of the present disclosure.

FIG. 5 shows exemplary diagrams including a diagram model 500 of an NIM material and radiation results 510 provided by the diagram model 500 according to some aspects. It is appreciated that FIG. 5 may be simplified for purposes of this explanation.

In diagram model 500, a conventional patch antenna is used as the device to transmit a signal, e.g., a pilot signal, towards the NIM, or, as labeled in FIG. 5, "Engineered Material." For purposes of this disclosure, it is appreciated that NIM and Engineer Material may be used interchangeable. The patch antenna is arranged to transmit signals with an AoA of 30° at the Engineered Material and free space boundary. As shown in FIG. 5, the Engineered Material has a permittivity ε and a permeability μ which are both equal (or substantially close) to −1.

The radiation result diagram 510 on the bottom shows the negative refraction and inverted angle of arrival (AoA) of the signal as it passes through NIM at an inverted angle of −30°, i.e. the angle of the signal as it passes through the NIM is phase conjugated with the signal transmitted from the patch antenna before it hits the NIM.

Figure 6:
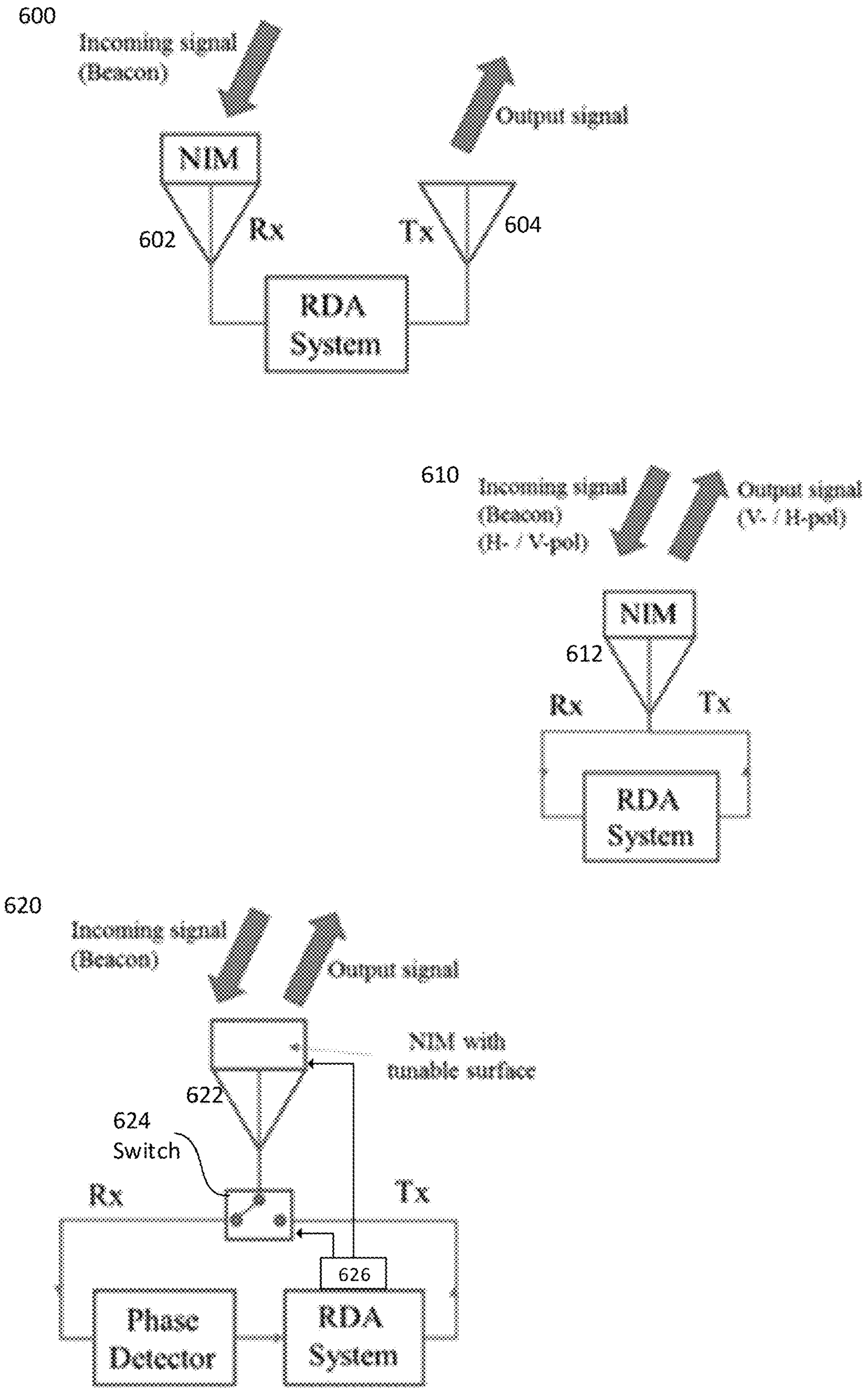
FIGS. 6-7 show exemplary schematic diagrams of an RDA system with an Negative Refractive Index Engineered Materials (NIM) according to at least one exemplary embodiment of the present disclosure.

FIG. 6 shows exemplary schematic diagrams 600-620 of an RDA system with an NIM according to some aspects. It is appreciated that the schematic diagrams may be simplified for purposes of this explanation.

The NIM may include any type of engineered material structures implemented in front or on top of the receiving antenna so that the signals received by the reception antenna (Rx) of a wireless device with an RDA system pass through the NIM prior to being received at the antenna array. In this manner, the NIM provides a phase conjugated signal to the antenna array so that the RDA system does not need to perform any additional steps of phase conjugation. Accordingly, an RDA system that does not require frequency and/or harmonic mixers, double the frequency of the received signal for a LO frequency, or half the frequency of the received signal for the LO frequency for phase conjugation may be realized.

In 600, a separated transmission-reception (Tx/Rx) configuration is shown. In this example, the Rx antenna array 602 and the Tx antenna array 604 are separate and the NIM is applied only to the Rx antenna array 602. In this manner, the incoming signal (e.g., a beacon signal transmitted from another device) is received at the Rx antenna array 602 with the phase already conjugated due to the NIM, and the RDA system mixes this phase conjugated signal with a LO baseband signal to produce the output signal to be transmitted from the Tx antenna 604 in the direction in which the incoming signal was received. In this manner, a wireless device is able to produce highly directed and narrow beams at another communication device (e.g., in a vehicle, drone, mobile phone, infrastructure element, etc.) without the need to perform the additional signal processing steps of phase conjugation after having received the antenna at the antenna array.

In 610, a transceiver configuration is shown with a shared antenna array 612 where the antenna array utilizes the same antenna elements for both reception and transmission. In this example, the received and transmitted signal are separated using a dual-polarized antenna and used in conjunction with the NIM to take advantage of the NIM's orientation dependent property. Using two different polarizations for Tx and Rx signals and aligning the NIM in a specific manner, only the polarization of the receiver may be impacted by the NIM while the polarization of the transmitter will maintain its normal refraction index property. This may be achieved by changing the alignment of the NIM with respect to the desired antenna polarization. In some aspects, this NIM can be same as in 600 or it can be different. Thus, application of the NIM to a shared antenna array may also be utilized.

In 620, a configuration with a tunable NIM surface is illustrated. To dynamically change the material properties of NIM, in 610, the polarization of the signal propagating through the NIM is changed. On the other hand, in 620, the NIM itself is altered by implementing the tunability. In this architecture, in combination with a shared antenna 622 and a switch 624 to switch between transmission (Tx) and reception (Rx) paths, the material property of the NIM may be altered by a tunable capability that is applied to the surface of the NIM. For example, the refractive index of the NIM may be altered via the application of a stimulus which is applied in combination with the switching between the Tx and Rx paths. For example, the NIM may exhibit a negative refractive index only when the stimulus is applied. So, when the device is switched to receive mode, as shown by the configuration of the switch 624, for example, the stimulus is applied so that incoming signals are phase conjugated by the NIM. And, when the device is in transmit mode, the stimulus is removed so that the phase of the output signal (i.e. transmitted signal) is unaffected by the negative refraction property of the NIM. The coordination of the application of the stimulus and the controlling of the switch may be performed by a controller 626 of the RDA system.

For each of 600-620, a key concept is that an incoming signal, such as a beacon or a pilot signal, received at a wireless communication device with the RDA system is phase conjugated by passing through the NIM, and therefore, the RDA system does not require frequency and/or harmonic mixers to phase conjugate the incoming signal with an outgoing baseband signal in order to transmit the signal to be transmitted by the wireless communication device in the direction of the received incoming signal.

Figure 7:
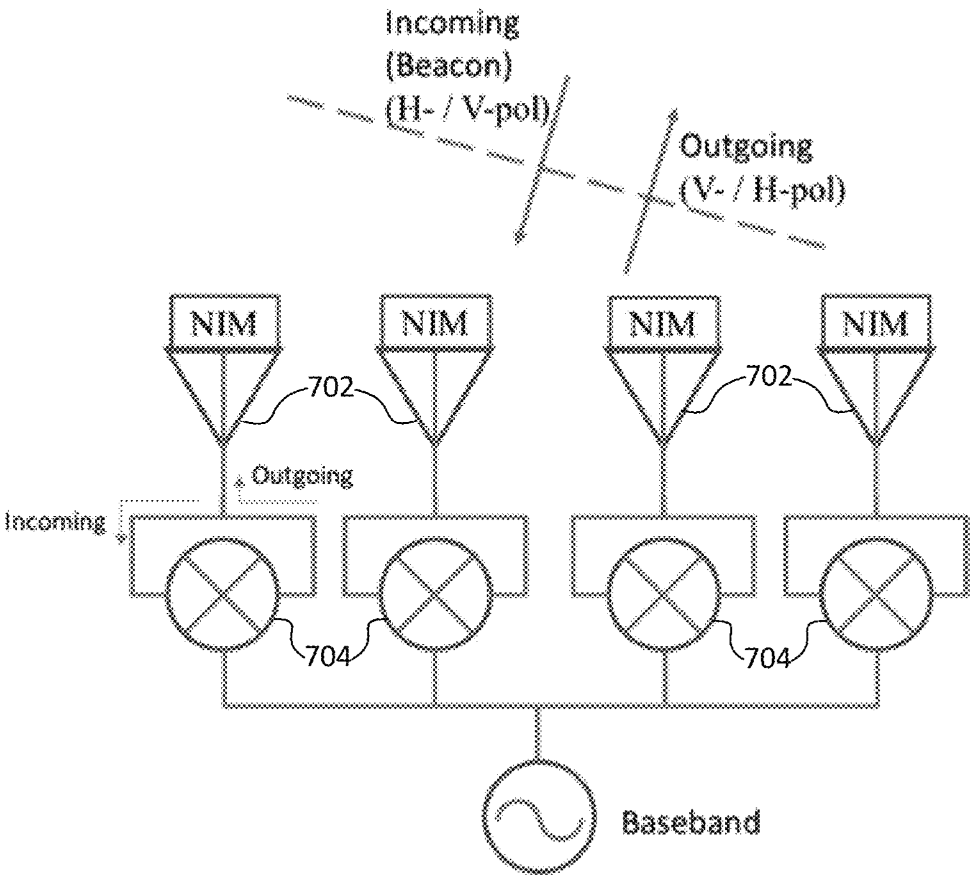

FIG. 7 shows an additional exemplary schematic diagram 700 of an RDA system with an NIM according to some aspects. It is appreciated that the schematic diagram may be simplified for purposes of this explanation.

In diagram 700, the incoming beacon signal and the transmitted signals from a shared antenna, including a plurality of antenna elements 702, are separated by their polarization (V- and H-pol). The phase of the incoming beacon signal is reversed by the NIM structure on the antenna elements 702. The baseband signal is up-converted by each of the mixers 704 with the received beacon signal so that the transmitted (i.e. outgoing) signal carries the baseband signal with the reversed phase information of the received beacon signal to steer the beam toward the direction of the incoming signal. In this sense, the RDA system of this disclosure avoids the need for frequency and harmonic mixers to achieve phase conjugation with the received beacon signal.

According to some aspects, the NIM structures may be applied to the antenna array using a multilayer package technology. The material properties on top of the antenna elements may be engineered with patterned NIM structures.

According to some aspects, the RDA system with a NIM as disclosed herein provides numerous advantages over currently existing phase conjugations structures including RDA systems including phase conjugation circuitry (e.g., frequency and/or harmonic mixers) and Van Atta array architectures. In the RDA systems with phase conjugation circuitry, the phase of the incoming beacon signal is reversed by mixing with the local oscillator (LO) signal which has two times the frequency of the incoming signal. This requirement of needing 2 times the frequency of the incoming signal at the LO introduces substantial phase noise to the system, especially at higher frequency band applications such as 5G and other new radio (NR) radio access technologies. Additionally, there are higher levels of complexity required to achieve equi-phase at these higher frequency levels. The RDA systems with a NIM according to aspects of this disclosure eliminate the need to mix at two times the frequency of the incoming signal, thereby reducing the complexity and the phase noise of the system.

In the Van Atta array structure, the phase of the incoming signals are reversed by the judicious placement of the antenna array elements. For example, in the Van Atta array, the left-most antenna element of the reception antenna array is connected to the right-most antenna element of the transmission antenna array. Although the Van Atta array does not require two times the received frequency for the LO, due to the requirement for longer transmission lines, the Van Atta array structures are prone to higher loss in the signal distribution network. Additionally, in Van Atta arrays, it is difficult to design an equi-phase, long transmission line based distribution network.

According to some aspects, each individual NIM structure applied to each of the antenna array elements are identical and the signal distribution network is carefully designed to achieve equi-phase transmission lines so that the phase of each of the signals can be matched at each of the antenna elements. This may be accomplished by designing electrically length matched lines. This may involve EM circuit simulation to make sure the phase of each lines are matched. In comparison with the phase conjugation circuitry based RDA systems, since the RDA system with NIM according to this disclosure does not require two times the frequency of the received signal as the LO signal, it facilitates the designing of the equi-phase distribution network.

According to some aspects, the RDA system with the NIM structures applies to the antenna array as described in this disclosure provide increased directional ability for beam transmission, less signal processing, and lower latency times for reacting to an incoming signal and transmitting a signal in response to the incoming signal.

Figure 8:
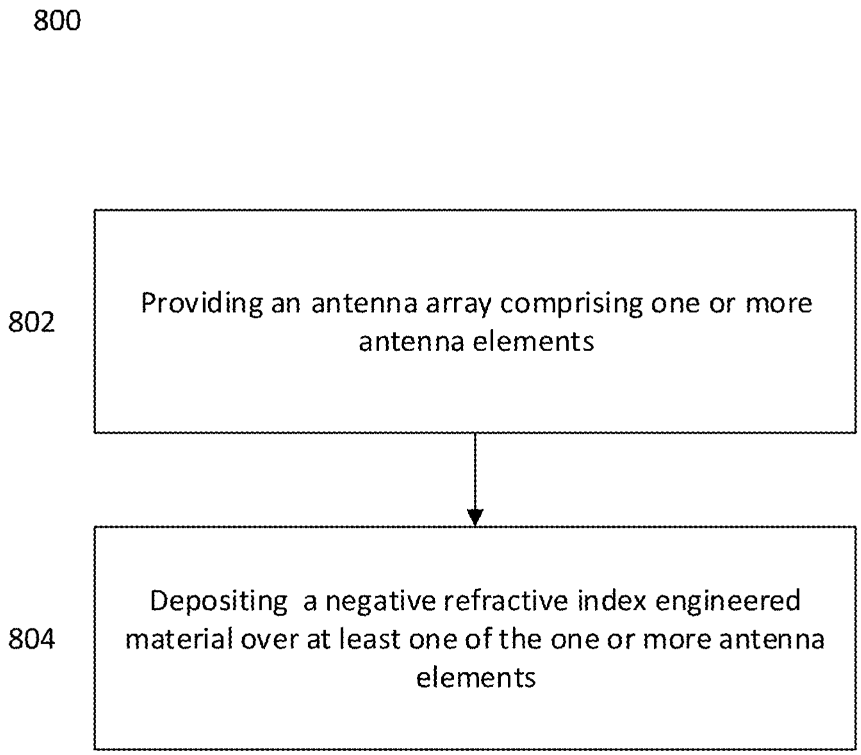
FIG. 8 shows an exemplary flowchart for manufacturing retro-directive antenna array system including an antenna array with NIM according to at least one exemplary embodiment of the present disclosure.

FIG. 8 shows an exemplary flowchart 800 for manufacturing retro-directive antenna array system including an antenna array with NIM according to some aspects. It is appreciated that flowchart 800 may be simplified for purposes of this explanation.

The method may include providing an antenna array comprising one or more antenna elements 802; and depositing a negative refractive-index engineered material (NIM) over at least one of the one or more antenna elements 804. Accordingly, the NIM may provide the RDA system with the phase conjugation of the received signal so that the RDA signal processing circuitry to facilitate signal processing. For example, since the signal is already phase conjugated, the RDA system does not require further frequency and/or harmonic mixers to achieve phase conjugation to mix with the baseband signal to produce the signal to be transmitted from the RDA system.

The explosion in the vehicle communication, e.g., V2X, market along with the introduction of millimeter-wave (mmW) based technologies, such as 5G, will help usher in an age of autonomous driving predicated on the delivery of high bandwidth and low latency connectivity. Accordingly, it will be important to provide for antennas capable of meeting many stringent requirements, such as high data capacity, low latency times, and high coverage, while being able to be integrated into a vehicle body without providing a negative impact to other vehicular considerations, e.g., aerodynamics, aesthetics, etc.

Figure 9:
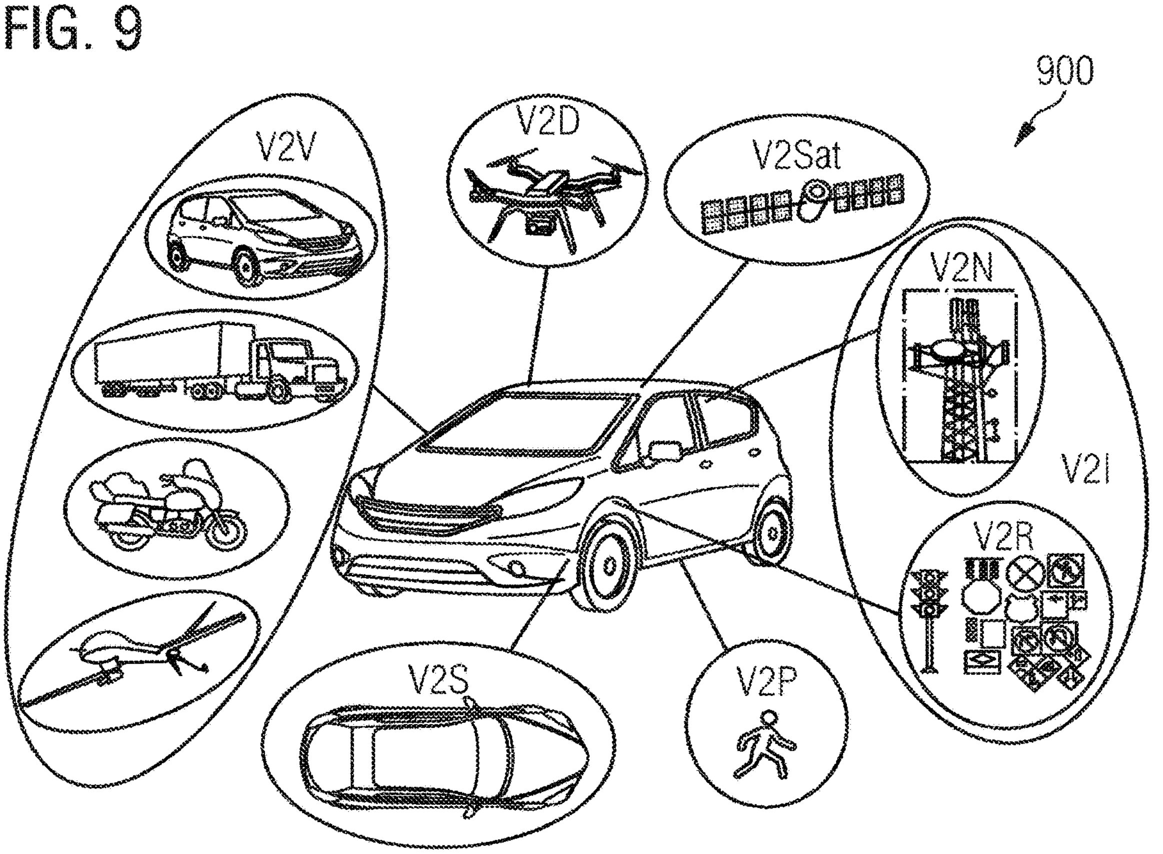
FIG. 9 shows exemplary vehicle-to-everything (V2X) communication scenarios according to at least one exemplary embodiment of the present disclosure.
Figure 9:
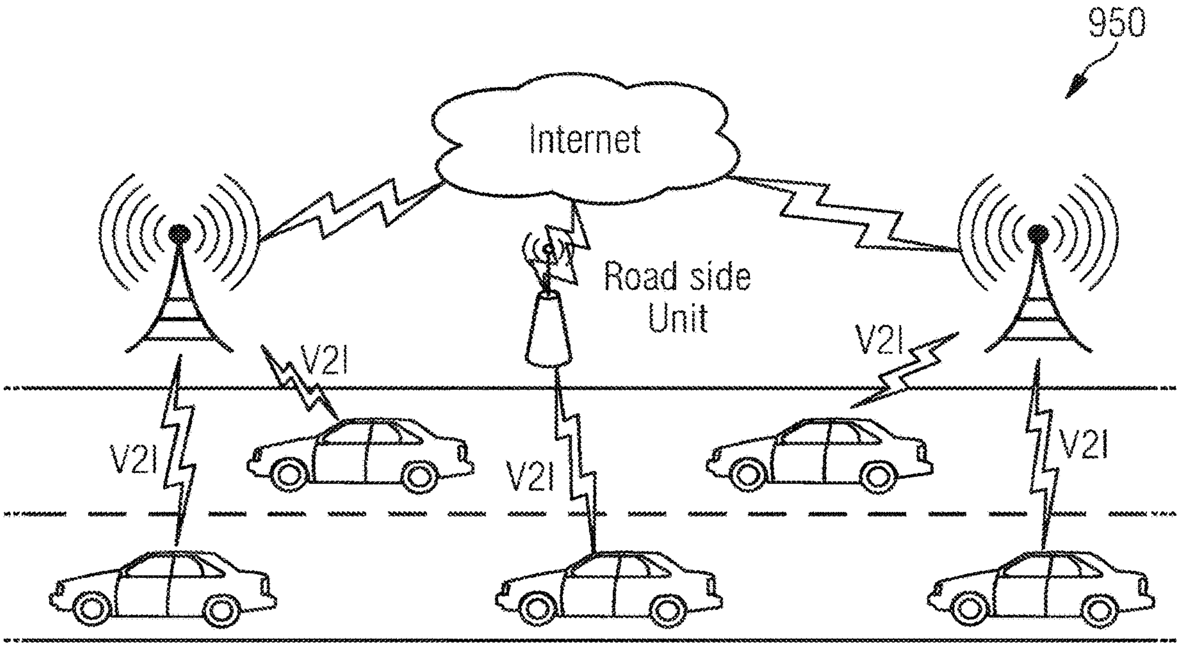

FIG. 9 shows two exemplary vehicle communication scenarios 900 and 950 according to some aspects. These Vehicle-to-Everything (V2X) scenarios, including Vehicle-to-Vehicle (V2V), Vehicle-to-Drone (V2 D), Vehicle-to-Satellite (V2SAT), Vehicle-to-Network (V2N), Vehicle-to-Infrastructure (V2I), Vehicle-to-Road signs (V2R), Vehicle-to-Pedestrian (V2P), and Vehicle-to-Sensor (V2S), may require vehicular embedded antenna architectures in order to satisfy the high bandwidth and low latency requirements for safe and effective wireless communications while also meeting other demands such as aerodynamics, aesthetics, coverage with no-blind spots, reliable performance in a challenging and dynamic environment, etc. The ability to implement low-cost and high-volume manufacturing of mmW antenna system modules in vehicles meeting all these requirements may be critical for achieving the success of V2X communications in the coming years.

Current solutions include antenna structures which protrude from the vehicle body (e.g. based on a shark fin design) or phased array modules at the roof edge or corners of the vehicle to achieve the desired coverage. However, such approaches are prone to blind spots in radio frequency (RF) coverage. Furthermore, these approaches may affect the aerodynamics of the vehicle, its aesthetics, or require multiple mmW integrated circuits (ICs) with multiple heat sinks and longer, inefficient mmW and/or radio frequency (RF) transmission or coaxial lines introducing higher manufacturing costs and degraded performance. The coaxial and RF transmission lines may also be subject to increased attenuations from the required transitions to and from the circuits and antennas, which will further degrade the performance in addition to providing higher equipment costs.

According to some aspects, a low-profile, vehicle body conformable, hybrid, mmW antenna array for vehicular communications meeting all of the stringent requirements for radio frequency communication while providing a vehicle friendly implementation with respect to aerodynamics and conformability to different vehicle bodies is described. The antenna structures provided herein provide suitable aerodynamics, high mmW coverage with minimal or no blind spots, thermal stability, and robust performance in a dynamically changing environment. This disclosure provides for a compact, low-profile antenna array structure providing 360-degree azimuth coverage around a vehicle as well as 180-degree hemispherical elevation coverage over the vehicle when embedded in the vehicle roof. The antenna array includes a conformable beam-switched array in combination with phased array topologies. The entire antenna array distribution network structure uses a low-profile, low-loss design which is conformable and easily implemented in a vehicle body with minimal or no protrusions and without the need for any distribution networks based on long transmission lines. The printed circuit board (PCB), switched antenna array elements have an impedance matched lower loss transmission structure that enable full azimuth coverage around the antenna structure as well as V2X-friendly elevation patterns which may be tiltable by using the vehicle material and structural profiles.

Figure 10:
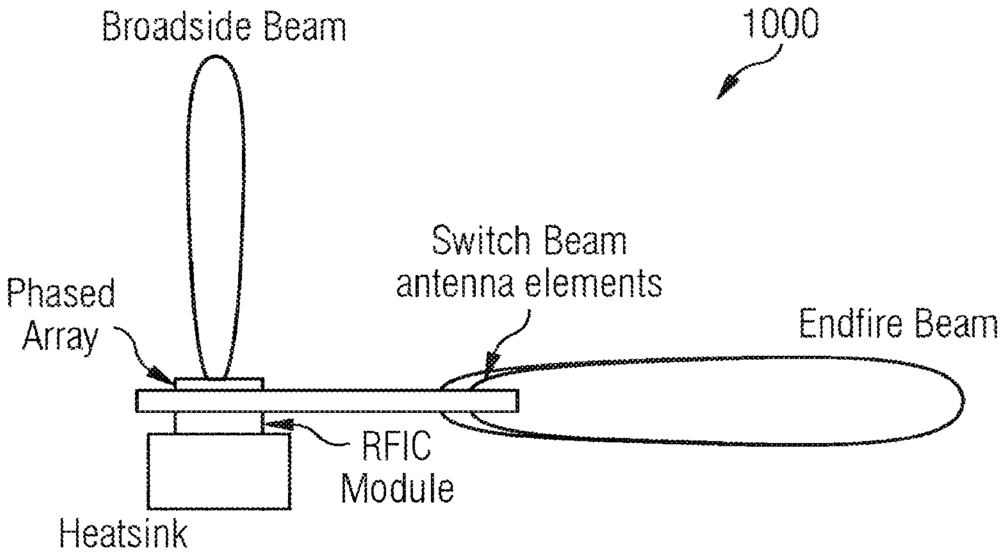
FIG. 10 shows an exemplary schematic diagram of a cross-section of a portion of a combination antenna array structure and an exemplary illustration of the azimuth coverage provided by the combination antenna array structure according to at least one exemplary embodiment of the present disclosure.
Figure 10:
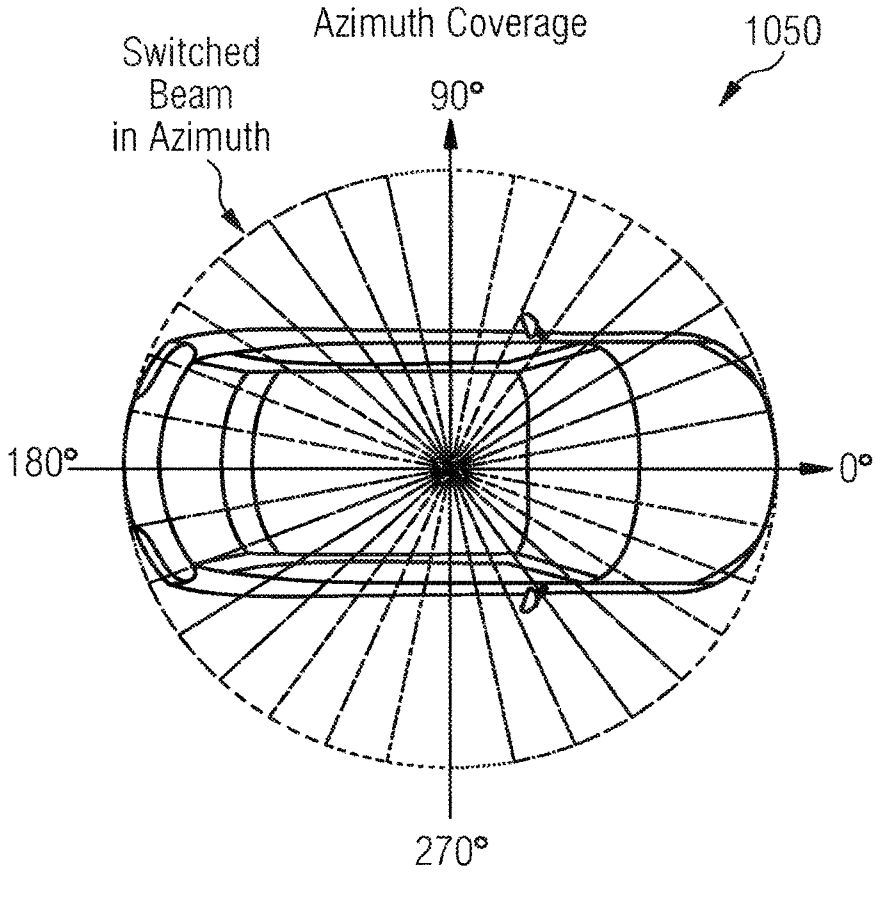

FIG. 10 shows an exemplary schematic diagram of a cross-section of a portion of a combination antenna array structure 1000 and an exemplary illustration of the azimuth coverage 1050 provided by the combination antenna array structure according to some aspects.

In some aspects, the antenna structure, including the phase array and the circular switched beam array elements, provided herein may also be integrated into other parts of a vehicle other than the roof, e.g., a bumper or a side or corner of a vehicle, to achieve desired coverages as necessary due to different vehicle forms and scenarios.

The combination antenna structure 1000 with phased array and switched array beam elements is a low-vertical profile antenna system that incorporates a novel switched beam antenna element with a circular (or substantially circular, e.g. elliptical) contour which may emit endfire-type beams around a phased antenna array which may emit broadside-type beams. Both of these antenna arrays may be operatively coupled to a radio frequency integrated circuit (RFIC) module, which may provide further connections to other processing circuitry in the vehicle. Also, a heat sink may be included to provide a heat outlet for the RFIC module and/or combination antenna array. The circular switched beam array elements may be operatively coupled to the RFIC module via switches, which will be explained in further detail in the ensuing description.

According to some aspects, the switched beam antenna array elements may be enclosed in a dual-purpose housing structure that both enhances performance and provides protection from the environment. Furthermore, the proximity of a vehicular metallic body may be used to enhance the beam pattern shape and gain performance.

Figure 11:
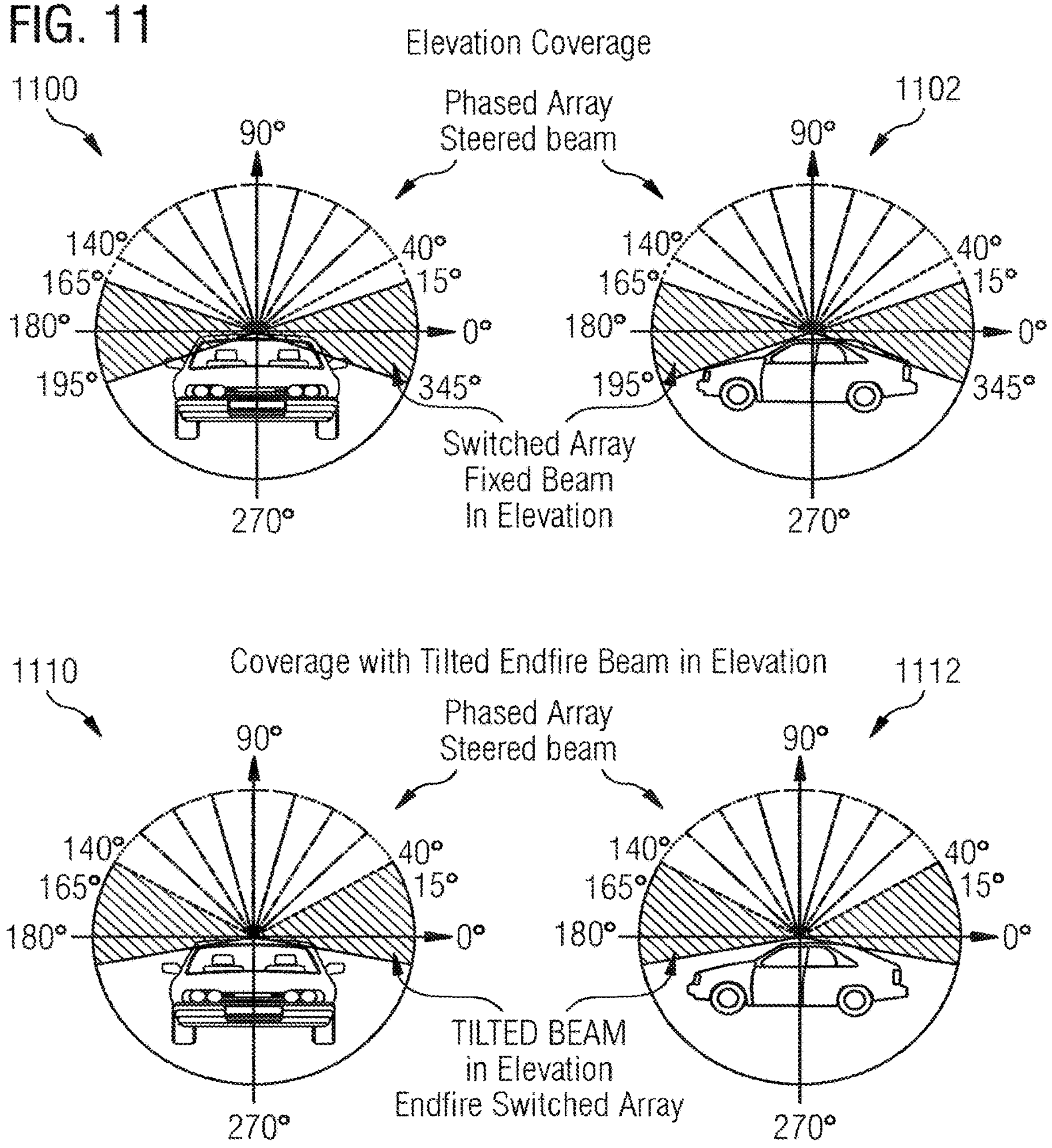
FIG. 11 shows exemplary diagrams illustrating the elevation coverage provided by an exemplary combination antenna structure according to at least one exemplary embodiment.

The combination antenna array structure 1000 with both phased array elements and switched beam array elements provides for a vertically low-profile, thereby making it suitable for vehicular roof and/or body integration. The phase array (e.g., providing a broadside beam as depicted in 1000) may provide hemispherical coverage above the vehicle and the switched beam antenna array (e.g., providing endfire beams as depicted in 1000) may ensure 360 degree azimuthal coverage 1050 without blind spots. Disposition of the switched beam antenna array elements in a circular, semi-circular, or elliptical arrangement provides for the complete 360 degree coverage (or a sector of the coverage, e.g. 90 degrees, if desired). The steerable M×N phased array (i.e., with a configuration of M elements by N elements, where M and N are both integers), in combination with the switched beam antenna structure, provides 180 degree hemispherical coverage, which can be above the vehicle if the antenna structure is integrated into the roof as illustrated in FIG. 11. The combination antenna array package shown as part of 1000 may be provided on a printed circuit board (PCB) assembly that can be integrated conformably within a plastic, metal, or composite vehicle roof in order to minimize the aerodynamic effects of the antenna structure without noticeable loss in performance.

FIG. 11 shows exemplary diagrams illustrating the elevation coverage provided by the combination antenna structure according to some aspects. The top illustrations show a vehicular front side view 1100 and a vehicular side view 1102 of radio frequency coverage provided by the combination antenna structure according to aspects of this disclosure. The bottom illustrations show a vehicular front side view 1110 and a vehicular side view 1112 of radio frequency coverage provided by the combination antenna structure with a tiltable endfire beam according to aspects of this disclosure.

In 1100 and 1102, the phased array may provide coverage via beam steering above the vehicle, e.g., in a hemispherical range from 0 to 180 degrees above the vehicle. The broad side beams from the phase array may have a stronger signal gains as it approaches the zenith of the hemispherical coverage, e.g., a point at the 90 degree mark, i.e., a point that lies orthogonal to the face of the phase array. The phased array may provide good coverage on its own without the assistance of the switched beam array in a certain range, e.g. between the 15 degrees and 165 degrees. However, near the boundaries of the hemispherical coverage, the radio frequency coverage (i.e. the signal gains) of the phased array may be supplemented by the switched beam array.

The switched beam array may provide the 360 degree azimuthal coverage around the vehicle at a beam width (measured in the vertical direction, i.e. the altitude direction) of about 30 degrees, e.g., in the shaded portions from 165 degrees to 195 degrees and 15 degrees to 345 degrees. The phased array may provide the strongest radio frequency coverage as a beam perpendicular to the phased array, i.e., in the general direction of the 90 degrees shown in FIG. 11. However, the phased array may be able to steer beams towards the direction of the coverage of the switched beam array elements so that they may complement each other. Furthermore, as illustrated in the bottom illustrations 1110 and 1112, the switched beam antenna arrays may be able to tilt their coverage towards the phased array coverage to provide better coverage in the areas between 15 degrees and 40 degrees, for example. The metals and plastic body materials of the vehicle may be used to tilt the switched beam array elements coverage in elevation to adjust the pattern to have higher-peak gains in certain desired directions.

Figure 12:
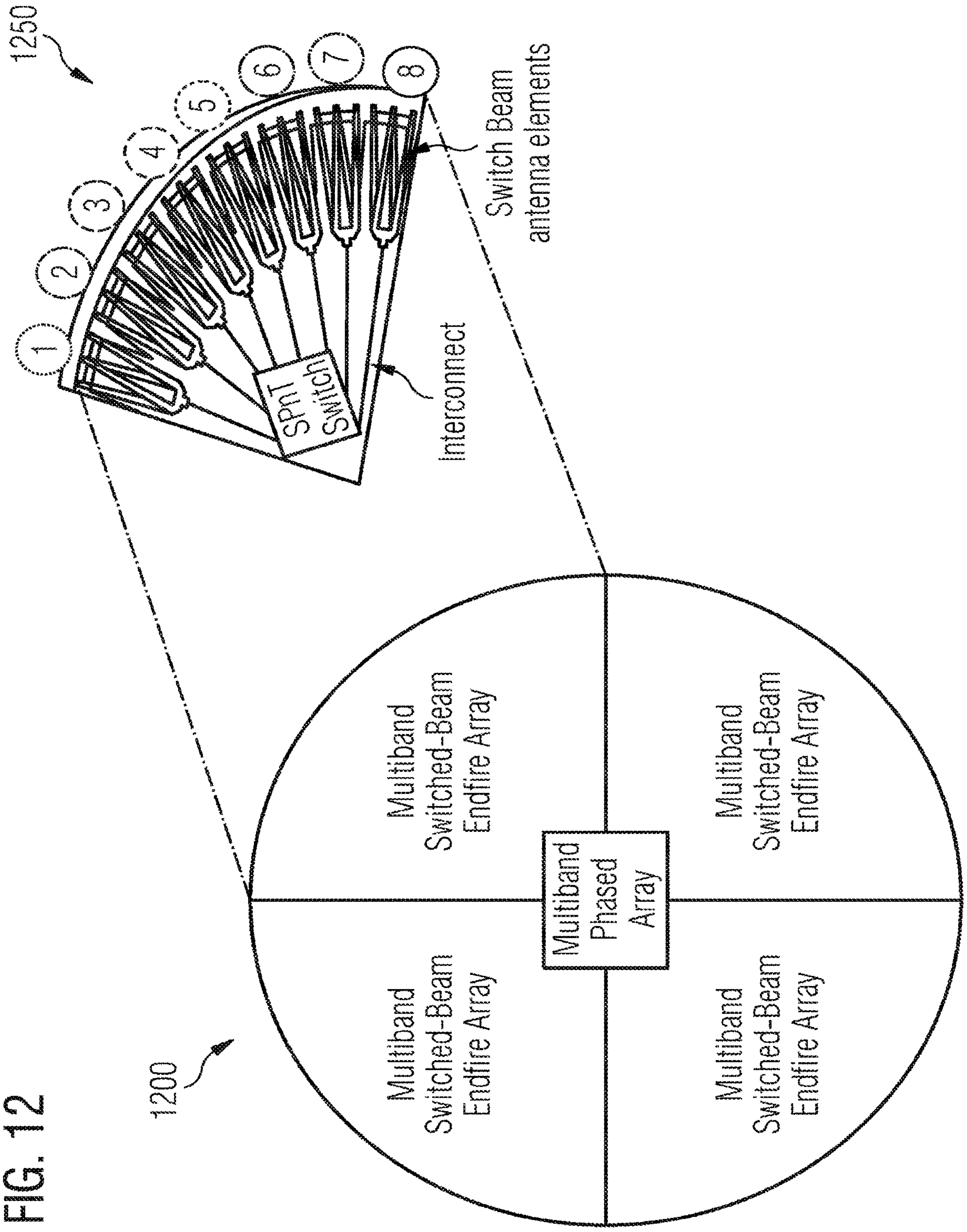
FIG. 12 shows an exemplary combination antenna array structure and an exemplary quadrant of a switch beam antenna array portion of the combination antenna array structure according to at least one exemplary embodiment of the present disclosure.

FIG. 12 shows an exemplary combination antenna array structure 1200 with four multiband switched beam antenna array quadrants (i.e., multiband switched-beam endfire arrays) and an exemplary quadrant 1250 of the switch beam antenna array portion of the combination antenna array structure according to some aspects.

Both phase array and the switched beam antenna array may be designed with multi-frequency features, i.e. they may both be capable of transmitting and receiving signals over multiple frequency bands. The multiband phase array may include an array of M×N elements (where M and N are both integers, e.g. 4×4 elements) and the switch beam endfire antenna array are shown in greater detail in 1250. Each quadrant may include a number of switch beam array element, e.g. eight are shown in 1250, which are connected with interconnects to a single-pole-N-throw (SPNT) switch, which in this example, since there are eight endfire antenna elements, may be an SP8T switch. The combination of the phase array with the switched beam antenna array surrounding it may have a substantially low vertical profile for integration into a vehicular body. While SPNT switches are shown, it is appreciated that other similar switches may be used.

Figure 13:
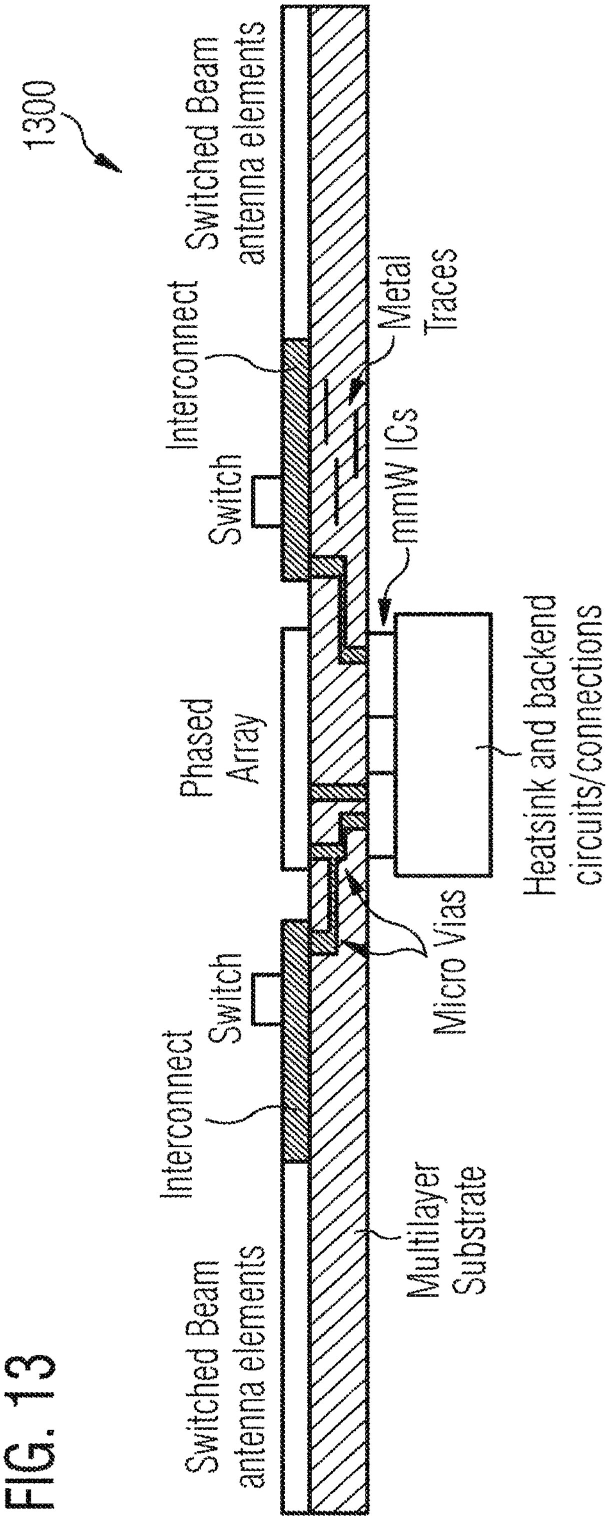
FIG. 13 shows an exemplary schematic diagram of a cross-section of a combination antenna array structure according to at least one exemplary embodiment.

FIG. 13 shows an exemplary schematic diagram of a cross-section of a combination antenna array structure 1300 according to some aspects.

As shown, combination antenna array structure 1300 may include a number of different features, including the phased array (including an array of M×N antenna elements) which is surrounded by a switched beam antenna array including a plurality of switched beam antenna elements. The switched beam antenna elements may be arranged on a multilayer substrate. The switched beam antenna elements may be connected to a switch via interconnects, and the switch may be operatively connected to the mmW ICs. The phased array may also be connected to the mmW ICs through microvias in the multilayer substrate. Furthermore, metal traces may be included in the multilayer substrate in order to enhance the radiation pattern of the combination antenna array structure. The mmW ICs may be arrange on a heat sink and the overall structure may include further backend circuits and connections to connect the combination antenna structure to further circuitry located within a vehicle.

Figure 14:
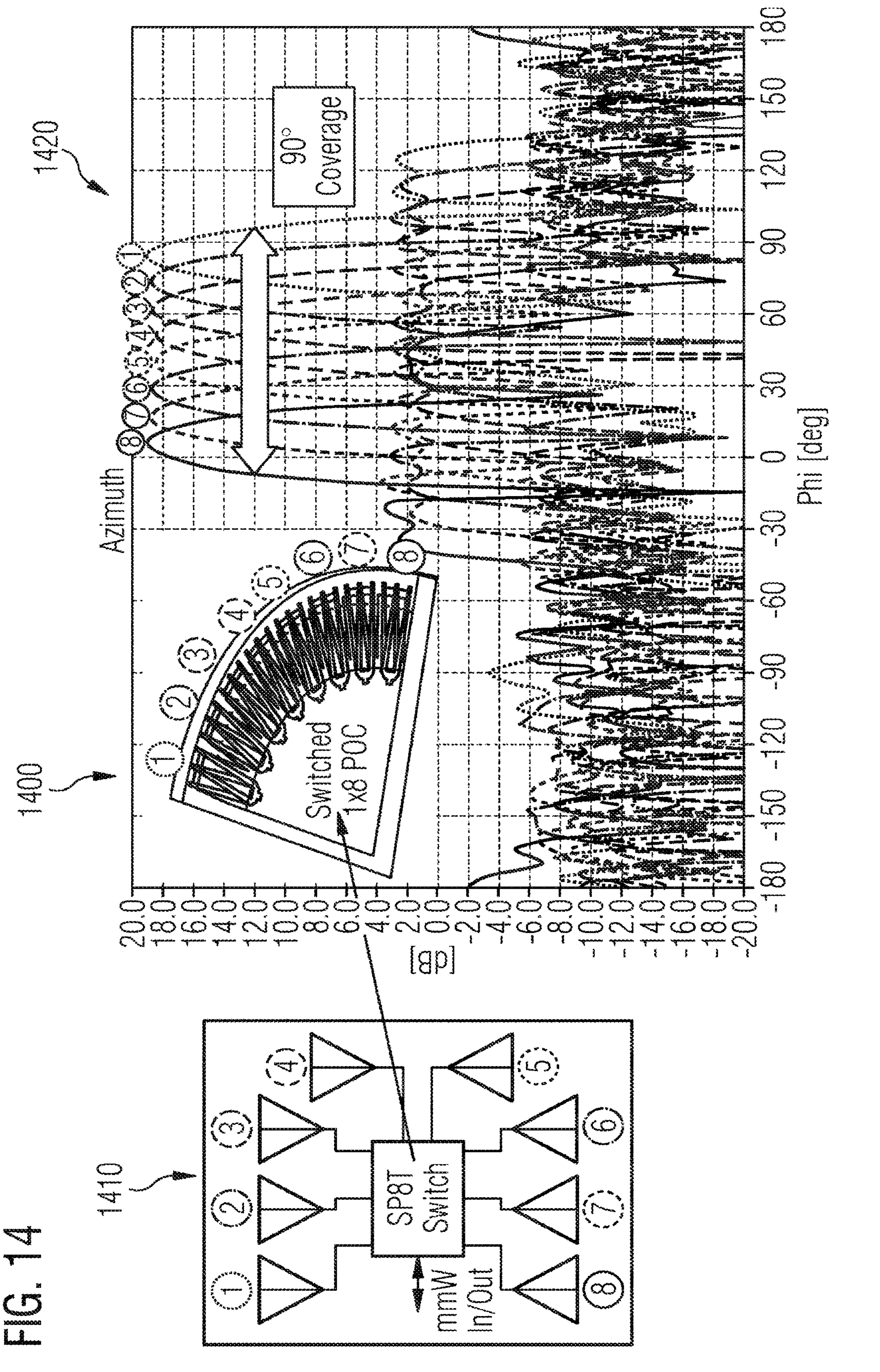
FIG. 14 shows an exemplary quadrant of an exemplary switched beam antenna array and a corresponding schematic diagram and a graph showing coverages according to at least one exemplary embodiment of the present disclosure.

FIG. 14 shows an exemplary quadrant of a switched beam antenna array 1400 and a corresponding schematic diagram 1410 along with a graph 1420 showing coverages with the signal gain plotted on the y-axis and the degrees plotted on the x-axis. The quadrant of the switched beam array may include eight antipodal tapered slot antenna array elements with a single-pole-eight-throw (SP8T) switch covering 90 degrees in the azimuth with a 19+dB gain and providing complete coverage (of the quadrant) with no blind spots. The switch may be operatively coupled to the mmW IC chips via the mmW In/Out interface.

Figure 15:
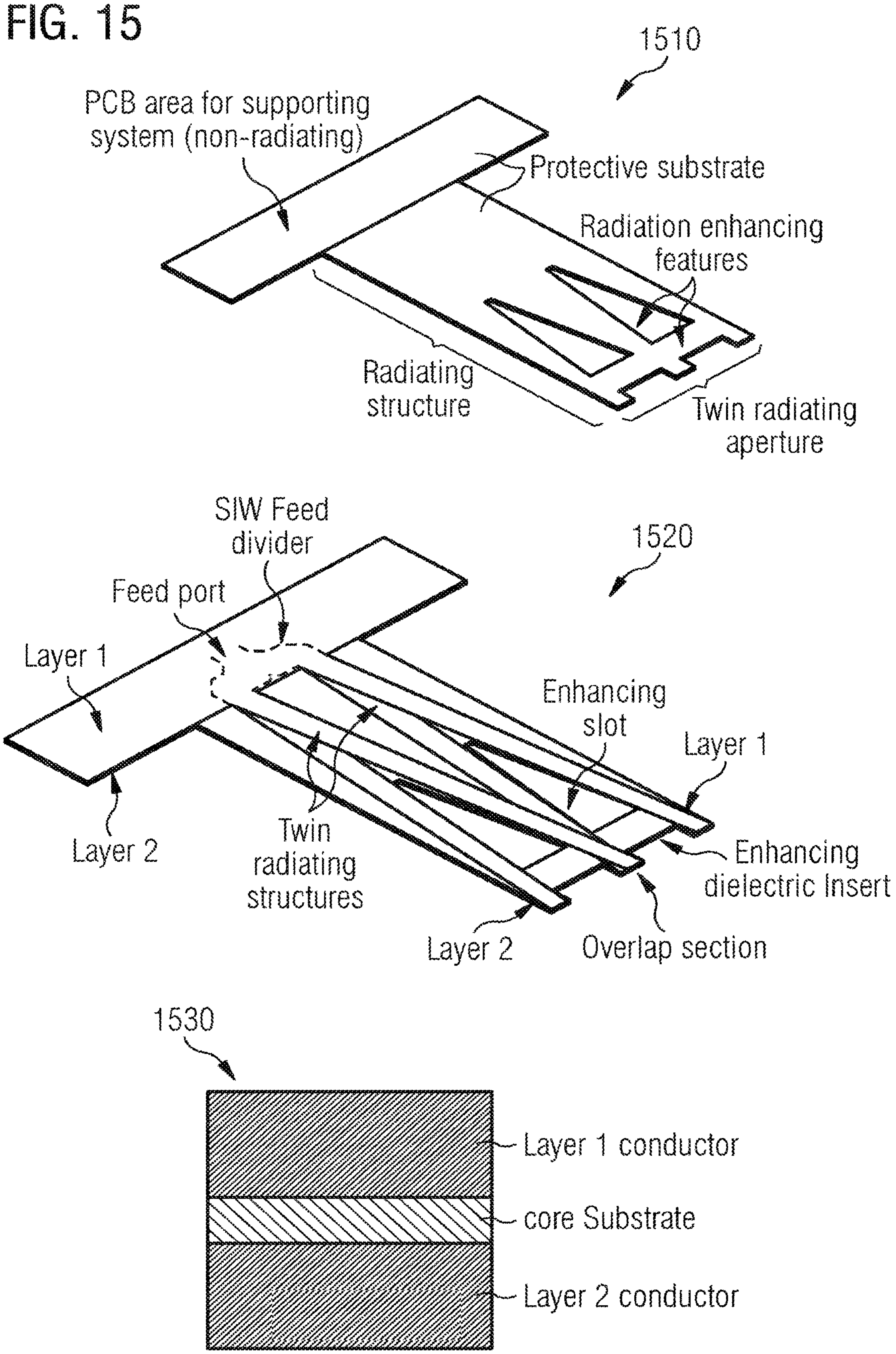
FIG. 15 exemplary illustrations of an exemplary switched beam antenna array elements according to at least one exemplary embodiment.

FIG. 15 shows three exemplary illustrations 1510-1530 of the switched beam antenna array elements in greater detail. The switched beam antenna array elements may be arranged as antipodal tapered slot antenna (ATSA) elements as illustrated and described herein.

The top diagram 1510 offers a view of the printed circuit board (PCB) of an antenna element of the switched beam antenna array which may be made of a protective substrate. For example, this may include a protective substrate with a thickness of about 0.05 mm to about 0.5 mm composed of low loss, thermally stable dielectrics. The backside rectangular PCB area offers an area for supporting the feed port and substrate integrated wavelength (SIW) feed divider of the conductive portions of the switched beam antenna element (shown in 1520). The PCB of the antenna element also includes a radiating structure with radiation enhancement features and a twin radiating aperture structure.

The middle diagram 1520 shows a view of the conducting layers of the antenna element of the switched beam array which may be made of a first conducting layer, Layer 1, arranged on top of a second conducting layer, Layer 2. The twin radiating structures and the enhancing slot provide for optimal coverage for over 11.25 degrees of the azimuth coverage. For example, as shown in graph 1420, each of the antenna elements may provide over 18 dB in signal gain for 11.25 degrees worth of coverage in the azimuthal direction, thereby resulting in over 18 dBs of signal gain over a whole quadrant, i.e., 90 degrees. Accordingly, eight of these ATSA antenna of these antenna elements offer a full 90 degrees of coverage for a quadrant without any blind spots, and thirty-two of these antenna elements (i.e. eight per quadrant) arranged in circular fashion offer a full 360 degrees range of coverage. It is appreciated that other configurations may be used, e.g., another number of switched beam antenna elements arranged per quadrant (other than eight) to provide the full 360 degree azimuth coverage.

The twin radiating structures may each include a respective first prong and a respective second prong, wherein each of the first prongs are made of the Layer 1 conductor and wherein each of the second prongs are made of the Layer 2 conductor as shown. Furthermore, the first prongs may be arranged over the second prongs so that at least one of the first prongs and one of the second prongs have an overlap section as shown. Each of the prongs may include an enhancing slot, with the option of providing a further enhancing dielectric inset at the mouth of each of the prongs of the twin radiating structures. The Layer 1 conductor and the Layer 2 Conductor may be the same or they may be different conductive materials.

The twin radiating structures in combination with the ultra-low-loss air filled or dielectric filled substrate integrated wavelength (SIW) power dividers and radio frequency (RF) switches enable a single port feed and the ability for beam-pattern steering by switching and selecting the desired twin radiating element of the entire switched beam antenna array.

In some aspects, two or more of the circular switched beam antenna arrays may be provided in a vertical stack to provide further performance flexibility, e.g., extended or multi-frequency bands operation and switched elevation patterns.

The bottom diagram 1530 shows a diagram of a cross-section of an entire switched array antenna element, including alternating layers of the PCB protective substrate around the Layer 1 conductor, core substrate, and Layer 2 conductor according to some aspects.

In some aspects, the combination of slots, dielectric fill, and metal overlaps in specific areas of the twin radiating structures of the ATSA elements as shown in diagrams 1510-1530 provide for enhanced signal gains and bandwidth. The thin profiles and slots for enabling conformal disposition of the antenna array structure allow for it to follow the contours of a vehicular body.

The combination of twin radiating structures in the ATSA elements of the switched beam antenna array may be supplemented with a housing with reflecting and directing structural features that enable accurate direction of beams in close proximity to metallic surfaces (e.g., a vehicular body) while providing weather protection and mechanical stability.

The overall antenna structure including the phased antenna array and the circular switched beam antenna array may be manufactured on the same package/PCB assembly and housing.

Figure 16:
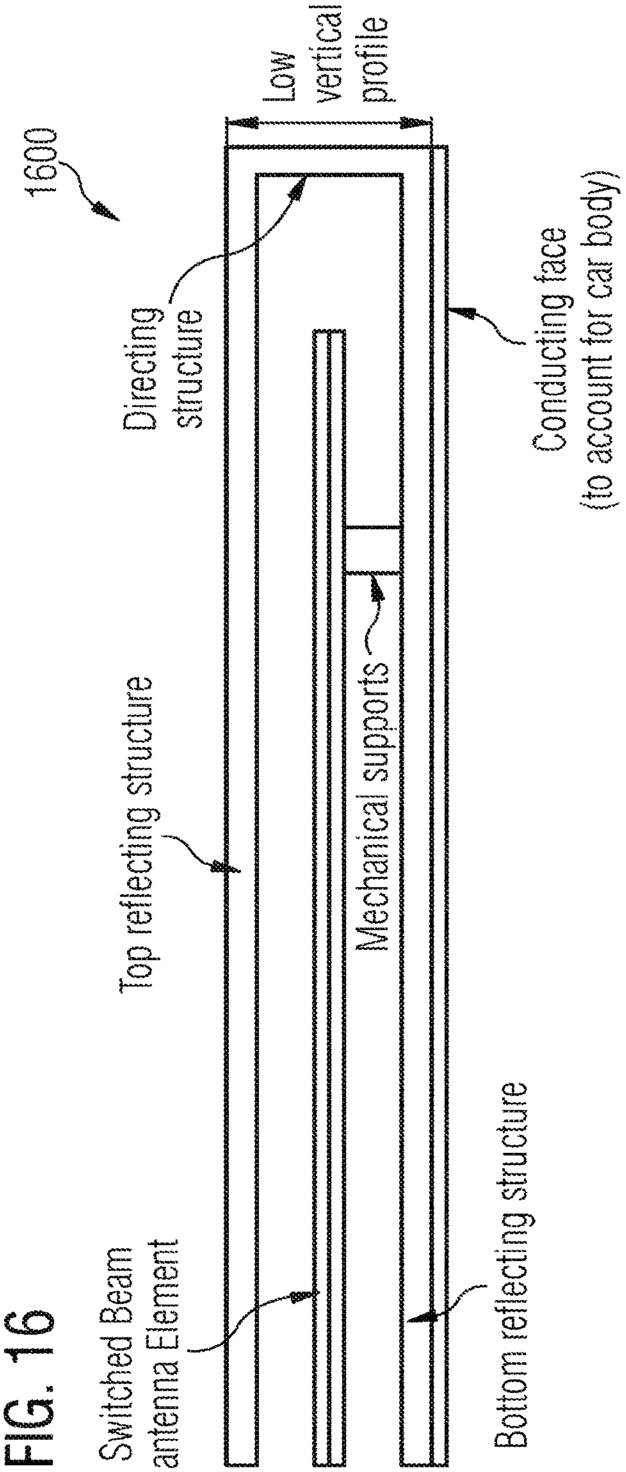
FIG. 16 shows a cross-section view of an exemplary housing with signal enhancing and environmental protective elements according to at least one exemplary embodiment.

FIG. 16 shows a cross-section view 1600 of an exemplary housing with signal enhancing and environmental protective elements. The housing may include a top-reflecting structure, a directing structure, a bottom reflecting structure, as well as mechanical supports to support the switched beam antenna array elements. Furthermore, a conducting face may be provided which faces the vehicle body. The overall vertical dimension may be in the range of about 6 mm to about 10 mm depending on the frequencies of interest.

Figure 17:
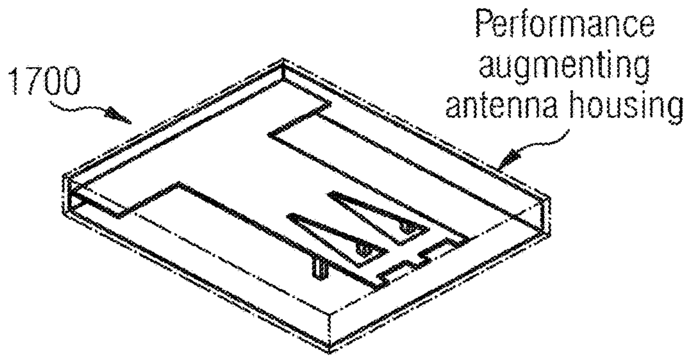
FIG. 17 shows an exemplary illustration of an (ATSA) antenna element surrounded by a performance enhancing housing according and graphs according to at least one exemplary embodiment.
Figure 17:
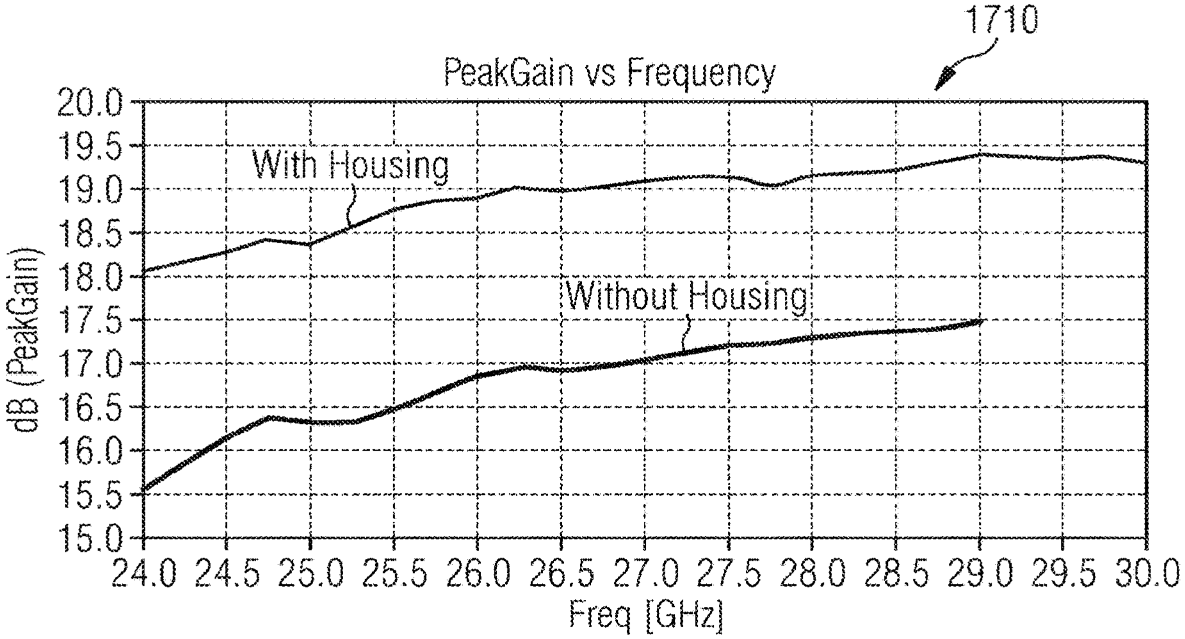
Figure 17:
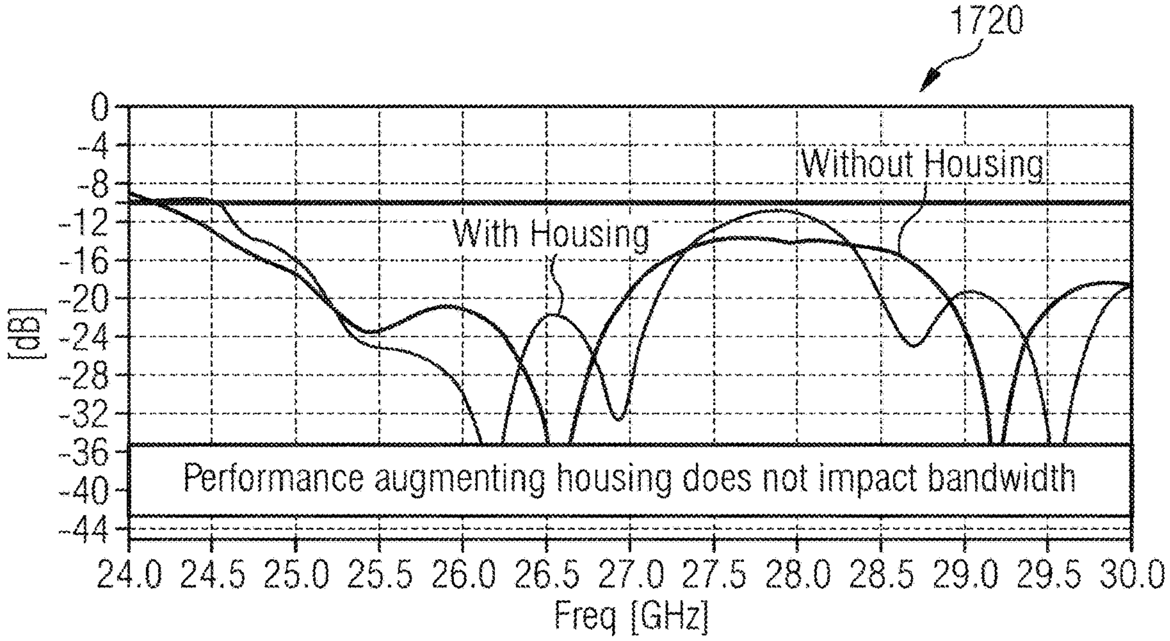

FIG. 17 shows an exemplary illustration of an ATSA antenna element surrounded by a performance enhancing housing according to some aspects and two graphs 1710-1720. The first graph 1710 showing results of a peak gain vs. frequency of the antenna element with the housing and without the housing. As can be seen in 1710, the housing improves the peak gain of the signal by 2-3 dB while also affording protection to the antenna structure from environmental factors. And, as can be seen in 1720, the housing does not impact the overall bandwidth of the switched beam antenna array structure.

Figure 18:
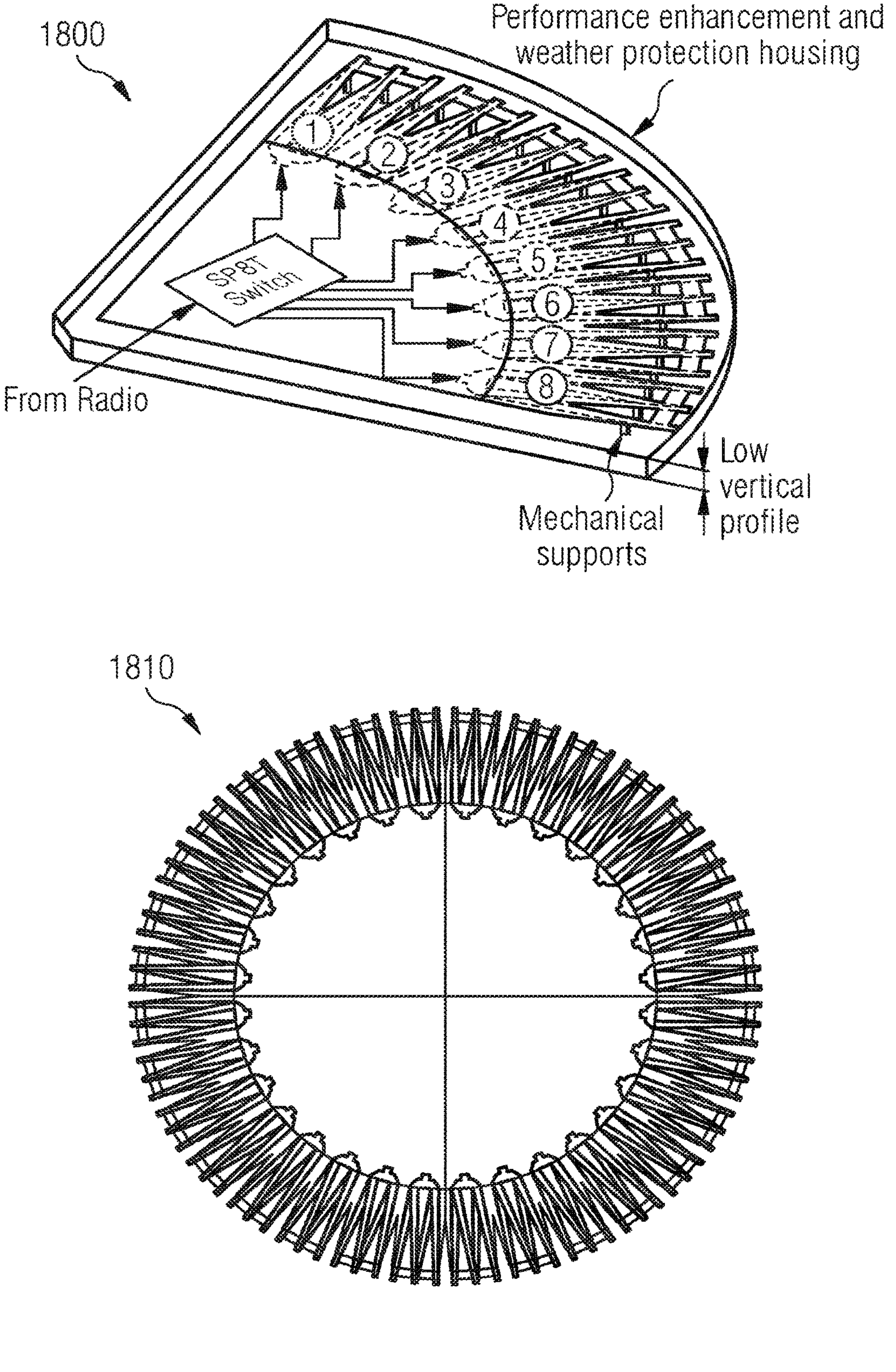
FIG. 18 shows an exemplary perspective view of a quadrant of an exemplary switched beam antenna array structure enclosed in a housing according and an exemplary top view 1810 of an exemplary entire switched beam antenna array structure according to at least one exemplary embodiment of the present disclosure.

FIG. 18 shows an exemplary perspective view 1800 of a quadrant of a switched beam antenna array structure enclosed in a housing according to some aspects and an exemplary top view 1810 of an entire switched beam antenna array structure according to some aspects. In 1810, the housing is hidden in order to appreciate the switched beam antenna array structure in greater detail. As can be seen in 1810, the switched beam antenna array may a circular shape consisting of four quadrants, wherein each quadrant has eight ATSA elements as described in FIG. 15. It is appreciated that other components of the overall antenna structure (e.g., the phase antenna array, the switches and interconnections for the switched beam ATSA elements) are not pictured in this illustration.

Figure 19:
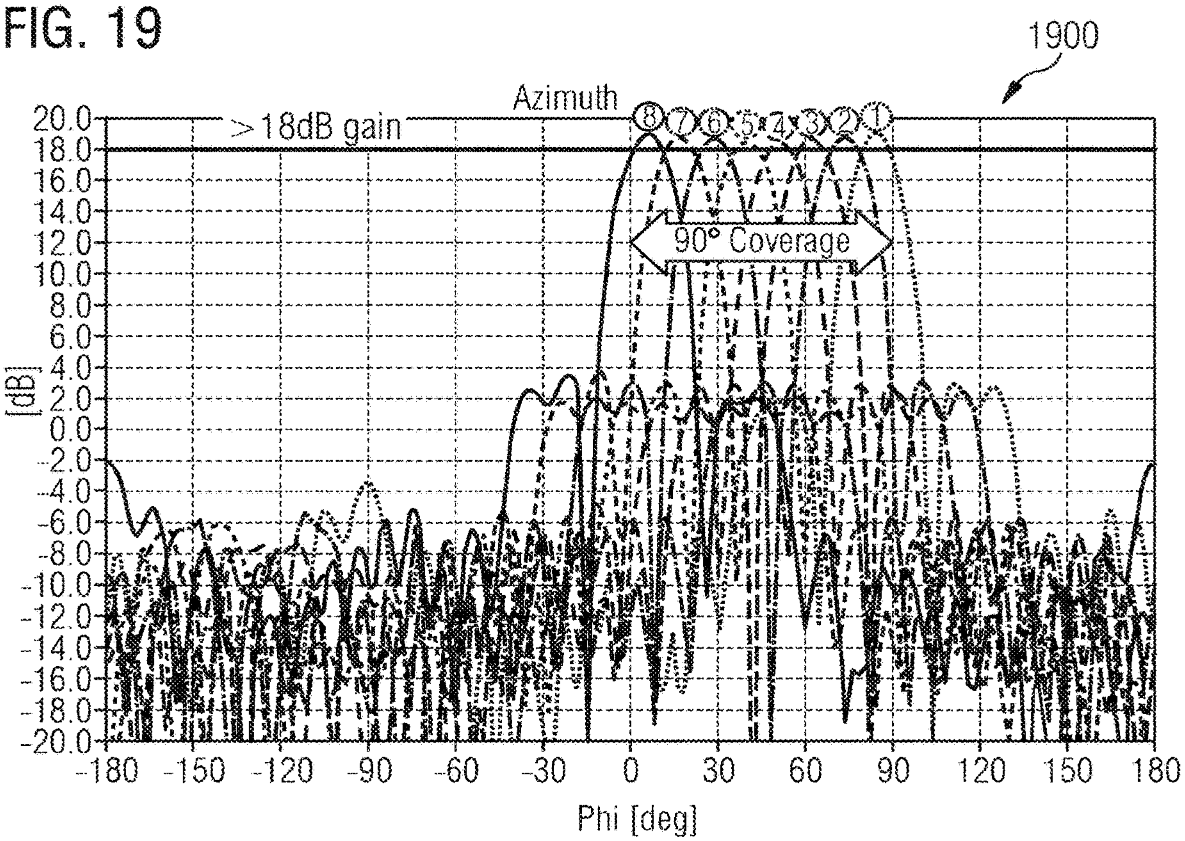
FIG. 19 shows graphs showing radiation patterns according to at least one exemplary embodiment.
Figure 19:
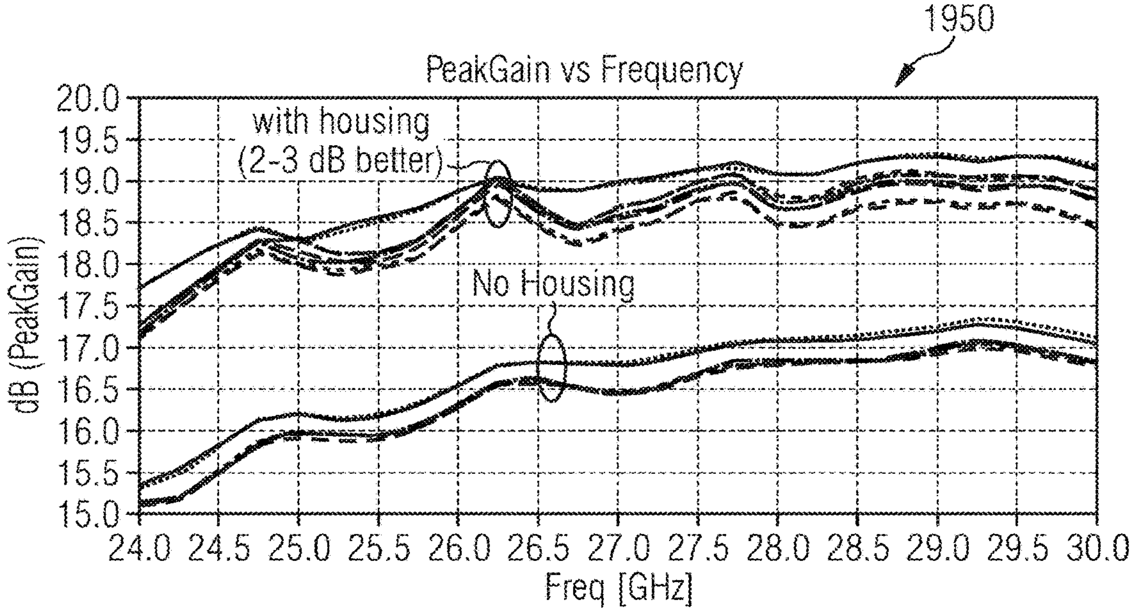

FIG. 19 shows two graphs 1900 and 1950 according to some aspects. Graph 1900 depicts the azimuth gain pattern for each of the eight ATSA elements in a quadrant of a switched beam array. As can be seen, the quadrant of the switched beam array provides greater than 18 dB gain at 90 degrees of coverage. Accordingly, 360 degrees of coverage may be attained with four quadrants as described herein. Graph 1950 shows results illustrating that the housing provides increases peak gains of 2-3 dBs for the switched beam antenna array when compared to the switched beam antenna array without the housing.

Figure 20:
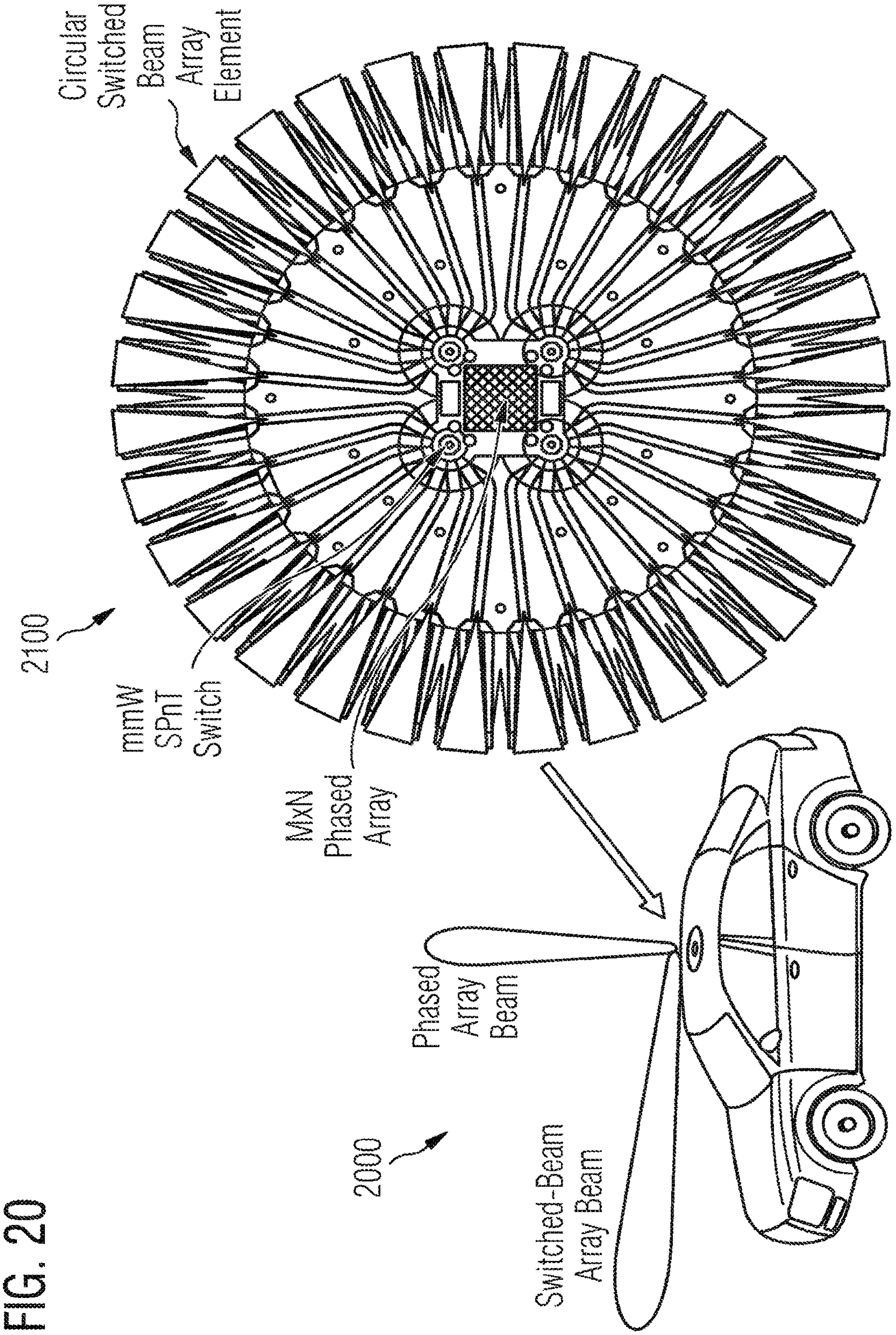
FIG. 20 shows an illustration of the on-roof combination antenna structure system topology on a vehicle and a top view of an exemplary combination antenna structure according to at least one exemplary embodiment.

FIG. 20 shows an illustration of the on-roof combination antenna structure system topology on a vehicle 2000 and a top view of a combination antenna structure 2100 according to some aspects. The M×N phased array may be configured to project and steer a beam above the vehicle and the circular switched beam array elements may be configured to project beams in directions around the vehicle. The combined phase array and switched beam architecture ensures 360 degree coverage without blind spots in the azimuth of the integrated structure. The steerable M×N phase array in combination with the tiltable switched beam elevation beam width (as described, for example, in FIG. 11) provides coverage for the entire 180 degree hemispherical region above the vehicle.

Figure 21:
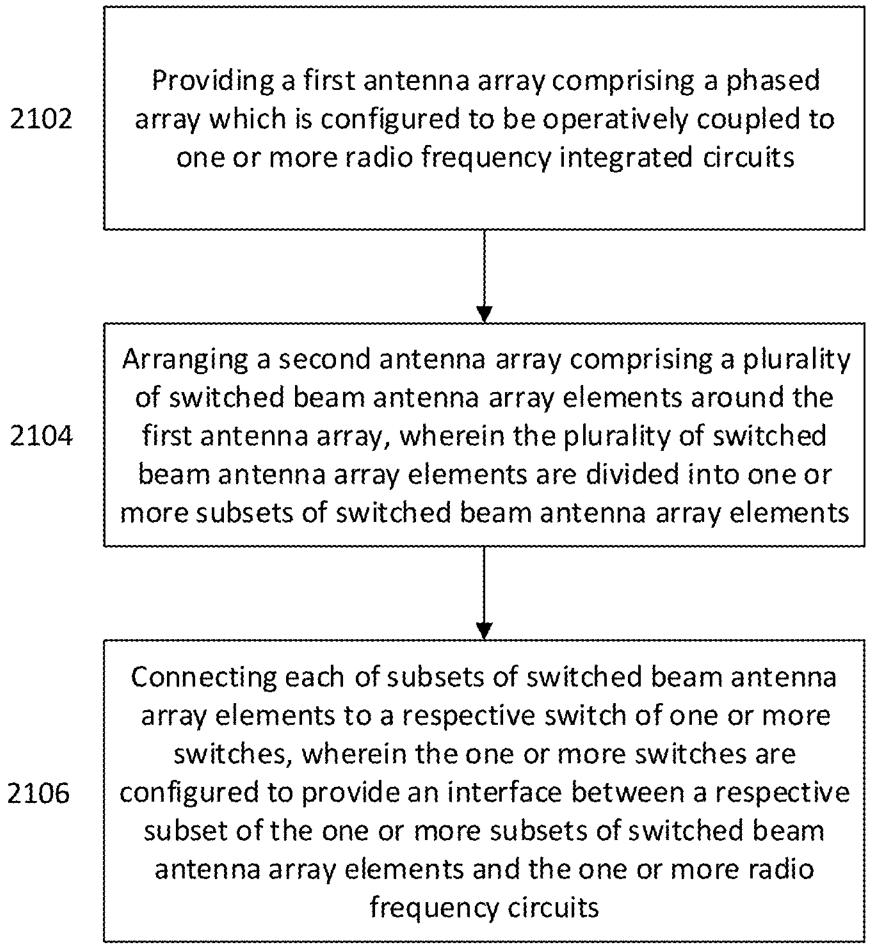
FIG. 21 shows an exemplary flowchart for a method of manufacturing a combination antenna array structure according to at least one exemplary embodiment.

FIG. 21 shows an exemplary flowchart 2100 describing a method of manufacturing a combination antenna array structure according to some aspects.

The method may include providing a first antenna array comprising a phased array which is configured to be operatively coupled to one or more radio frequency integrated circuits 2102; arranging a second antenna array comprising a plurality of switched beam antenna array elements around the first antenna array, wherein the plurality of switched beam antenna array elements are divided into one or more subsets of switched beam antenna array elements 2104; and connecting each of subsets of switched beam antenna array elements to a respective switch of one or more switches, wherein the one or more switches are configured to provide an interface between a respective subset of the one or more subsets of switched beam antenna array elements and the one or more radio frequency circuits 2106. The method may further include steps similar to those features described herein.

Figure 22:
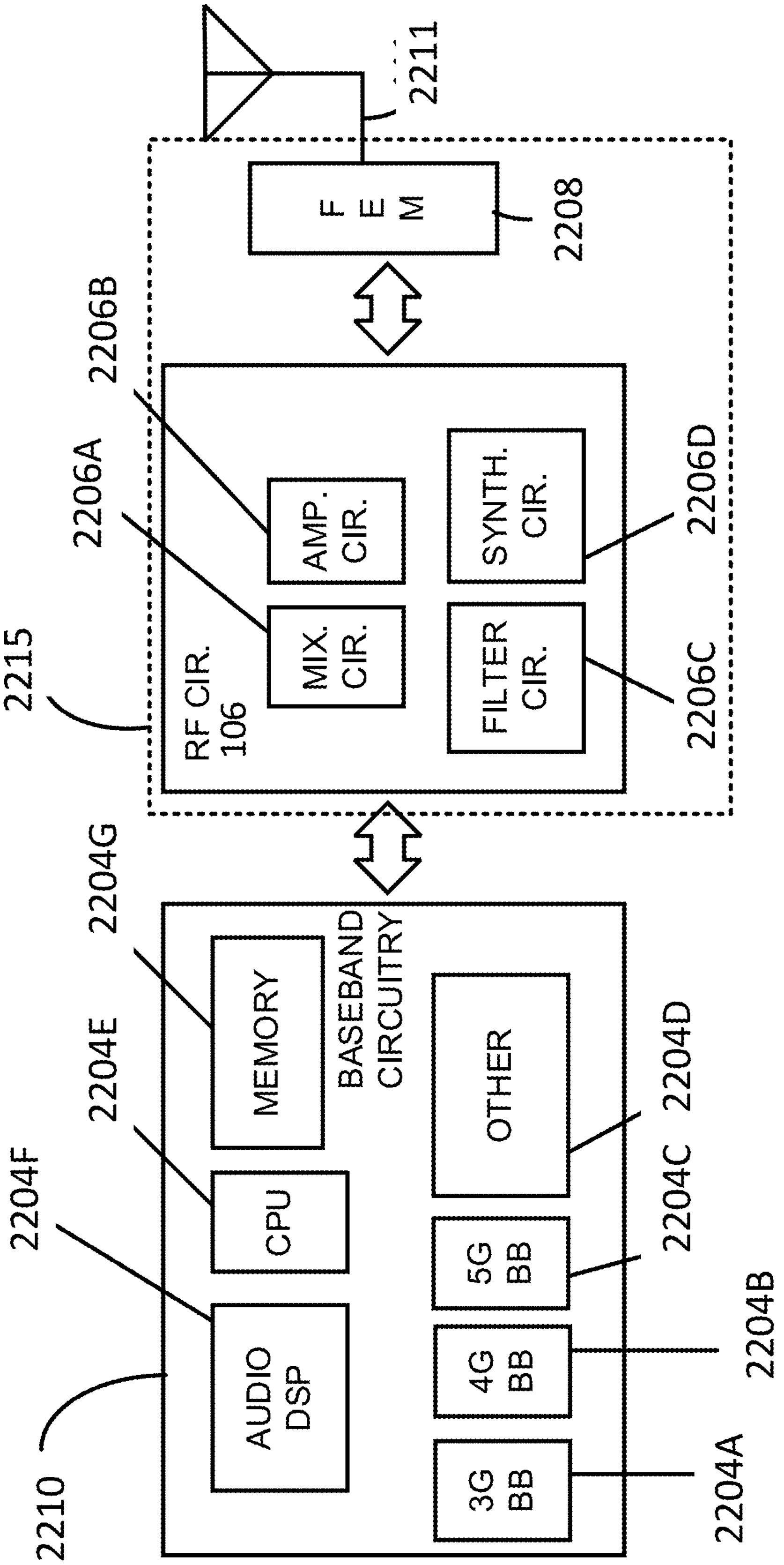
FIG. 22 shows an exemplary radio according to at least one exemplary embodiment of the present disclosure.

FIG. 22, shows according to an exemplary embodiment, an exemplary a radio module 2200. The radio module 2200 may, for example, include components such as of baseband circuitry 2210 and radio circuitry (e.g., radio front end modules (RFEM) 2215) in accordance with some embodiments.

As shown, the RFEM 2215 may include Radio Frequency (RF) circuitry 2206, front-end module (FEM) circuitry 2208, one or more antennas 2211 coupled together at least as shown.

The baseband circuitry 2210 may include circuitry such as, but not limited to, one or more single-core or multi-core processors. The baseband circuitry 2210 may include one or more baseband processors or control logic to process baseband signals received from a receive signal path of the RF circuitry 2206 and to generate baseband signals for a transmit signal path of the RF circuitry 2206. Baseband processing circuitry 2210 may interface the application circuitry for generation and processing of the baseband signals and for controlling operations of the RF circuitry 2206. For example, in some embodiments, the baseband circuitry 2210 may include a third generation (3G) baseband processor 2204A, a fourth generation (4G) baseband processor 2204B, a fifth generation (5G) baseband processor 2204C, or other baseband processor(s) 2204D for other existing generations, generations in development or to be developed in the future (e.g., second generation (2G), sixth generation (6G), etc.). The baseband circuitry 2210 (e.g., one or more of baseband processors 2204A-D) may handle various radio control functions that enable communication with one or more radio networks via the RF circuitry 2206. In other embodiments, some or all of the functionality of baseband processors 2204A-D may be included in modules stored in the memory 2204G and executed via a Central Processing Unit (CPU) 2204E. The radio control functions may include, but are not limited to, signal modulation/demodulation, encoding/decoding, radio frequency shifting, etc. In some embodiments, modulation/demodulation circuitry of the baseband circuitry 2210 may include Fast-Fourier Transform (FFT), precoding, or constellation mapping/demapping functionality. In some embodiments, encoding/decoding circuitry of the baseband circuitry 2210 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2210 may include one or more audio digital signal processor(s) (DSP) 2204F. The audio DSP(s) 2204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2210 and application circuitry may be implemented together such as, for example, on a system on a chip (SoC).

In some embodiments, the baseband circuitry 2210 may provide for communication compatible with one or more radio technologies. For example, in some embodiments, the baseband circuitry 2210 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 2210 is configured to support radio communications of more than one wireless protocol may be referred to as multi-mode baseband circuitry.

RF circuitry 2206 may enable communication with wireless networks using modulated electromagnetic radiation through a non-solid medium. In various embodiments, the RF circuitry 2206 may include switches, filters, amplifiers, etc. to facilitate the communication with the wireless network. RF circuitry 2206 may include a receive signal path which may include circuitry to down-convert RF signals received from the FEM circuitry 2208 and provide baseband signals to the baseband circuitry 2210. RF circuitry 2206 may also include a transmit signal path which may include circuitry to up-convert baseband signals provided by the baseband circuitry 2210 and provide RF output signals to the FEM circuitry 2208 for transmission.

In some embodiments, the receive signal path of the RF circuitry 2206 may include mixer circuitry 2206A, amplifier circuitry 2206B and filter circuitry 2206C. In some embodiments, the transmit signal path of the RF circuitry 2206 may include filter circuitry 2206C and mixer circuitry 2206A. RF circuitry 2206 may also include synthesizer circuitry 2206D for synthesizing a frequency for use by the mixer circuitry 2206A of the receive signal path and the transmit signal path. In some embodiments, the mixer circuitry 2206A of the receive signal path may be configured to down-convert RF signals received from the FEM circuitry 2208 based on the synthesized frequency provided by synthesizer circuitry 2206D. The amplifier circuitry 2206B may be configured to amplify the down-converted signals and the filter circuitry 2206C may be a low-pass filter (LPF) or band-pass filter (BPF) configured to remove unwanted signals from the down-converted signals to generate output baseband signals. Output baseband signals may be provided to the baseband circuitry 2210 for further processing. In some embodiments, the output baseband signals may be zero-frequency baseband signals, although this is not a requirement. In some embodiments, mixer circuitry 2206A of the receive signal path may include passive mixers, although the scope of the embodiments is not limited in this respect.

In some embodiments, the mixer circuitry 2206A of the transmit signal path may be configured to up-convert input baseband signals based on the synthesized frequency provided by the synthesizer circuitry 2206D to generate RF output signals for the FEM circuitry 2208. The baseband signals may be provided by the baseband circuitry 2210 and may be filtered by filter circuitry 2206C.

In some embodiments, the mixer circuitry 2206A of the receive signal path and the mixer circuitry 2206A of the transmit signal path may include two or more mixers and may be arranged for quadrature downconversion and upconversion, respectively. In some embodiments, the mixer circuitry 2206A of the receive signal path and the mixer circuitry 2206A of the transmit signal path may include two or more mixers and may be arranged for image rejection (e.g., Hartley image rejection). In some embodiments, the mixer circuitry 2206A of the receive signal path and the mixer circuitry 2206A may be arranged for direct downconversion and direct upconversion, respectively. In some embodiments, the mixer circuitry 2206A of the receive signal path and the mixer circuitry 2206A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2206 may include analog-to-digital converter (ADC) and digital-to-analog converter (DAC) circuitry and the baseband circuitry 2210 may include a digital baseband interface to communicate with the RF circuitry 2206.

In some dual-mode embodiments, a separate radio IC circuitry may be provided for processing signals for each spectrum, although the scope of the embodiments is not limited in this respect.

In some embodiments, the synthesizer circuitry 2206D may be a fractional-N synthesizer or a fractional N/N+1 synthesizer, although the scope of the embodiments is not limited in this respect as other types of frequency synthesizers may be suitable. For example, synthesizer circuitry 2206D may be a delta-sigma synthesizer, a frequency multiplier, or a synthesizer including a phase-locked loop with a frequency divider.

The synthesizer circuitry 2206D may be configured to synthesize an output frequency for use by the mixer circuitry 2206A of the RF circuitry 2206 based on a frequency input and a divider control input. In some embodiments, the synthesizer circuitry 2206D may be a fractional N/N+1 synthesizer.

In some embodiments, frequency input may be provided by a voltage controlled oscillator (VCO), although that is not a requirement. Divider control input may be provided by either the baseband circuitry 2210 or an applications processor depending on the desired output frequency. In some embodiments, a divider control input (e.g., N) may be determined from a look-up table based on a channel indicated by an applications processor.

Synthesizer circuitry 2206D of the RF circuitry 2206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2206D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2206 may include an IQ/polar converter.

FEM circuitry 2208 may include a receive signal path which may include circuitry configured to operate on RF signals received from one or more antennas 2211, amplify the received signals and provide the amplified versions of the received signals to the RF circuitry 2206 for further processing. FEM circuitry 2208 may also include a transmit signal path which may include circuitry configured to amplify signals for transmission provided by the RF circuitry 2206 for transmission by one or more of the one or more antennas 2211. In various embodiments, the amplification through the transmit or receive signal paths may be done solely in the RF circuitry 2206, solely in the FEM 2208, or in both the RF circuitry 2206 and the FEM 2208.

In some embodiments, the FEM circuitry 2208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 2206). The transmit signal path of the FEM circuitry 2208 may include a power amplifier (PA) to amplify input RF signals (e.g., provided by RF circuitry 2206), and one or more filters to generate RF signals for subsequent transmission (e.g., by one or more of the one or more antennas 511).

Processors of the application circuitry and processors of the baseband circuitry 2210 may be used to execute elements of one or more instances of a protocol stack. For example, processors of the baseband circuitry 2210, alone or in combination, may be used execute Layer 3, Layer 2, or Layer 1 functionality, while processors of the baseband circuitry 2210 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data convergence protocol (PDCP) layer, described in further detail below. As referred to herein, Layer 1 may include a physical (PHY) layer of a UE/RAN node, described in further detail below.

As discussed above, the baseband circuitry may include one or more processors and at least memory 2204G utilized by said processors. Each of the processors 2204A-104E may include a memory interface, respectively, to send/receive data to/from the memory 2204G.

Figure 26:
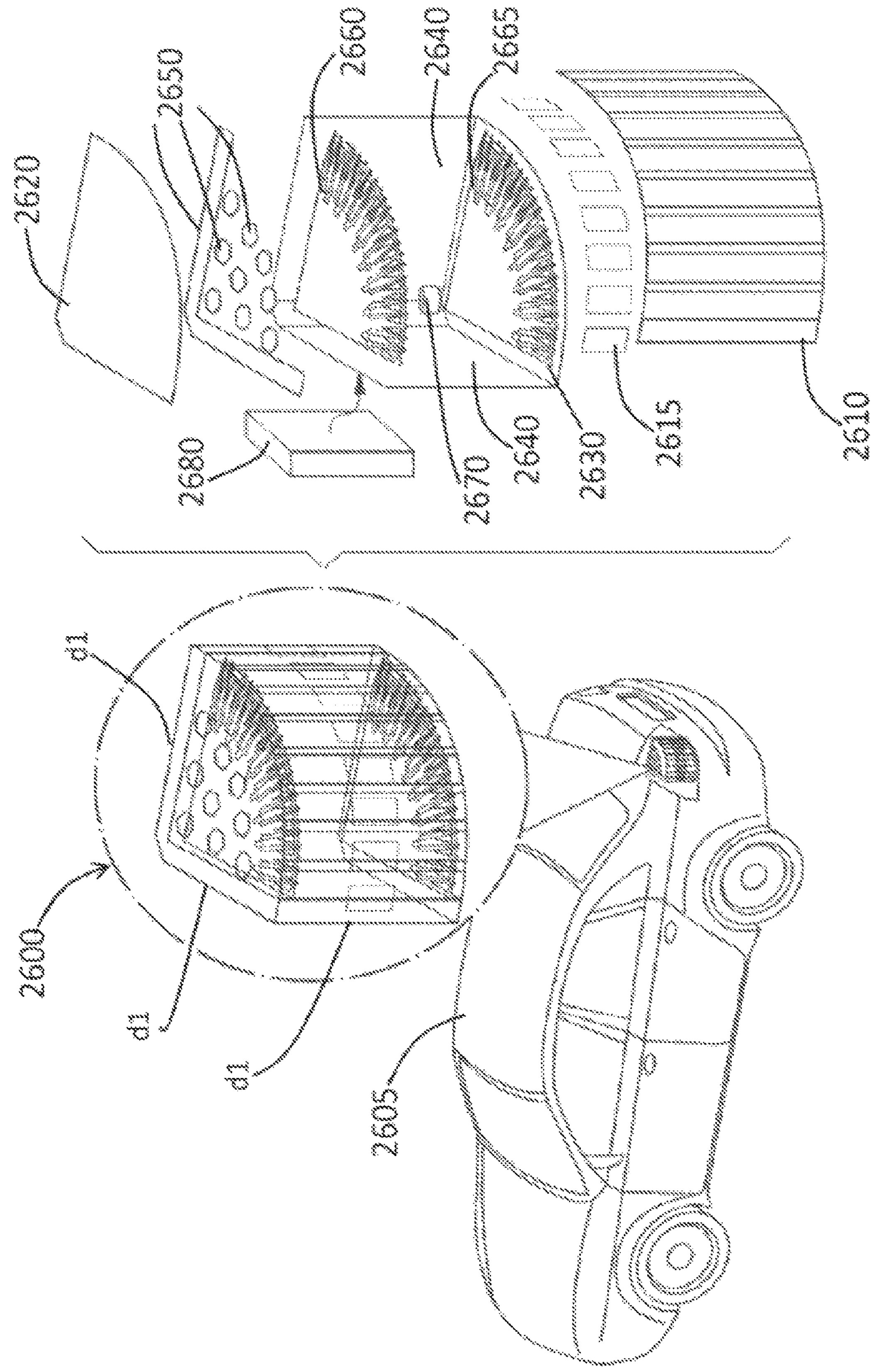
FIG. 26 shows an exemplary light assembly according to at least one exemplary embodiment of the present disclosure.

The baseband circuitry 2210 may further include one or more interfaces to communicatively couple to other circuitries/devices (e.g., an interface to send/receive data to/from memory external to the baseband circuitry 310/40), an application circuitry interface (e.g., an interface to send/receive data to/from the application circuitry), an RF circuitry interface (e.g., an interface to send/receive data to/from RF circuitry 2206 of FIG. 26), a wireless hardware connectivity interface (e.g., an interface to send/receive data to/from Near Field Communication (NFC) components, Bluetooth® components (e.g., Bluetooth® Low Energy), Wi-Fi® components, and other communication components), and a power management interface.

Figure 23A:
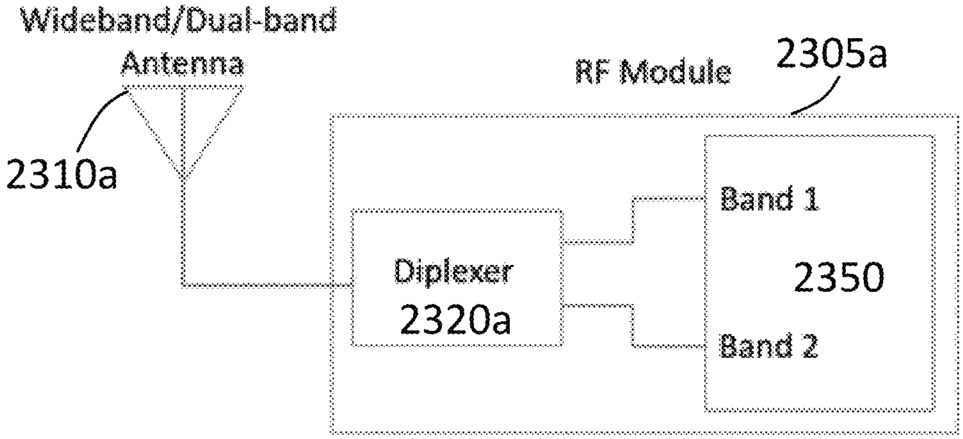
FIGS. 23A-C show exemplary radio circuitry according to at least one exemplary embodiment of the present disclosure.
Figure 23B:
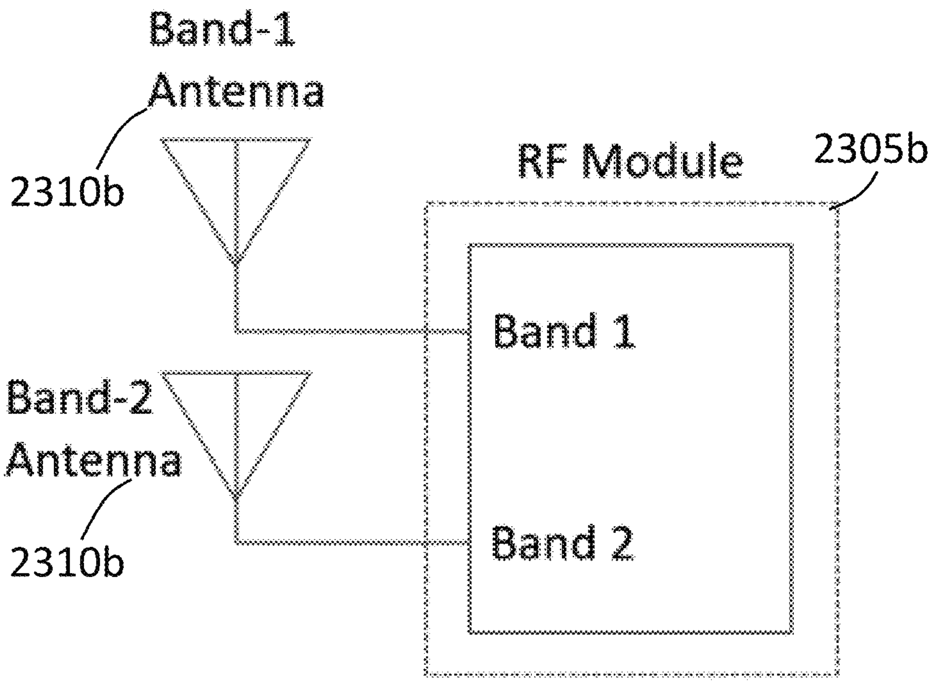
Figure 23C:
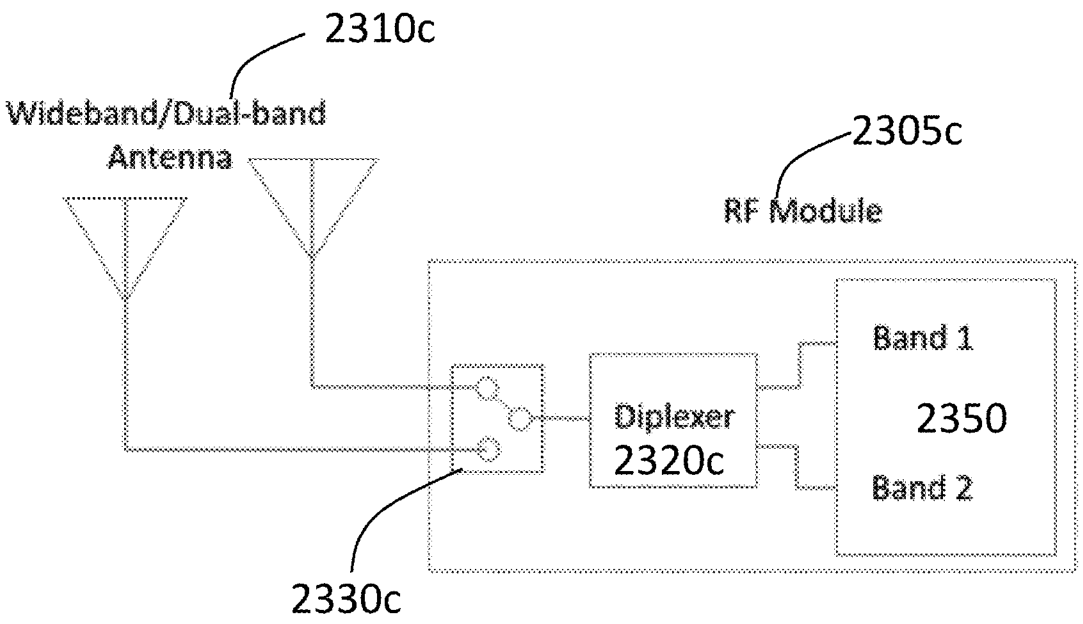

In various embodiments of the present disclosure, radio circuitry may include different ways to provide service over two different communication standards operating at two different frequency bands. FIGS. 23A-C show various aspects of radio circuitry in accordance with exemplary embodiments.

FIG. 23A shows according to at least on exemplary embodiment of the present disclosure a configuration of an antenna and RF module. In the example of FIG. 23A, a wideband and/or multiband antenna (e.g., two-band antenna, three-band antenna, etc.) 2310*a* is coupled to a RF module 2305*a* that includes a diplexer 2320*a*. The antenna 2310*a* may transmit and/or receive signals in at least two different bands which can be combined by the diplexer 2320*a*. The diplexer 2320*a* can be implemented at an output of the RF module. The diplexer 2320*a* may be coupled to other RF components, designated 2350. The RF module 2305*a* and the antenna 2310*a* may be connected to each other through any suitable means, such as, for example RF cables.

FIG. 23B shows according to at least on exemplary embodiment of the present disclosure another configuration of antenna and RF module. In the example of FIG. 23B, multiple single band antennas 2310*b* are coupled to the RF module 2305*b*. In the case of FIG. 23B, two single band antennas are displayed, but other quantities of antennas may be used (e.g., three single band antennas). Each antenna of the multiple single band antennas 2310*b* may be directly connected to the RF module 2305*b*. Accordingly, instead of combining two or more signals (as is the case of FIG. 23A), the configuration of FIG. 23B may be instead provide a separate antenna for each provided or used band. The RF module 2305*b* may separately process the signal from each band.

FIG. 23C shows according to at least on exemplary embodiment of the present disclosure yet another configuration of antennas and RF module. In the example of FIG. 23C, multiple wideband/multi-band antennas 2310*c* are coupled to the RF module 2305*c*. The RF module 2305*c* may include a switch 2330*c* and diplexer 2320*c*. The exemplary configuration of FIG. 23C can be used with the switch 2330*c* so as to enable beam selecting topology to further enable better performance (e.g., better coverage and/or better signal-to-noise ratio (SNR)).

Figure 24:
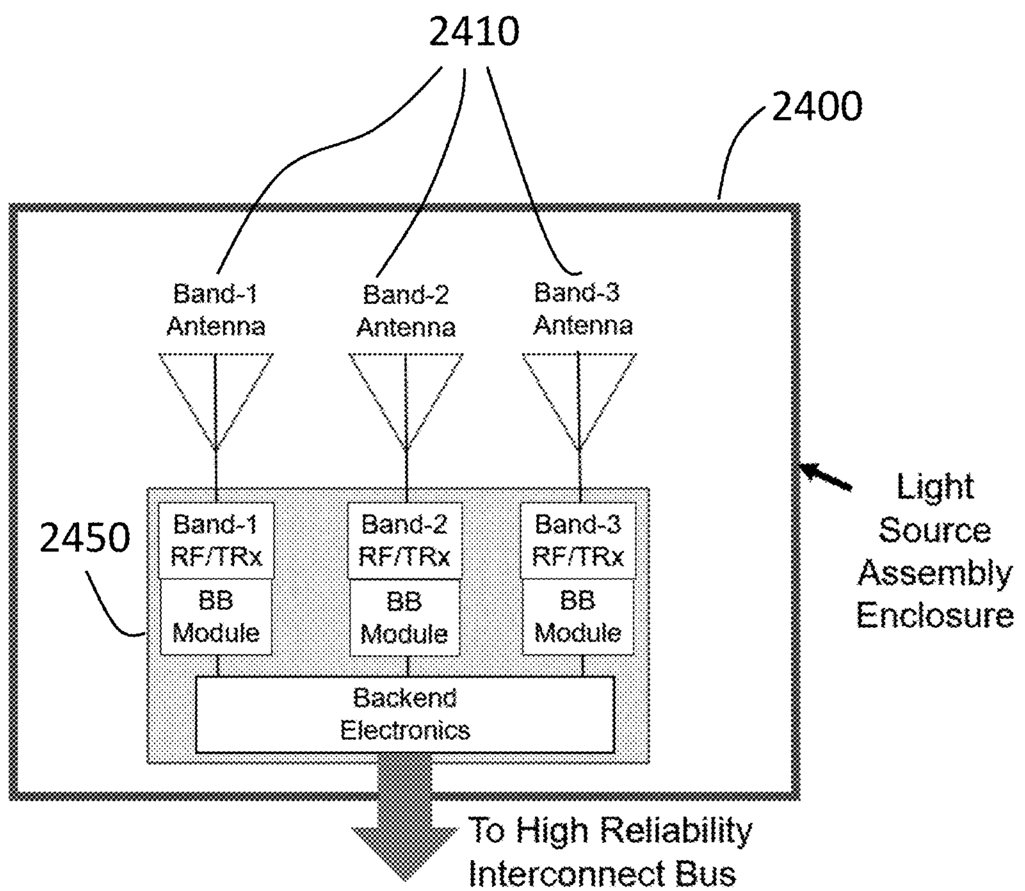
FIG. 24 shows an exemplary light source enclosure according to at least one exemplary embodiment of the present disclosure.

As shown in the exemplary embodiment FIG. 24, various examples of the present disclosure relate to integration of antennas, radios, backend modules, and/or other related components contained within a single individual light source assembly. That is a light source assembly may include an enclosure 2400 that may house or incorporate one or more antenna 2410. Additionally, the housing may include or incorporate radio circuitry 2450, which may include RF circuitry (e.g., RF front end components) baseband circuitry, and backend electronics. In the example of FIG. 24, the enclosure includes three separate antennas that may operate collectively, e.g., operate with transmit and/or reception diversity or may operate in a MIMO mode/scheme. In other examples, the antennas may each operate at different frequency band. For example, antennas 2410 may respectively operate in bands 1, 2, 3, which can respectively be, for example, 0.5-0.9 GHz, 1.5-3.7 GHz, 5-7 GHz. While FIG. 24 shows only three bands other amounts and different frequencies ranges may be used and considered.

The radio or radio components described in connection with FIGS. 23A-C and FIG. 24, or sub-combinations thereof, may be included in radio or radio modules described in connection in various embodiments of the present disclosure.

In accordance with various embodiments of the disclosure, multi-standard antennas may be developed or formed within the light source assembly parts and enclosures. Multi-band radios with backend electronics may be contained within one individual light source assembly. A light source assembly embedded with antenna and radio/backend assemblies may be easily assembled with mechanical manufacturing procedures and thereby substantially reducing the automotive manufacturing costs. Depending on the complexity of multi-standard radio modules, some of the backend electronics and computing parts can be also placed outside the light assembly enclosure connected by very low-frequency/digital cables/wires.

Figure 25:
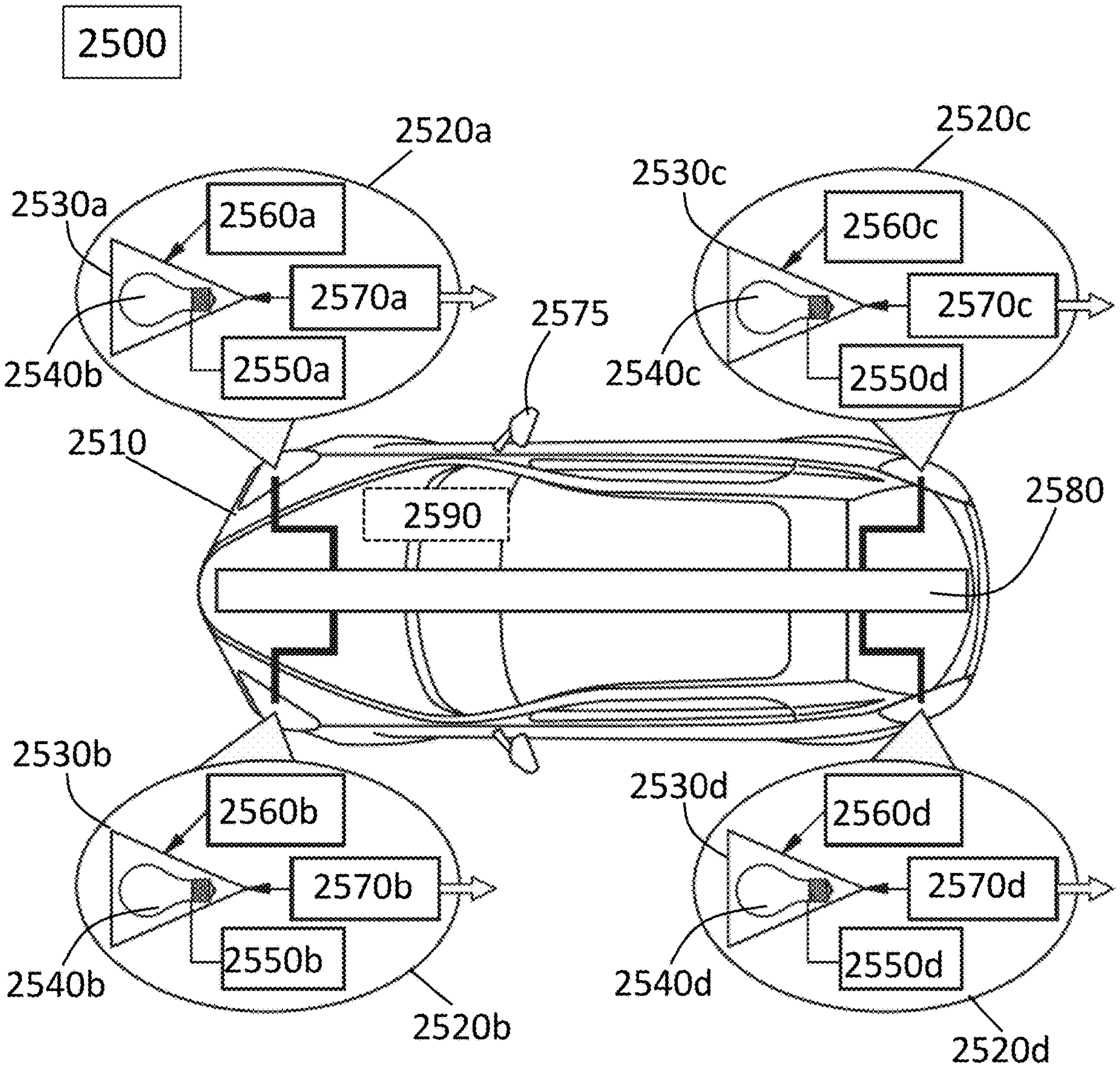
FIG. 25 shows an exemplary wireless communication system according to at least one exemplary embodiment of the present disclosure.

FIG. 25 shows according to at least one exemplary embodiment of the present disclosure, an exemplary wireless automotive or vehicular communication system 2500. FIG. 25, shows an exemplary vehicle 2510 incorporating a vehicular communication system 2500. The vehicle 2510 may be any suitable vehicle, e.g., car, truck, motorcycle, etc.

The communication system 2500 may include a plurality of vehicular lighting and communication assemblies. In the example of FIG. 25, vehicle 2510 includes the vehicular communication system 2500 having one or more lighting and communication assemblies 2520 (e.g., 2520*a*, 2520*b*, 2520*c*, and 2520*d*). The lighting and communication assemblies 2520 may include a light source assembly enclosure or a housing 2530 (e.g., 2530*a-d*), a light source 2540 (e.g., 2540*a-d*), a lighting control circuitry 2550 (e.g., 2550*a-d*), one or more (e.g., embedded) antennas 2560 (e.g., 2560*a-d*), and/or a radio module 2570 (2570*a-d*).

The light source assembly enclosure 2530 may be the housing for any type of vehicular lighting, such as headlights, taillights, stoplights, sidelights, etc. For example, as shown in FIG. 25, the light source assembly enclosure 2530*a* may be the housing or housing structure for a vehicular headlight. Similarly, the light source assembly enclosure 2530*c* may be the housing or housing structure for vehicular taillight. Similarly, the light source 2540 may be the lighting necessary for the particular type of light source assembly enclosure they are used for. For example, the light source 2540 may be any type of lighting or lamp (e.g., bulb(s), LED(s), etc.) for headlights, taillights, stoplights, sidelights 2575, etc. The lighting control circuitry 2550 may be provided for controlling the respective light source included in the respective light source assembly enclosure 2530.

Each lighting and communication assemblies may also include one or more antenna or one or more antenna elements 2560. The antenna element(s) 2560 may be integrated with and/or embedded with the light assembly housing, e.g., the light source assembly enclosure 2530. In one example, as may be described in other exemplary embodiments, one or more antenna elements may at least be partially integrated with the cover of lighting assembly.

Each of the lighting and communication assemblies 2520 may include radio and/or back end electronics 2570 or radio module 2570 or radio subsystem 2570. The radio module 2570 may include baseband and/or RF circuitry as described herein and/or other similar components. For example, the radio module may include components described in connection with FIGS. 1-3.

While FIG. 25 shows the components such as the lighting control 2550 and the radio module 2570 within the enclosure or housing 2530, this is not necessarily so, and such complements may be omitted or implemented elsewhere in the vehicle 2510 or vehicle communication system 2500.

In addition, the vehicular communication system 2510 may include an interconnect bus 2580. The interconnect bus 2580 may connect to some or all of the lighting and communication assemblies 2520 of the vehicular communication system 2510. The interconnect bus 2580 may be high-speed and/or a highly-reliable interconnect bus such as a FlexRay interconnect. Further, the vehicular communication system 2510 may also include a centralized radio control system 2590. The centralized radio control system 2590 may include hardware and/or software that interfaces and/or controls the radio functions of the various radio modules 2570. The centralized radio control system 2590 may include at least one processor and can connect the radio modules 2570 through the interconnect bus 2580.

The vehicular communication system 23500 may operate as a single, multi-standard radio communications system for the vehicle. The placement of light assemblies 2520 on and around a vehicle 2510 may provide for substantially 360-degree visibility with the radio subsystems require the same substantially 360-degree coverage. Thus, existing light assemblies may be used for the integration of these radio subsystems described herein.

The integration of radio subsystems within light assemblies consists of the disposition of multiple conducting structures (semi-transparent or not) and dielectric materials (semi-transparent or not) with dual function as wireless antenna and light diffusing/reflecting elements.

FIG. 26 shows a regular and exploded view of an exemplary light assembly according to at least one exemplary embodiment of the present disclosure. The light assembly 2600 may be a vehicular light assembly, e.g., for a taillight a vehicle 2605. The light assembly 2600 may include or be integrated with various radio elements. As shown in the example of FIG. 26, the light assembly 2600 may be shaped as a sector with dimensions of dl equal or substantially equal to 20 cm (8 inches). Other shapes and/or dimensions may be used in other examples.

As shown in FIG. 26, the light assembly 2600 includes a front housing or cover 2610. The front cover 2610 may a lens allowing optical light to shine through the front cover 2610. Further, the front cover 2610 may be configured as an antenna radome. That is, the front housing may protect the contents of the inside of the light assembly 2600 while also permitting electromagnetic waves (e.g., RF signals) to pass there through with minimal attenuation. That is, the front cover 2610 may then be configured as an electromagnetic waveguide or millimeter wave lens. Further, the front cover 2610 may act or be configured to diffuse and/or reflect optical light, e.g., in accordance with vehicle specification/needs.

In various embodiments, the front housing 2610 may include or incorporate one or more antenna elements 2615. In at least one example, one or more the antenna elements 2615 may be disposed on or against an inside surface of the front housing 2610. Further, the one or more antenna elements 2615 may be partially or completely embedded within the front housing.

In one or more embodiments, the one or more antenna elements 2615 may be an antenna array. Further, the antenna elements 2615 may also include optical features. For example, the one or more antenna elements 2615 may have such as a structure and/or material so as to be configured to diffuse and/or reflect optical light. The one or more antenna elements 2615 may be transparent, semi-transparent, and/or opaque.

As is further shown in the example of FIG. 26, the light assembly 2600 may include other housing elements, such as a top housing member 2620, a bottom housing member 2630, and one or more back or sidewall members 2640. These housing elements 2620-2640 may be implemented to reflect and/or diffuse light. In addition, these housing may also act as antenna elements. That, the surface may operate as antenna to electromagnetic waves (e.g., RF signals). Moreover, the elements 2620-2640 may include, integrate. or incorporate antenna elements. For example, the top housing 2620 may be included with antenna elements such as the antenna array 2650 and/or the end-launch antenna array 2660. Similarly, as shown in FIG. 26, the bottom housing member 2625 may act as antenna itself and/or include antenna elements, such as the end-launch antenna array 2665. In various examples, the antennas that may be incorporated in the light assemblies such as light assembly 2600, may be transparent or semi-transparent, and further may be able to reflect and/or diffuse optical light.

At least one light source 2670 (e.g., a light bulb, a LED, etc.) may be further included in the light assembly 2600. In FIG. 26, the light source may be included with the enclosure formed by the housing of the light assembly 2600. Further, the light assembly 2600 may include a radio module 2680. The radio module 2680 may include RF circuitry and other radio electronics or components as described herein. The radio module 2680 may include any suitable hardware and/or software to implement any communication method, or protocol described herein, including, e.g., cellular communication, vehicular communication (e.g., V2X), WiFi communication, etc.

The radio module 2680 may be connected or coupled (directly or indirectly) to the one or more antenna or antenna elements of the light assembly 2600. While in FIG. 26, the radio module may be positioned outside of the assembly 2600, in other embodiment, the radio module 2680 may be positioned inside.

Figure 27B:
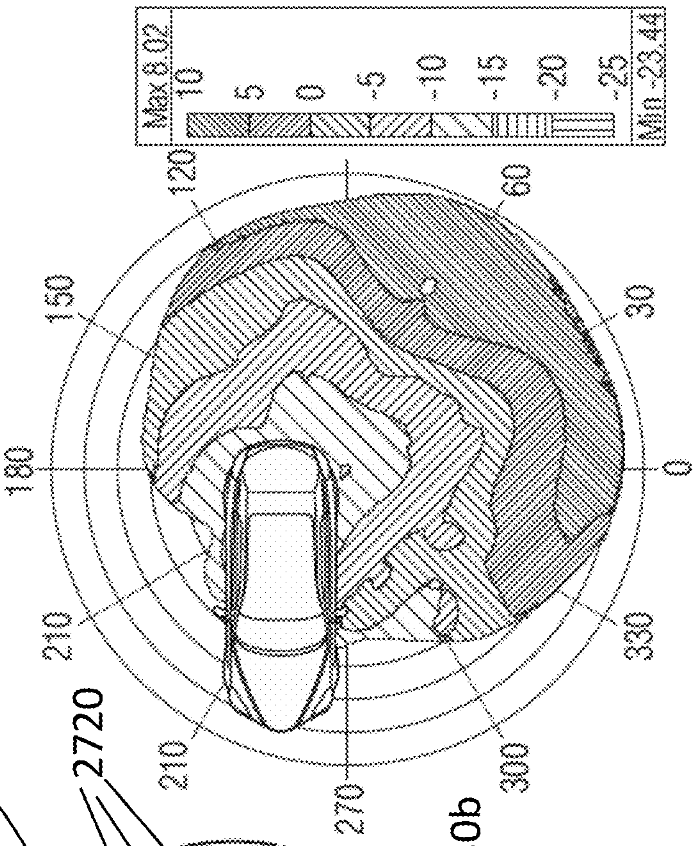
FIG. 27B and FIG. 27D show exemplary radiation plots respectively of the light assemblies of FIG. 27A and FIG. 27C.
Figure 27A:
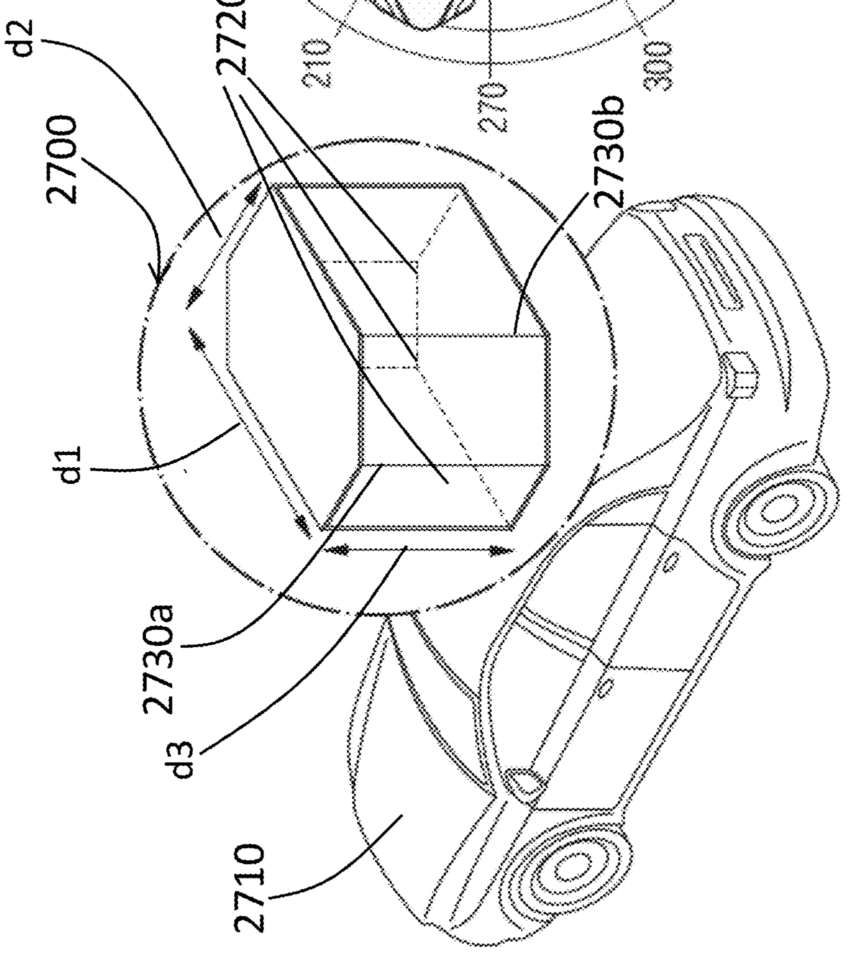
FIG. 27A and FIG. 27C shows exemplary light assemblies according to at least one exemplary embodiment of the present disclosure.

FIG. 27A shows a view of an exemplary vehicular light assembly according to at least one exemplary embodiment of the present disclosure. The vehicular light assembly 2700 may be a taillight assembly of a vehicle 2710. The light assembly 2700 may include or be integrated with various radio elements (e.g., antenna elements, radio module) and/or optical elements (light source, reflectors, diffusers, etc.).

As shown in the example of FIG. 27A, the light assembly 2700 may a front cover or lens 2720 include one or more bend sections such as bending sections 2730*a*, 2730*b*. In accordance with at least one exemplary embodiment of the present disclosure, an antenna element may be disposed in at least one of the one or more bend sections 2730*a*, 2730*b*.

In the example of FIG. 27A, each bend section 2730*a*-*b* may include a corner at the meeting of two sides of the front cover 2720. In the example of FIG. 27A, an antenna element, such as a wire antenna (e.g., a wire monopole antenna) may be located in or at the corner of at least one of the bend 2730*a*, *b*. That is, antenna element may be located in and extend along the corner. For example, given the location of the bending section of the light assembly 2700, and a thin wire with reduced thickness structure would be barely visible and have negligible impact in optical performance light assembly. Moreover, a thin monopole wire antenna or other antenna element may be implemented so as to be semi-transparent. The light assembly 2700 may include other components, such as other components described herein, e.g., optical reflectors, other types of antenna or conducting elements.

The light assembly may be any suitable size. In one example, the light assembly 2700 may have dimensions of d1 (lateral length) equal or substantially equal to 20 cm, d2 (e.g., depth) equal or substantially equal to 20 cm, and d3 (e.g., height) equal or substantially equal to 15 cm.

FIG. 27B, shows a simulated result of the light assembly 2700 including a wire monopole antenna operating at 1.9 GHz that is be concealed in the face of the tail light assembly as shown in FIG. 27A. The simulated results show a 90-degree sector may be covered with about 8 dB of gain.

Figure 27C:
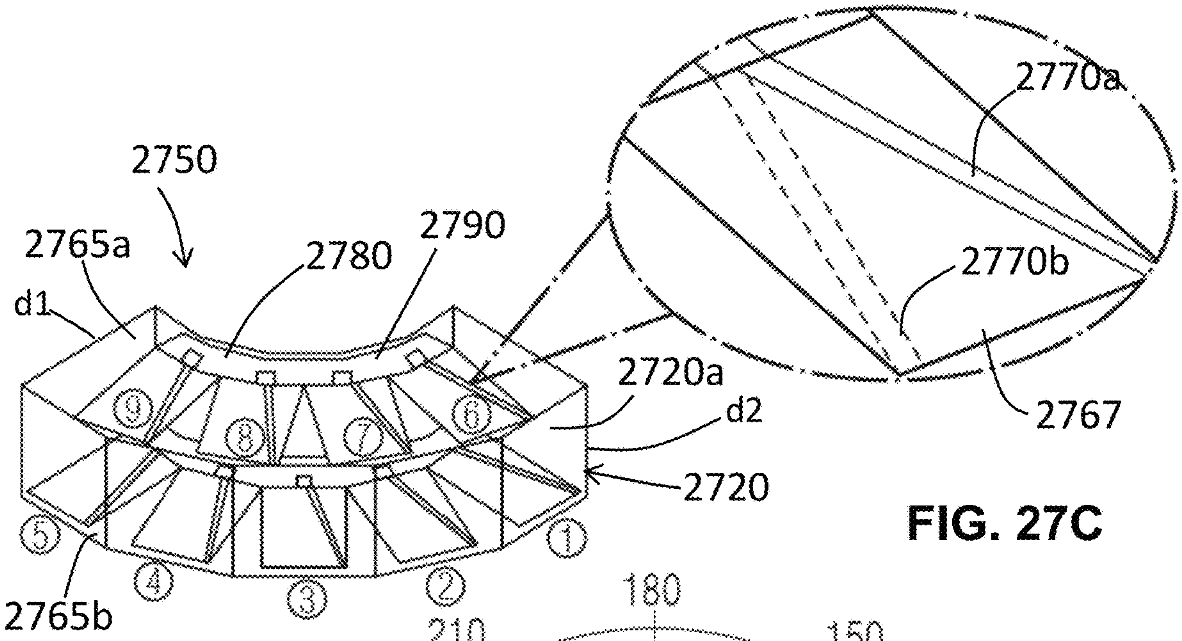

FIG. 27C shows a view of yet another exemplary vehicular light assembly 2750 in accordance with at least one exemplary embodiment of the present disclosure. The assembly 2750 may include one or more tapered slot antennas 2760. Each of the tapered slot antennas may be integrated or disposed against top and bottom housing, 2765*a*, *b* of the light assembly 2750. The light assembly may have a front cover 2720 includes one or more faces 2720*a*. The front cover 2720 and the top and bottom housing 2765*a* may each include or be made of transparent or semi-transparent materials.

Each tapered slot antenna, as shown in FIG. 27C, may include a top conducting strip 2770*a* and/or bottom 2770*b* conducting strip on opposites of a dielectric substrate 2767. The dielectric of the tapered antenna slots 2760 may be or include semi-transparent or transparent materials. The dielectric substrate 2767 including the conductive strips 2770 may be PCB antenna feed that may be connected to an antenna reference plane 2790. One tapered slot antenna may be used or, as shown in FIG. 27C, multiple tapered slot antennas 2760 may be implemented, which may operate an antenna array. That is, in the case of multiple tapered slot antennas being used, such antennas may be for diversity for MIMO due to increased gain by operating as an array. The example of FIG. 27C shows the light assembly 2750 having 9 different slot antennas. The light assembly 2700, in one example, may have depth (front to back) of d1 which is equal or substantially equal to 28 cm (11 inches) and may have a height d2 which is equal or substantially equal to 20 cm (8 inches).

Similar to the light assembly 2700, the light assembly 2750 may have bending sections that may include corner or sections where two sides of the cover meet at angle.

The light assemblies 2700 and 2750 The light assembly 2700 and 2750 may include other components, such as other components described herein, e.g., optical reflectors, other types of antenna or conducting elements. The antenna components or elements of the light assemblies 2700 and 2750 may be connected, directly or indirection, to one or more radio modules (not shown). Such radio modules may include RF circuitry.

Figure 27D:
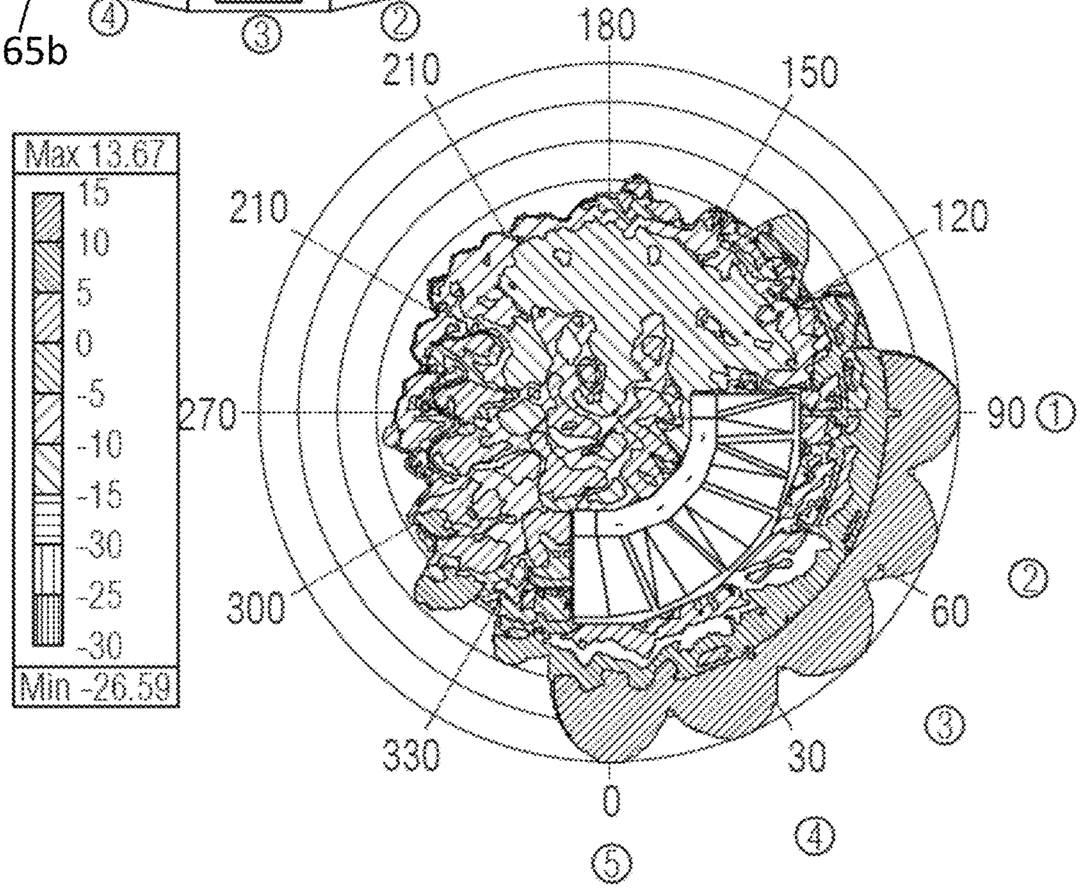

FIG. 27D shows simulated results of the performance of the light assembly 2750.

Figure 28:
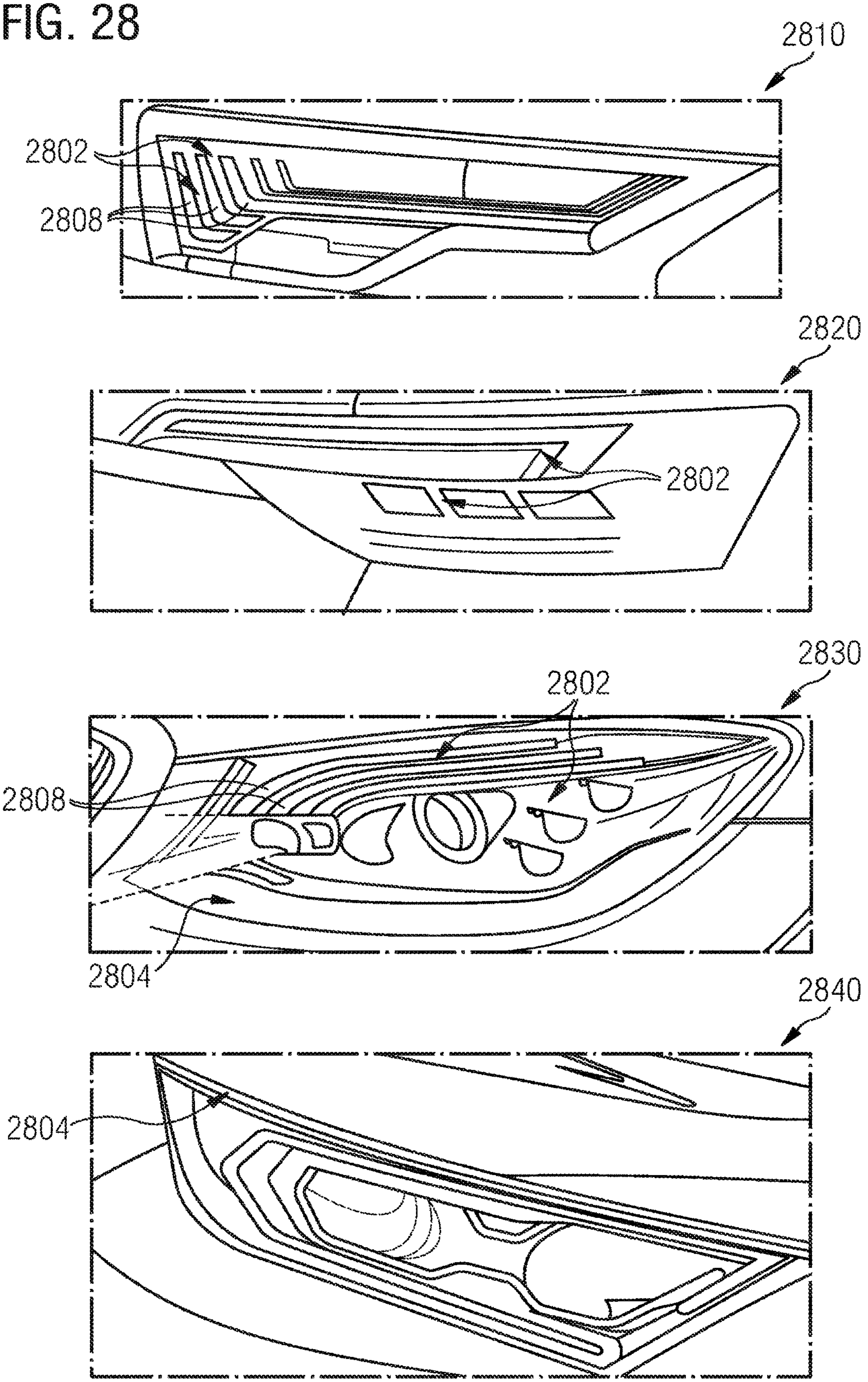
FIG. 28 shows exemplary light assemblies according to at least one exemplary embodiment of the present disclosure.

FIG. 28 shows views 2810, 2820, 2830, and 2840 of several vehicular light assemblies. As shown, taillight assemblies may include dark or black or near black areas. In the example of views 2810-2840, the various depicted light assemblies may have dark regions or lines 2802. These regions may be non-illuminated or low-illuminated sections of a cover or lens of a vehicle light assembly. That is, these areas may be configured to be darker and in contrast to other laminated areas 2808 of the lens or cover. In particular, the dark region or areas 2802 may appear as borders or separators to different light areas as in the exemplary views 2810-2840. These areas may indicate or delineate radiant portions of the vehicle light assembly.

Accordingly, these dark areas 2802 may substantially not allow light to pass through, e.g., may significantly attenuate light. They may also be located in bending sections or lines of the light assembly. Further, the dark areas may be implemented as a ring 2804 around or substantially around the periphery of the light assembly, e.g., around the periphery of a cover/lens of the light assembly, as shown in vies 2830 and 2840.

In one or more exemplary embodiments of the present disclosure, one or more antenna elements may be implemented within (e.g., completely or partially embedded) at the dark areas. For example, the one or more antenna elements may be positioned against or behind the dark areas, e.g., inside the light assembly but behind the dark areas. These antenna elements positioned at the dark areas may be concealed or not visible, or not easily visible from an external perspective (e.g., from outside the lighting assembly) due to the dark areas. Further, such antenna elements may be a conducting element that may be realized as opaque conducting strips or wires, or alternatively as semi-transparent conducting strips integrated, directly printed on, or positioned embedded in the light assembly cover.

Figure 29A:
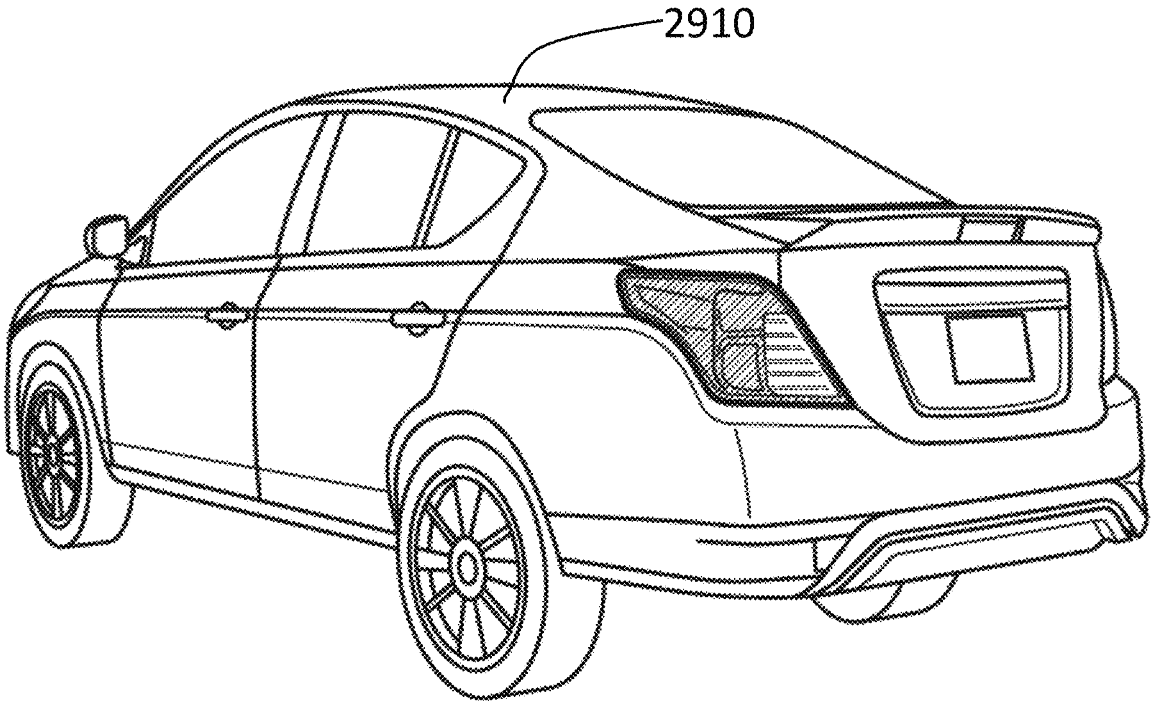
Figure 29B:
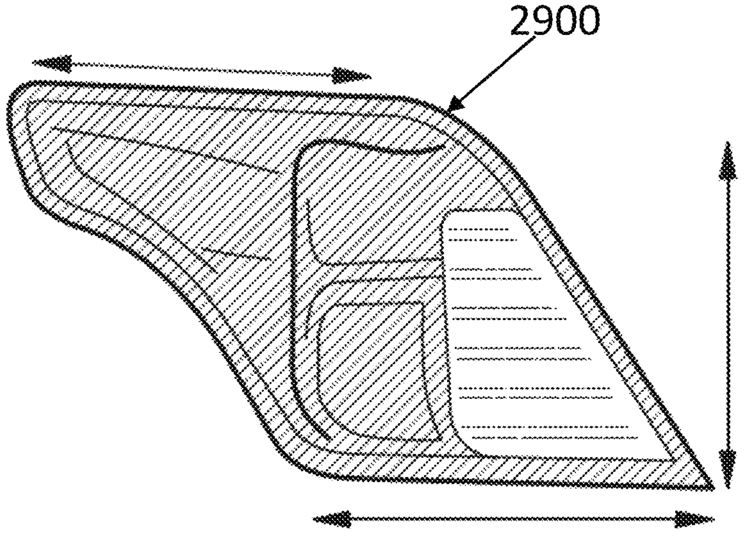
Figure 29C:
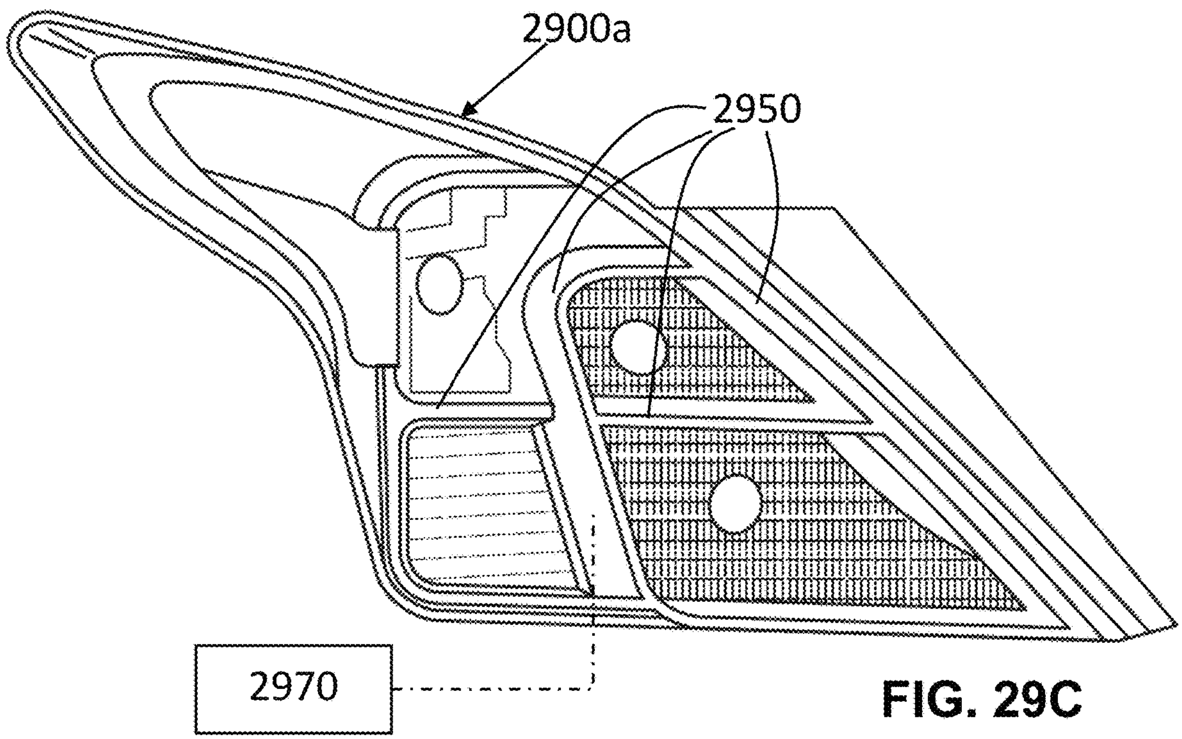
Figure 29D:
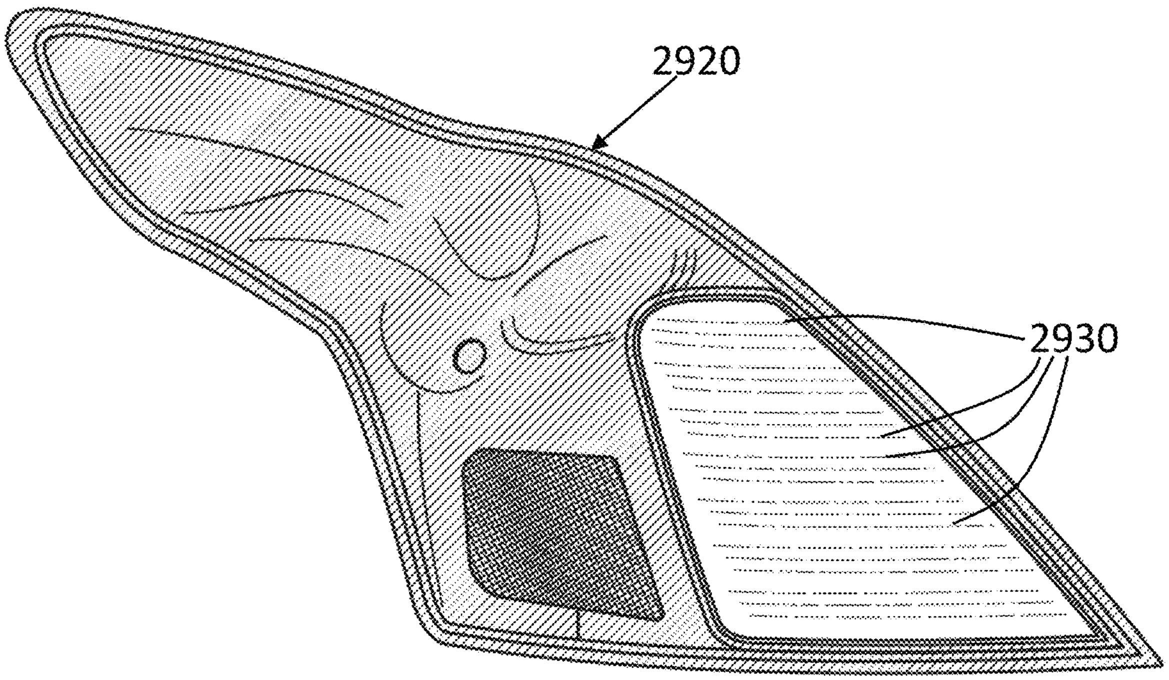
Figure 29H:
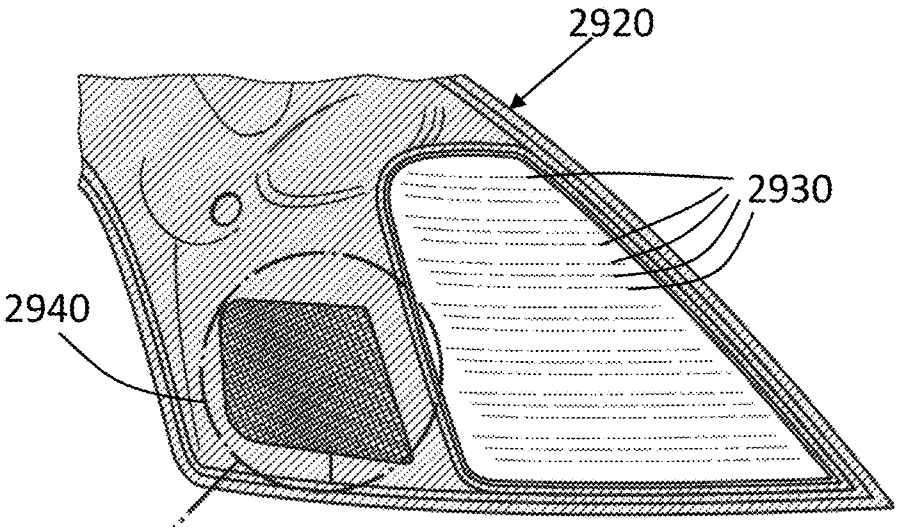

FIG. 29A show a perspective rear view of a vehicle 2910 according to one or more embodiments of the present disclosure. FIG. 29B shows an enlarged view of a light assembly 2900 (e.g., taillight) of the vehicle 2910 of FIG. 29A. FIG. 29C shows a view of the light assembly 2900*a* without a cover or lens 2920 of the light assembly 2900. FIG. 29D shows the cover 2920 alone of the light assembly 2900. FIG. 29E shows an enlarged portion of the cover 2920.

The example of FIG. 29C shows the vehicle light assembly 2900*a* without the cover 2920. In accordance one or more embodiments, components e.g. sections or parts 2950 within the vehicle light assembly 2900 may act as a conducting element, e.g., may act as an antenna element. In at least one example, the metallized surfaces may be directly connected to a radio (e.g., radio module) 2970 to operate as an antenna element for the radio.

In the example of FIG. 29C, one or more metallized surface or metallized surface areas 2950 can include a part of an optical reflector. That is, in accordance with at least one exemplary embodiment of the present disclosure, an optical reflector (e.g., optical reflector of a vehicle light assembly) or parts thereof, can act or operate an antenna. Such an optical reflector may be particularly useful as antenna elements at the lower frequency bands (e.g., less than 1 GHz, such as in 2700 MHz-1 GHz range) given the relatively large dimensions required for efficient antennas.

In accordance with one or more exemplary embodiments of the present disclosure, one or more conducting elements, e.g., one or more antenna elements may be disposed along a light assembly cover, such as the cover 2920. As shown in FIG. 29D, the vehicle lens/cover 2920 may include one or more grooves, collectively or individually designated 2930. In one or more exemplary embodiments, conducting elements (e.g., antenna elements) may be placed or positioned within and/or against the grooves 2930. The conducting elements may fit inside the (e.g., force fit) or may be kept in placed there with additional means e.g., tape, adhesive (e.g., glue), or other suitable fastening means.

The conducting elements may be realized by opaque conducting strips or wires (sheathed or unsheathed). The conducting elements may be semi-transparent conducting strips integrated or directly printed on the cover, e.g., in the grooves.

Viewed from the outside perspective (e.g., facing the cover from outside the vehicle 2910), a wire 2960 disposed along grooves 2930 on the inside face of the cover on transparent surfaces may be concealed or substantially not visible to a human eye. In various examples, grooves including conducting elements such as the grooves 2930 may be located in any suitable location of a vehicle cover or lens. In FIG. 29E, the wire 2960 is shown only visible at the end and outside of the groove 2930, but not visible along the grove.

In the example of FIGS. 239A-29E, the grooves 2930 may be located in an illuminated area 2980, such as, for example, a radiant or high-radiant section or area for lights, such as reversing lights in the case that the light assembly 2900 is a taillight assembly.

FIG. 29E shows an enlarge view of a patterned surface area 2940, e.g., a mesh area. In at least one example, the patterned surface area 2940 may be configured as an optical reflector and/or diffuser. In one or more exemplary embodiments, the dimension of the patterned surface area or mesh 2940 may be so that a conducting element, e.g., an antenna element (e.g., wire monopole realized by, for example, a 30 AWG wire), located behind the mesh 2940. Such a conducting element may be concealed or nearly invisible from an external perspective. That is, the dimensions of the mesh (e.g., dimension of holes) are such so as to conceal the conducting element(s). The example of FIG. 29F and 29G show a wire 2965 located or positioned inside of the light assembly 2900, behind an inside facing side of the cover 2920. From outside the light assembly 2900, the wire 2965 may be concealed or extremely low visibility. By contrast, from an inside view of the light assembly 2900, the wire 2965 may be easily visible.

As noted, in one or more embodiments, a vehicle light assembly cover may include a pattern surface area, such as mesh structure 2940. In one or more further embodiments, such a mesh structure may operate as antenna. That is, as one example, the cover 2920 of FIGS. 239A-29I may include a mesh structure 2940 configured to operate as an antenna element, e.g., a patch antenna.

Figure 29I:
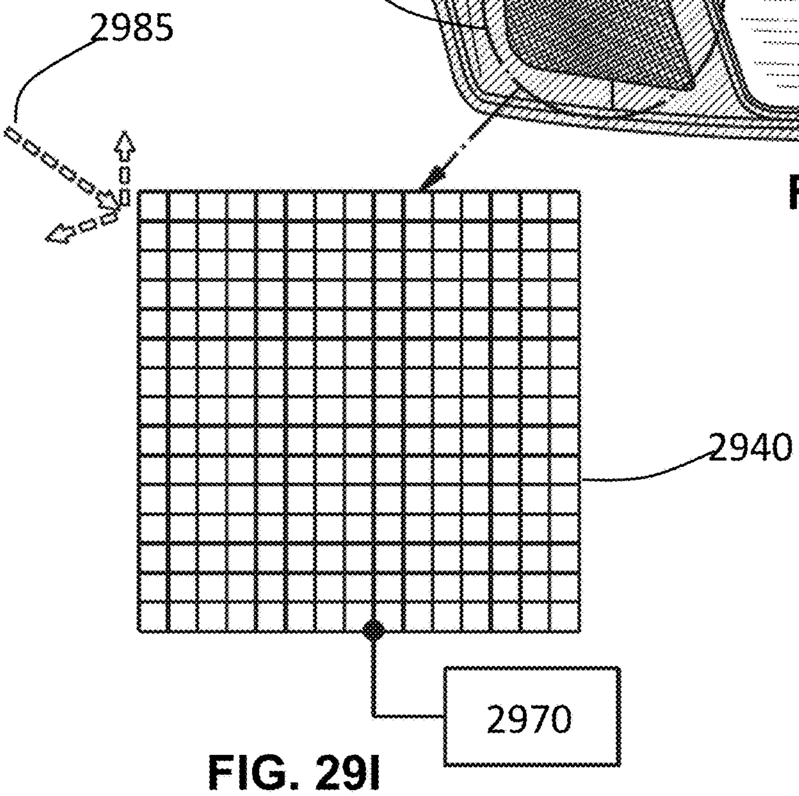

FIG. 29I shows an exemplary simplified representation of the mesh conducting structure 2940. The mesh conducting structure 2940, acting as antenna, is connected to a radio or radio module 2970. Accordingly, the patterned surface area/mesh 2940 may act as both an optical element (e.g., an element that reflects, diffuses, and/or transmits light in a required optical pattern for a vehicle) and act as antenna element (e.g., a monopole). As also shown in the example of FIG. 29I, optical light 2970 impinging on the mesh structure 2940 can get reflected and diffused.

The mesh structure or the patterned surface area 2940 of the cover 2920 may be only one example of a 2D conducting structure configured as an antenna or antenna element. In further exemplary embodiments, other 2D or 3D structures, e.g., structures integrated with a vehicle light assembly, may also be used to operate as antennas in addition to providing other optical functions for a vehicle light assembly. Such other 2D or 3D structures may be implemented or realized as other sections or parts of a vehicle light assembly cover, e.g., cover 2920. In one example, areas that may traditionally be plastic or polycarbonate may be realized or implemented as a conducting structure and act as antenna, e.g., when connected to radio module.

In at least one exemplary embodiment, sections of a front cover of vehicle light assembly may include or incorporate dielectric antenna elements instead of or in addition to metallic antenna elements. That is, such elements may be a part of the front cover, and for example such antenna elements may be integral or continuous with a front cover or lens of vehicle lighting assembly, such as cover 2920. Further, such an antenna element may also be connected to a radio module associated with the lighting assembly.

Figure 30:
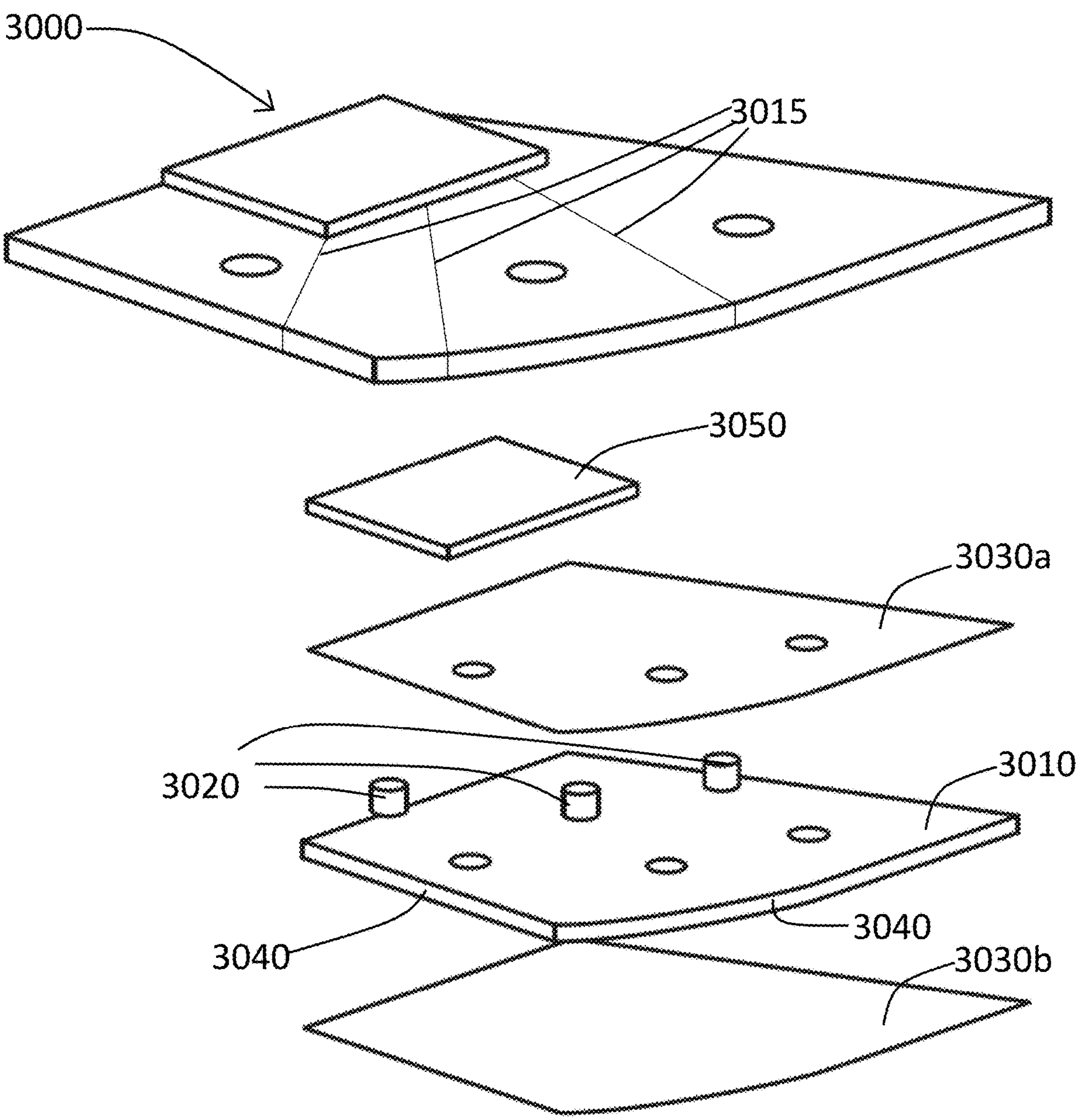
FIG. 30 shows an exemplary light assembly structure according to at least one exemplary embodiment of the present disclosure.

FIG. 30 show a perspective view and a corresponding exploded perspective view of a light and communication structure element 3000 according to one or more exemplary embodiments of the present disclosure. The structure 3000 may be part of a light assembly, such as the light assembly disclosed in in FIG. 31.

The exemplary light and communication structure element may include at least one substrate 3010. The substrate 3010 may include a cavity (e.g., a microwave cavity or a substrate integrated waveguide radiator) containing a low-loss dielectric material allowing transmission or propagation of RF signals. That is, the substrate 3010 may act as microwave or millimeter waveguide. Further, the low-loss dielectric material may be optically transmissive, that is the material allowing transmission or radiation of optical light in addition to RF. According, the substrate may act as a radiating cavity for both optical light and RF. In other words, the microwave cavities may work as optical reflectors to produce a desired optical illumination pattern as well as a desired antenna pattern or performance.

In other embodiments, the substrate may be a vacuum cavity or substantially a vacuum, instead being or containing dielectric material. As such, the vacuum of the substrate 3010 may also allow or be capable of both optical light and RF wave radiation/transmission.

In at least one exemplary embodiment of the present disclosure, the substrate may be subdivided into a plurality of separate cavities. That is, the substrate 3010 may contain one or more vertical via walls 3015 that define a plurality of cavities 3010*a-c* of the substrate 3010.

The substrate 3010 may be at least partially contained, enclosed, or sandwiched by a pair of conducting plates or faces 3030*a*, 3030*b*. As shown in FIG. 30, the first conducting face 3030*a* may be positioned over a top surface of the substrate 3010 and over a bottom surface of the substrate. In one or more embodiments, the pair conducting faces 3030*a*, 3030 may be disposed directly on the substrate or through one or more intermediary layers or materials (e.g., an adhesive). As such, the conducting faces 3030*a*, 3030*b* and the substrate 3010 may form a vertical stack. In at least one example, the conducting faces may act as optical reflectors and/or a RF ground.

One or more portions of the lateral edge of substrate 3010, e.g., along the periphery of the substrate 3010, may operate or act as one or more radiating faces, e.g., radiating faces 3040. The radiating faces 3040 may allow optical light and RF waves to exit and/or enter the substrate 3010. The radiating faces may be vertically extending portions of the substrate that are not covered by other materials.

Further, as shown in the example of FIG. 30, the substrate 3010 may include one or more lights sources, individually or collectively designated 3020. The light sources 3020 may be disposed within the substrate, e.g., in a cavity. Each of the light sources 3020 may be any suitable lighting device or source, including, for examples, light bulbs, light-emitting diodes (LEDs), etc. The light sources 3020 in one or more examples may have top and/or bottom surfaces respectively coplanar with the top and/or bottom surfaces of the substrate 3010.

The light and communication structure element 3000 may further include or allow an electronic component 3050 to be disposed on over the substrate 3010. The electronic component or electronic module 3050 may include RF circuitry and/or light control circuitry. The electronic module 3050 may be coupled or connected to the light sources and/other components.

Figure 31A:
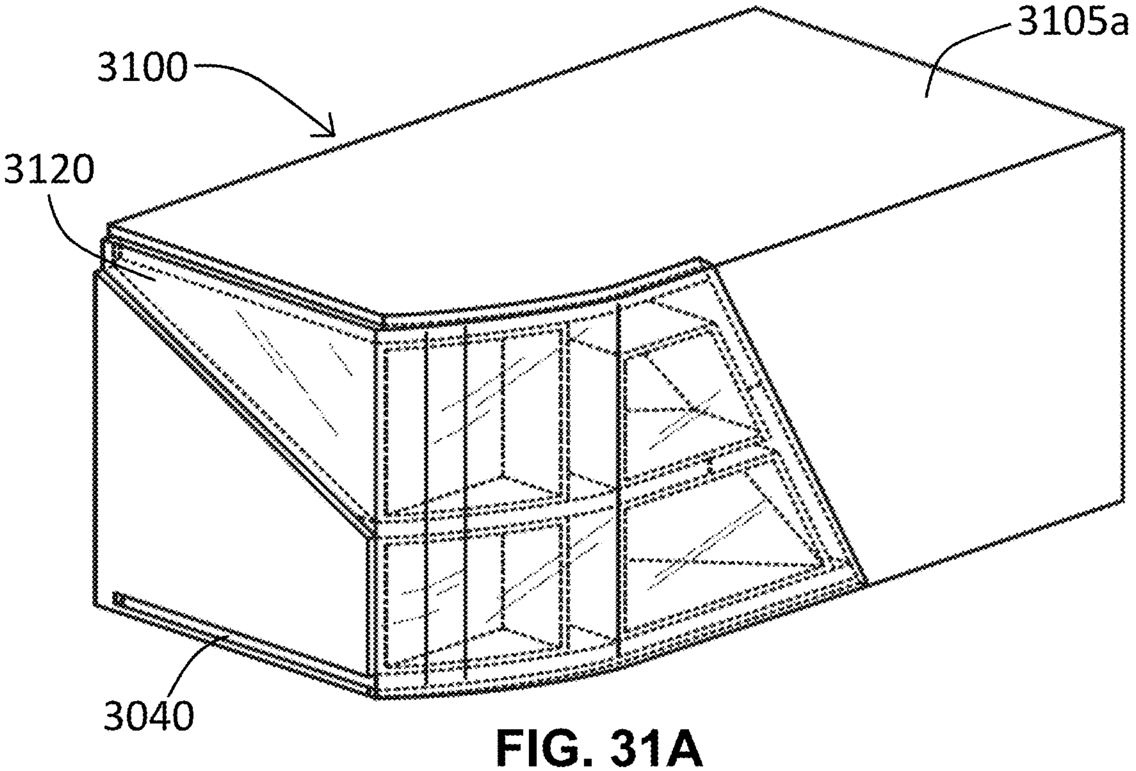
FIGS. 31A-E show exemplary aspects of a light assembly according to at least one exemplary embodiment of the present disclosure.
Figure 31B:
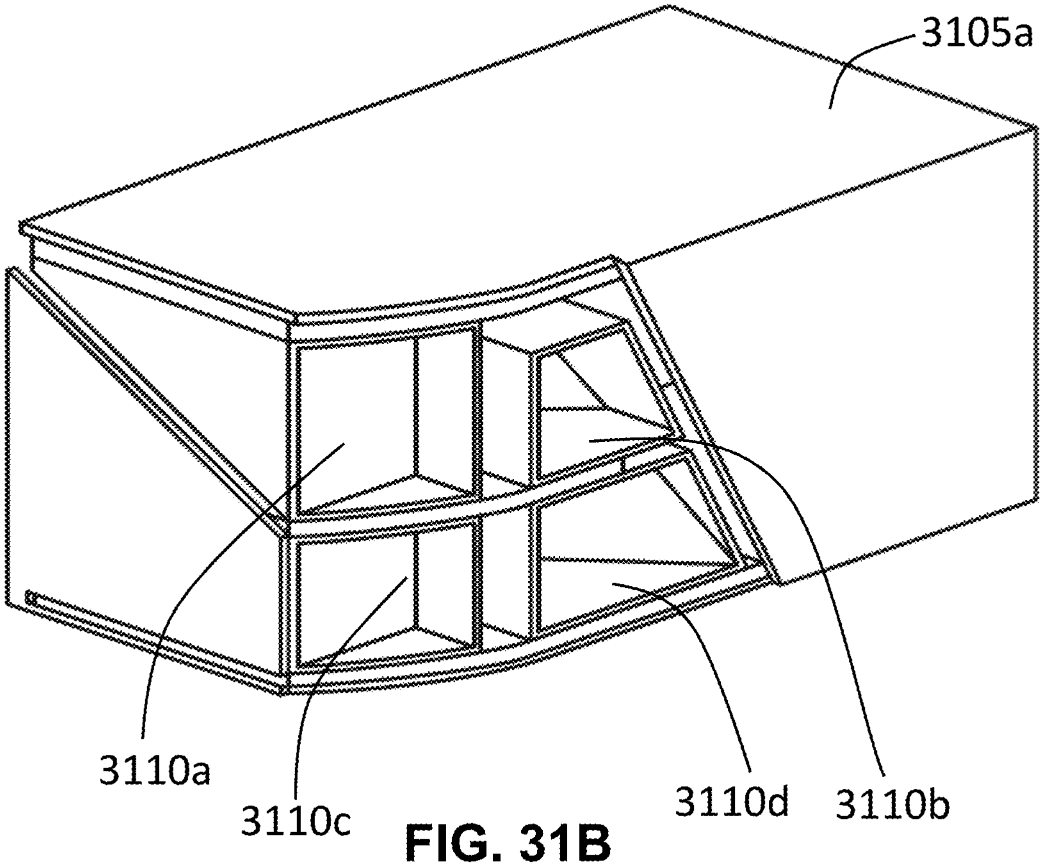
Figure 31C:
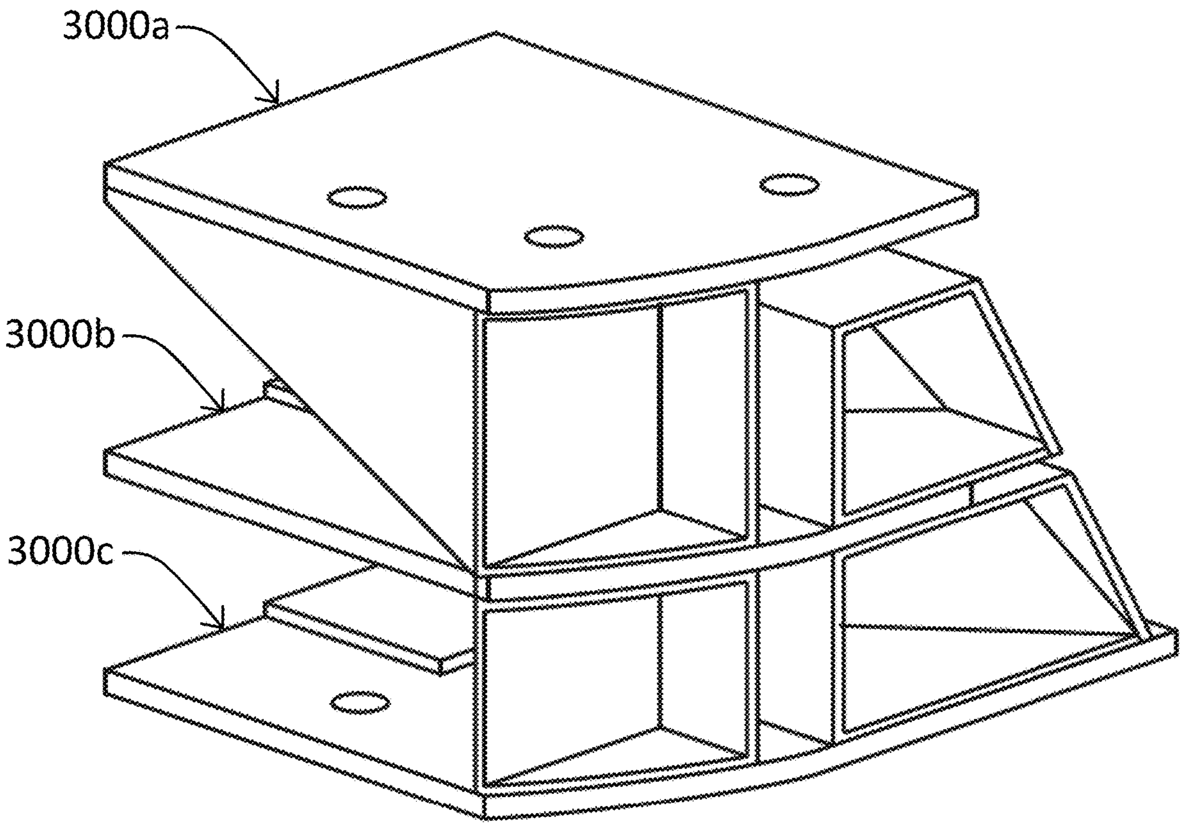
Figure 31D:
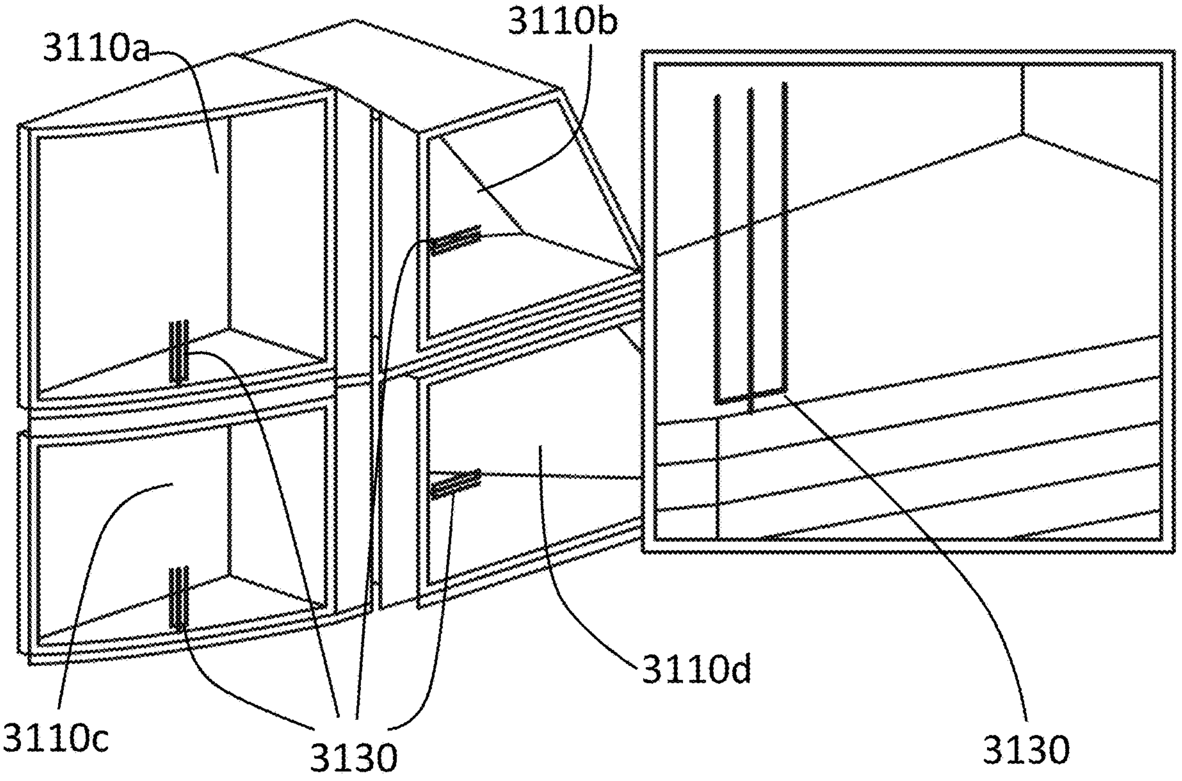
Figure 31E:
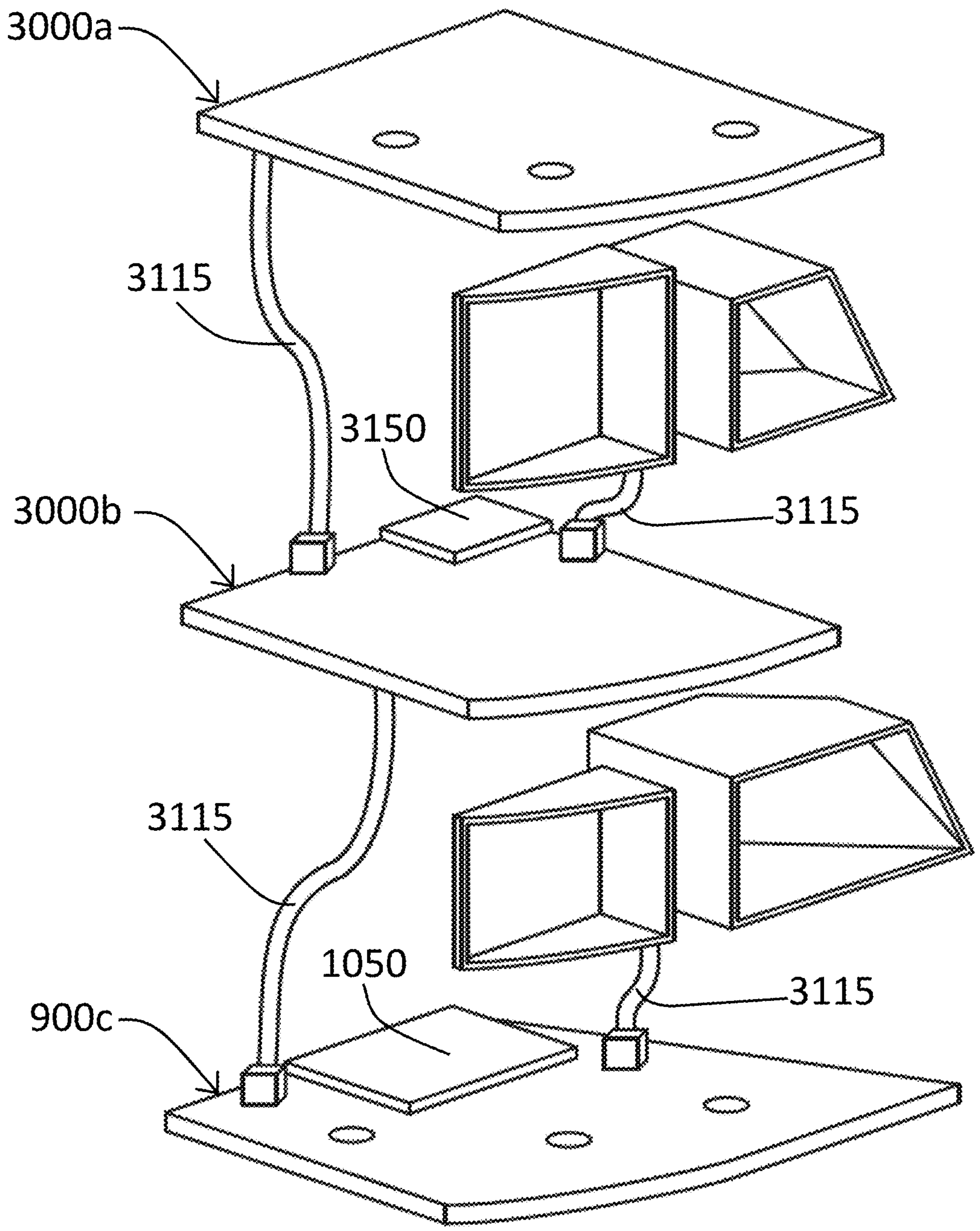

FIG. 31A-E shows in perspective views, a vehicular light assembly 3100 according to one or more exemplary embodiments. In FIGS. 10A and 10B, the light assembly 3100 is integrated or positioned within a vehicle body section 3105. FIG. 31A shows the light assembly 3100 in the vehicle body section 3105 with a front cover 20. FIG. 31B shows the light assembly 3100 of FIG. 31A in the vehicle body section 3105 but without the front cover 20. FIG. 31C shows the vehicle light assembly 3100 without the vehicle body section 3105. FIG. 31E is an exploded view of the vehicle light assembly 3100.

As shown in FIGS. 31A-E, the vehicle light assembly may include a plurality of the light and communication structure elements, e.g., the light and communication structure elements 3000 of FIG. 30. The light and communication structure elements 3000*a-c* of the light assembly 3100 may be vertically stacked or aligned. In one or more embodiments, the structure elements 3000*a-c* may be coupled or connected to each other. In the case of FIGS. 31A-C, the substrate may be connected to each other using RF interconnect cables 3115. Further, interconnects may couple the substrates of structure elements 3000*a-c* to other elements or components.

One or more optical reflectors may be disposed between structure elements 3000. As shown in FIGS. 31A-E, the optical reflectors 3110*a* and 3110*b* are disposed or sandwiched between structure elements 3000*a* and 3000*b* while the optical reflectors 10*c* and 10*d* are disposed or sandwiched between the structure elements 3000*b* and 3000*c*.

The optical reflectors 3110*a-d* of the light assembly 3100 may be any suitable type of optical reflectors configured to deflect light in accordance with vehicular specification or needs, including optical reflectors described herein. In FIG. 31, the optical reflectors 3110*a-d* are depicted as be optical cavities. The optical reflectors 3110*a-d* may be of metal or include metal sections, such as including metallized surfaces. In accordance with one or more further embodiments of the present disclosure, the optical reflectors 3110*a-d* may operate as an antenna or antenna element.

As noted in connection with FIG. 31A, the light assembly 3100 may include a cover 3120, e.g., a front cover or lens. The front cover 3120 may be any cover described herein. The front cover may allow propagation or transmission of both optical light and RF waves. Also, as described in various embodiments of the present disclosure, the front cover 3120 may include or incorporate one or more antenna elements, e.g., on or at least partially embedded in the over. Such antenna elements may be concealed by the front cover 3120.

FIG. 31D shows exemplary antenna elements, individually and collectively designated 30 that may be concealed by the front cover 3120. The antenna element 3130 as shown are thin conducting strips or wires that may operate as wideband monopole antenna. In one example, such conducting strips may have a thickness or diameter of 0.2 mm and may, for example, operate in 1.7-2.5 GHz range.

Further, the light assembly 3100 may include one or more electronic modules 3150. Each of the electronic modules 50 may include RF circuitry and/or light control circuitry. The modules 3150*a, b* may be directly or indirectly connected to various components of the light assembly 3100, e.g., any or all of the structure elements 3000*a-c* , the optical reflectors 3110*a-d* , and antenna elements.

As described in various embodiments described herein, light assemblies or prats thereof may include a plurality of antennas elements. These plurality antenna elements may be connected to radio/radio modules, e.g., through cables and/or other suitable wiring means. These antenna elements may each operate independently or may be operative collectively. In other examples, a radio module(s) may operate in a multiple-input-multiple-output (MIMO) mode, and the plurality of antenna elements (or a subset thereof) connected the radio module(s) may be configured to operate as MIMO antennas. Similarly, the plurality of antenna elements, or a subset thereof, may be configured to operate with transmit and/or reception diversity.

Wireless communication services for vehicles include AM/FM radio, DTV, WiFi, cellular, WiMax, LTE, GPS, PCS, XM-radio, and vehicular radar. These communication services operate over a wide range of spectrums. For example, AM/FM radio (operate in the MHz range), DTV, digital audio, remote keyless entry (RKE), tire pressure monitoring systems (TPMS), etc. operate at frequencies of less than 1 GHz. And, GPS, BT, SDARS, WiFi, WiMax, cellular, DSRC (V2V, V2I), XM-radio (covering upto 7 GHz), and other next generation automotive radios operate at frequencies between 1 GHz and 7 GHz. Additionally, vehicular radars operate at a frequency of 24 GHz for side detection radars and at a frequency of 79 GHz for front and back detection radars for collision avoidance.

Each of these wireless communication services requires a particular antenna system to provide wireless connectivity. The individual antenna systems can be placed at different locations in or on a vehicle, such as, around the perimeter of windows, under the shark fin, under a vehicle body (e.g., cavity antennas), car handles, bumpers, and so on. The antenna systems may be placed on a variety of different materials including glass, plastic, metal, or any combination of materials utilized for an autobody. For example, sheet moulding compound (SMC) materials may be used for manufacturing fuel-efficient and lighter vehicles.

Embedded antennas, such as, slot dipole antennas, bowtie antennas, Planar Inverted Conical Antennas (PICA), PICA with a slot, CPW-FED PICA with a slot and many other antennas with very high bandwidth have been used in vehicles mainly for protocols below 6 GHz frequencies.

Advanced wireless technology is providing wireless connectivity in new frequency bands (such as above 6 GHz and mmWs) as well as spectrum sharing below 6 GHz to achieve higher data rates and bandwidths for communication. However, conventional embedded antennas for vehicles include V2X antennas only operate in frequency bands below 6 GHz. Most of these embedded antennas are not designed to provide security, ultra-high data-rate, or interference management. These features are important for inter vehicular communications involving 5G-or enhanced WiFi.

Additionally, the number of communication services for connected vehicles is increasing. More and more antennas and radio systems will be needed for different protocols and standards. The inclusion and placement of these individual antennas and radio systems should not compromise esthetic and aerodynamic requirements or significantly increase costs.

A universal, cost-effective embedded antenna that addresses the co-existence, interference, security, and cost requirements is desirable. Each antenna system hardware requires independent ration and assembly features for ensuring the required performance/functions and thereby increasing cost of overall connected cars of future.

Various aspects of the present disclosure describe a vehicle embedded antenna system with both omnidirectional and directionally steered antennas that allows multiple standards/protocols co-existing with one another without interfering with each other.

Figure 32:
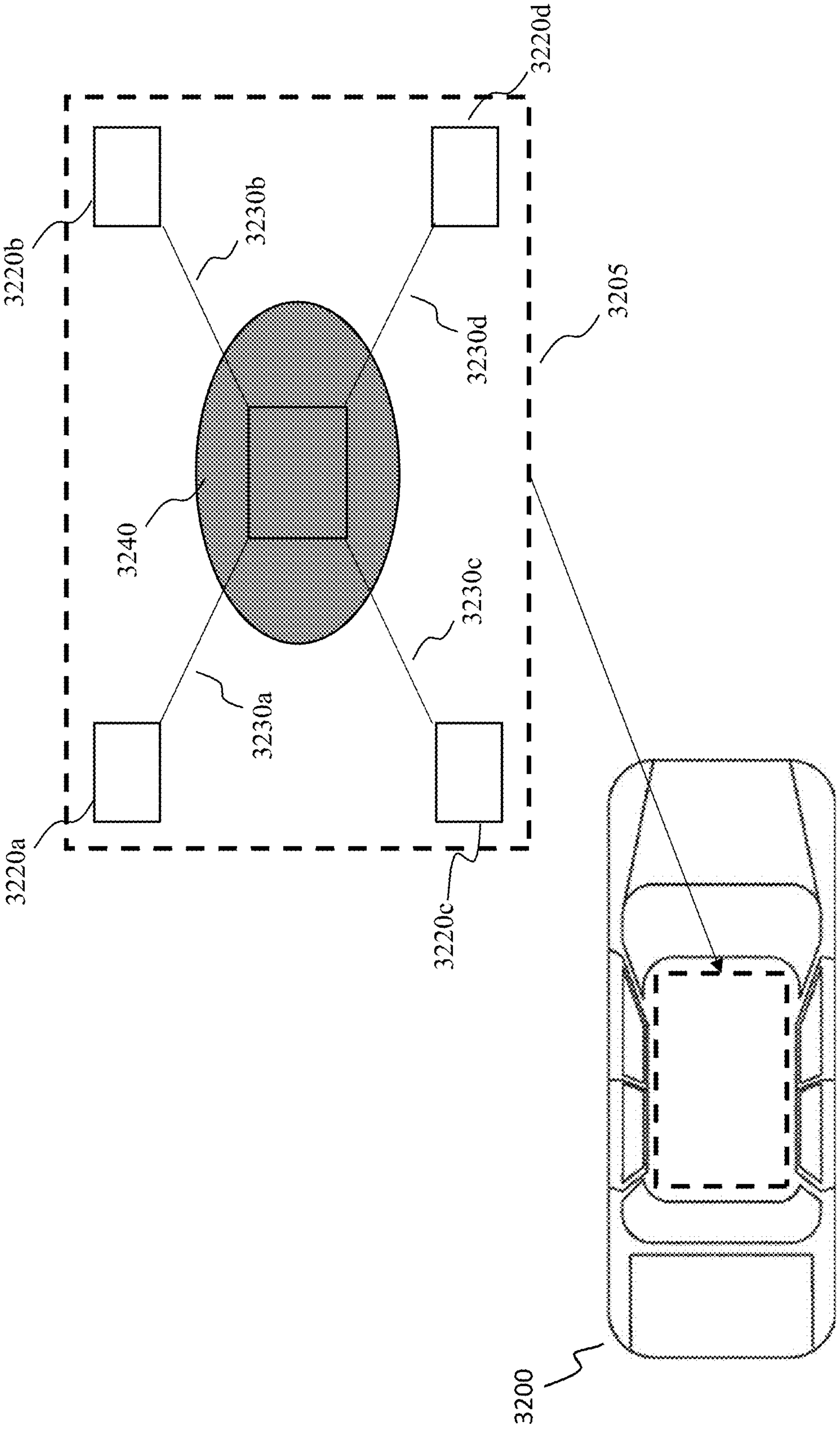
FIG. 32 illustrates an example of a top view of an integrated embedded antenna system according to various aspects of the present disclosure.

FIG. 32 illustrates an example of an integrated embedded antenna system according to various aspects of the present disclosure. Specifically, FIG. 32 illustrates a vehicle 3200 and a top view of the roof 3205 of the vehicle. For example, FIG. 32 shows co-existence of different antenna systems on a vehicle roof.

In particular, FIG. 32 shows an integrated antenna system including a plurality of sub-10 GHz antennas and a millimeter wave (mmVV) antenna system. The mmW antenna system provides full hemispherical coverage of the vehicle. The mmW antennas are directional and provide secure and interference free communication. The sub-10 GHz antenna system provides lateral and longitudinal coverage of the vehicle. The sub-10 GHz antennas are both omnidirectional and directional and provide full-coverage in the cardinal directions, large bandwidths, and secured communications as needed.

Referring to FIG. 32, the sub-10 GHz antennas 3220*a*-3220*b* may be configured as directional antennas and disposed at four corners of the roof of a vehicle. The positions of the sub-10 GHz antennas provide coverage when configured as directional antennas to communicate with communication equipment installed along a road. For example, at least one of the sub-10 GHz antennas may be configured to provide directional communication with a road side unit such as a Dedicated Short Range Communications (DSRC) unit located on a side of a road. A DSRC unit which may be part of the V2X system operates around the 5.9 GHz frequency band. A DSRC unit which may be part of the V2X system operates around the 5.9 GHz frequency band. Alternatively, the sub-10 GHz antennas 3220*a*-3220*b* may be configured for sub-10 GHz cellular or WiFi communications.

Referring to FIG. 32, the mmW antenna system 3240 may be disposed at the center of the roof of a vehicle. The mmW antenna system 3240 may be a combo mmW antenna system which includes a phased array and switched-beam array. The mmW antenna system may be configured to provide MIMO communication with 5G base units. The mmW antenna system may be configured to provide omnidirectional communication to provide an ad-hoc wireless network to communicate with other vehicles on the road. The mmW antenna system may operate at the 28 GHz, 39 GHz, 60 GHz, and 73 GHz frequency bands.

Figure 33:
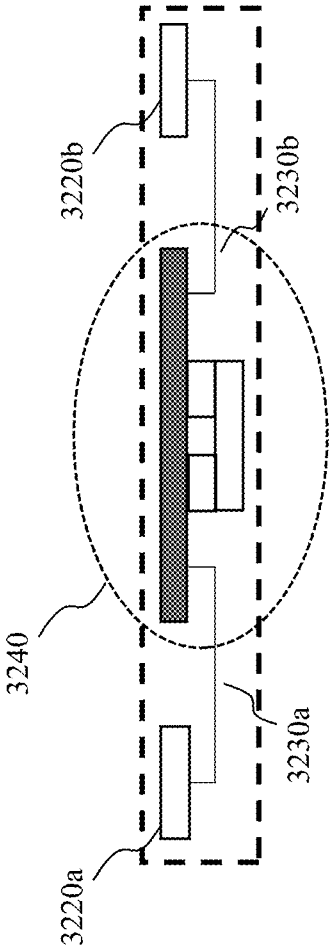
FIG. 33 illustrates an example of a side view of the integrated embedded antenna system of FIG. 32.

FIG. 33 illustrates an example of a side view of the integrated embedded antenna system of FIG. 32. The mmW antenna system 3240 and plurality of sub-10 GHz antennas 3220*a*-3220*d* are embedded in the top of the roof of the vehicle 3200. Referring to FIG. 33, the plurality of sub-10 GHz antennas 3220*a*-3220*d* are coupled to the mmW antenna system 3240 via connectors 3230*a*-3230*d*.

The placement of multiple types of mmW antennas and sub-10 GHz antennas at the same location allows sharing of heatsinks and other related integration/assembly features resulting in a lower cost implementation.

A universal V2X antenna system where 5G+ based V2X antenna/radio systems can co-exist within a vehicle without impacting each other's performance and can share design, hardware assembly in a cost-effective manner. For example, LTE-A/WiFi, DSRC, mmW communication systems can be aesthetically placed on a vehicle roof, side door, or vehicle bumper along with auto-radars and all services can share hardware and assembly features, like heatsink, PCB, EMI/RFI/thermal/mechanical structures to remain cost-effective.

The co-existence of mmW and sub-10 GHz antenna/radio systems as well as omni- and directional antenna architectures enabling the systems to share hardware and assembly features with reduced costs.

Figure 34:
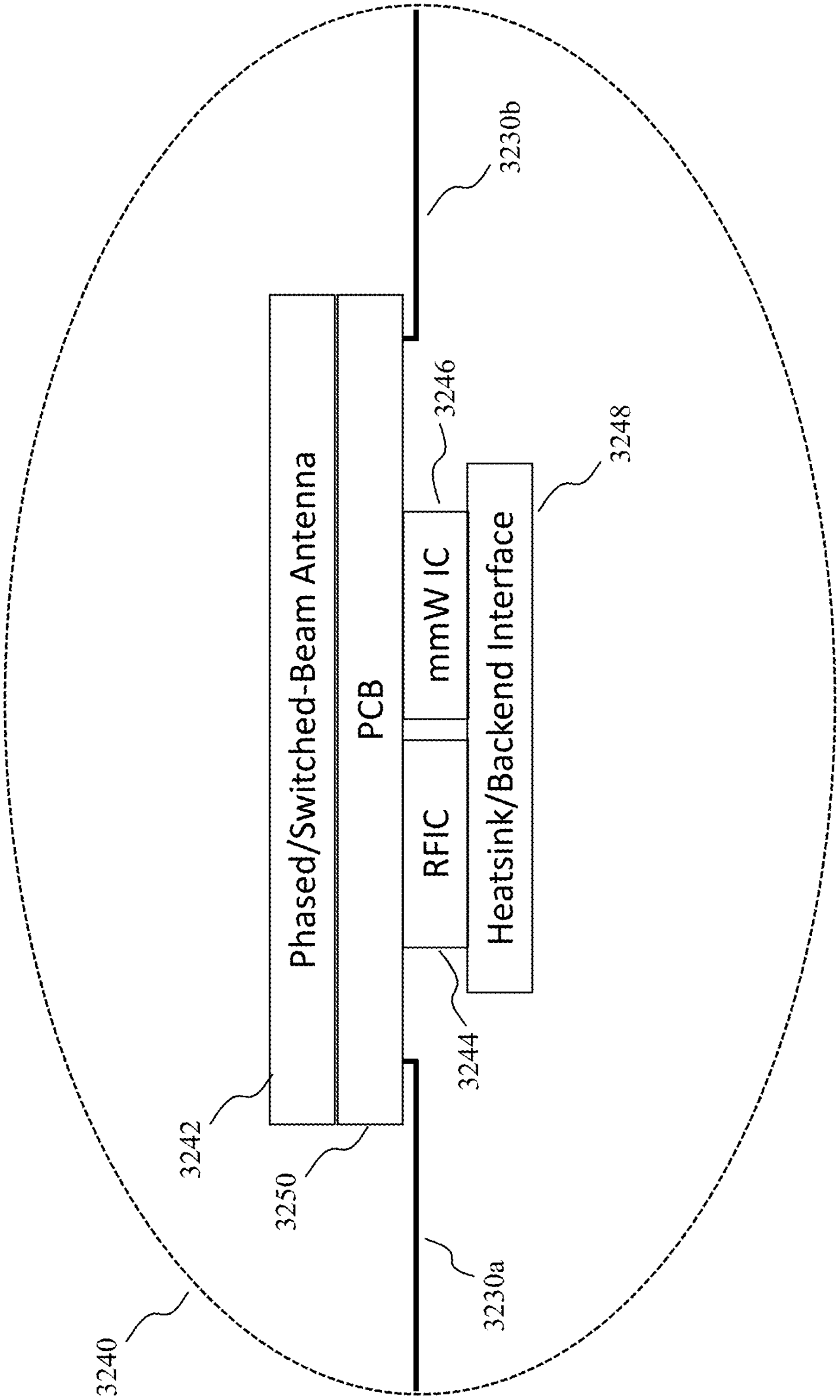
FIG. 34 is a schematic diagram illustrating a portion of the integrated antenna system of FIG. 33.

FIG. 34 is a schematic diagram of a portion of the integrated antenna system of FIG. 33. FIG. 34 illustrates an example of an integrated antenna system with common assembly features according to various aspects of the present disclosure. Referring to FIG. 34, the mmW antenna system 3240 includes a phased antenna design and a switched beam antenna design 3242 provided in a same portion of a printed circuit board (PCB) 3250. An integrated circuit (mmW IC) for controlling the mmW antenna system 3246 and an integrated circuit (RFIC) for controlling the plurality of sub-10 GHz antennas 3244 are provided in a common area. For example, the common area may be a portion of the PCB near the mmW antenna design 3242. The mmW IC 3246 and the RFIC 3244 may share a common heatsink. The mmW IC 3246 and the RFIC 3244 may also share a common backend interface 3248. The backend interface 3248 may provide interconnectivity with a universal control bus of the vehicle.

Referring again to FIG. 32, the plurality of sub-10 GHz antennas 3220*a*-3220*d* are each coupled to the mmW antenna system via connector 3230*a*-3230*b*, respectively. Connector 3230*a*-3230*b* may be conductive metal wires. Referring to FIG. 34, each sub-10 GHz antenna 3220*a*-3220*d* may be connected to the RFIC 3244 via a respective connector 3230*a-d* to a respective connector interface (not shown) on PCB 3250.

The universal communication and radar design floorplan incorporating all wireless/radar standards can extend to all locations of the vehicle and ensure coverage with no blind spots and also without increasing substantial cost.

Figure 35:
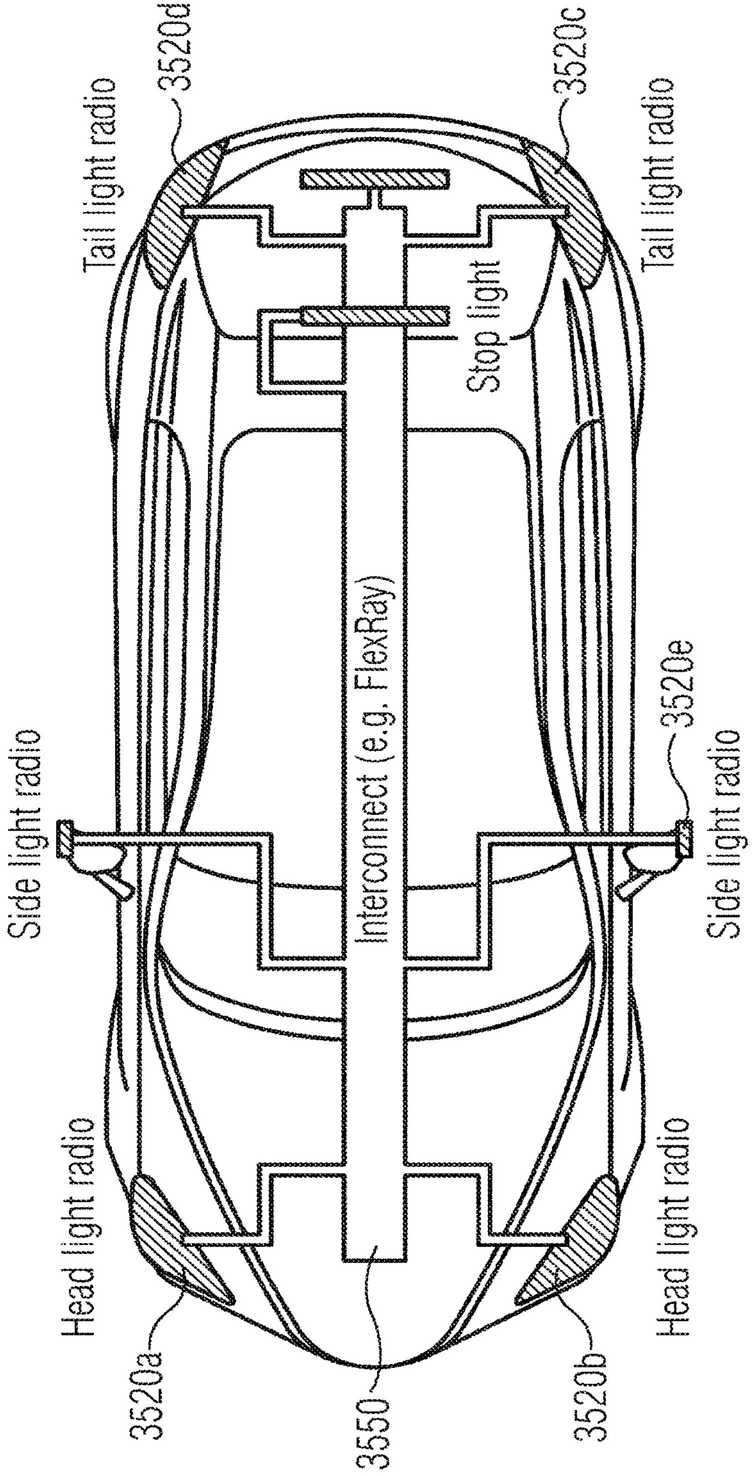
FIG. 35 is a schematic drawing illustrating an example of a universal antenna system control bus according to various aspects of the present disclosure.

FIG. 35 is a schematic drawing illustrating an example of a universal antenna system control bus. Referring to FIG. 35, a universal control bus 3550 for interconnecting a plurality of antennas 3520*a-f* can coordinate the antennas all around the vehicle body. For example, the universal control bus 3550 may be integrated into the chassis of a vehicle and can be used to couple to the backend interface of each antenna thereby integrating all the backend interfaces to control the different antenna systems all around the vehicle body. For example, antennas 3520*a-f* may be disposed at a left head light, a right head light, a left side mirror, a right side mirror, a left tail light, and a right tail light, respectively. Each of the antennas 3520*a-f* may be integrated or embedded with a respective light assembly module. The antennas 3520*a-f* may be configured as directional or omnidirectional antennas. The antennas 3520*a-f* may be configured to operate with a mmW combo antenna system supporting both communication and radar integrated on the top of the vehicle roof.

Figure 36:
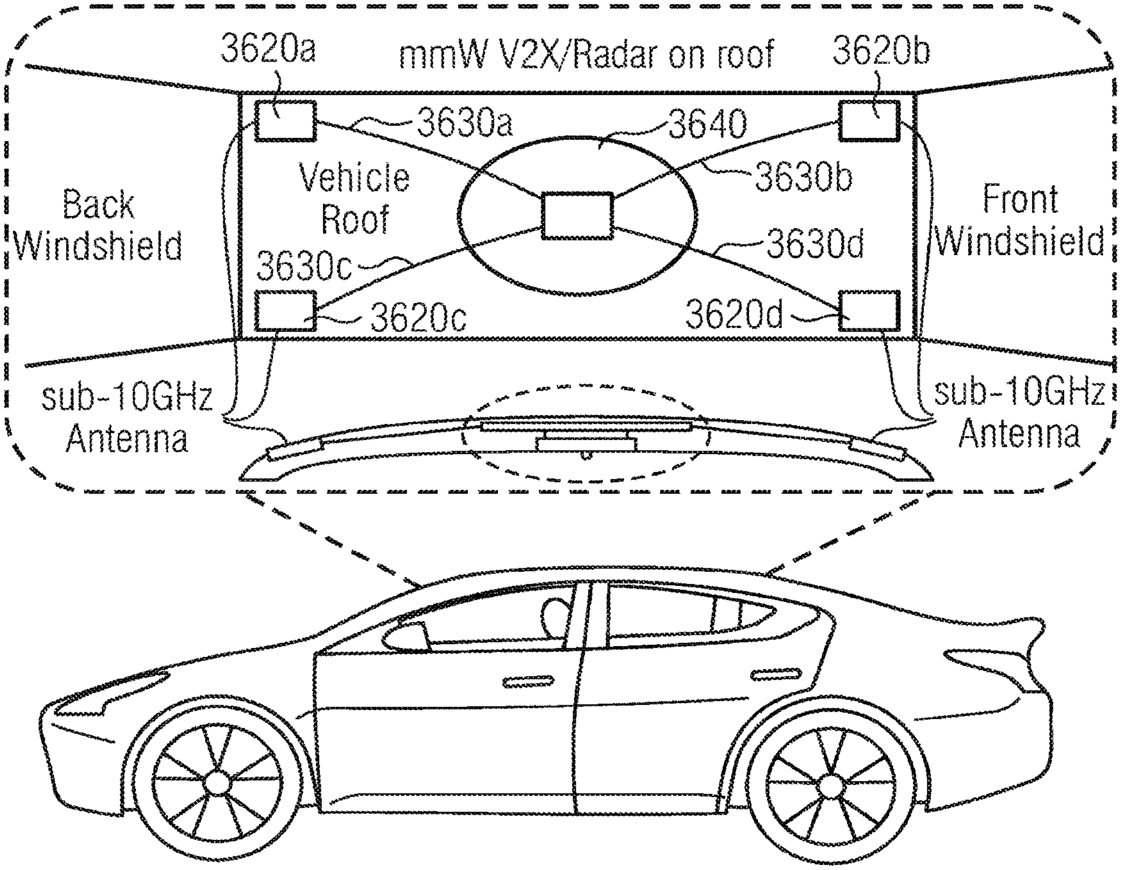
FIG. 36 is another schematic drawing illustrating an example of an integrated embedded antenna according to various aspects of the present disclosure.

FIG. 36 is another schematic drawing illustrating an example of an integrated embedded antenna including a mmW antenna system a sub-10 GHz antenna system. Specifically, FIG. 36 illustrates the co-existence of a plurality of sub-10 GHz antennas and a mmW antenna system embedded in a roof of a vehicle. The embedded antenna system shown in FIG. 36 is similar to the system described with respect to FIG. 32. For example, a mmW antenna system 3640 is positioned at a central location of a roof of a vehicle. Four sub-10 GHz antennas 3630*a-d* are positioned around the mmW antenna system 3640. The integrated circuits and backend connections for controlling the respective antenna systems are commonly located. For example, the integrated circuits (e.g., RFIC and mmw IC) for controlling the two antenna systems may be disposed in the central location along with backend connections and heatsinks.

Figure 37:
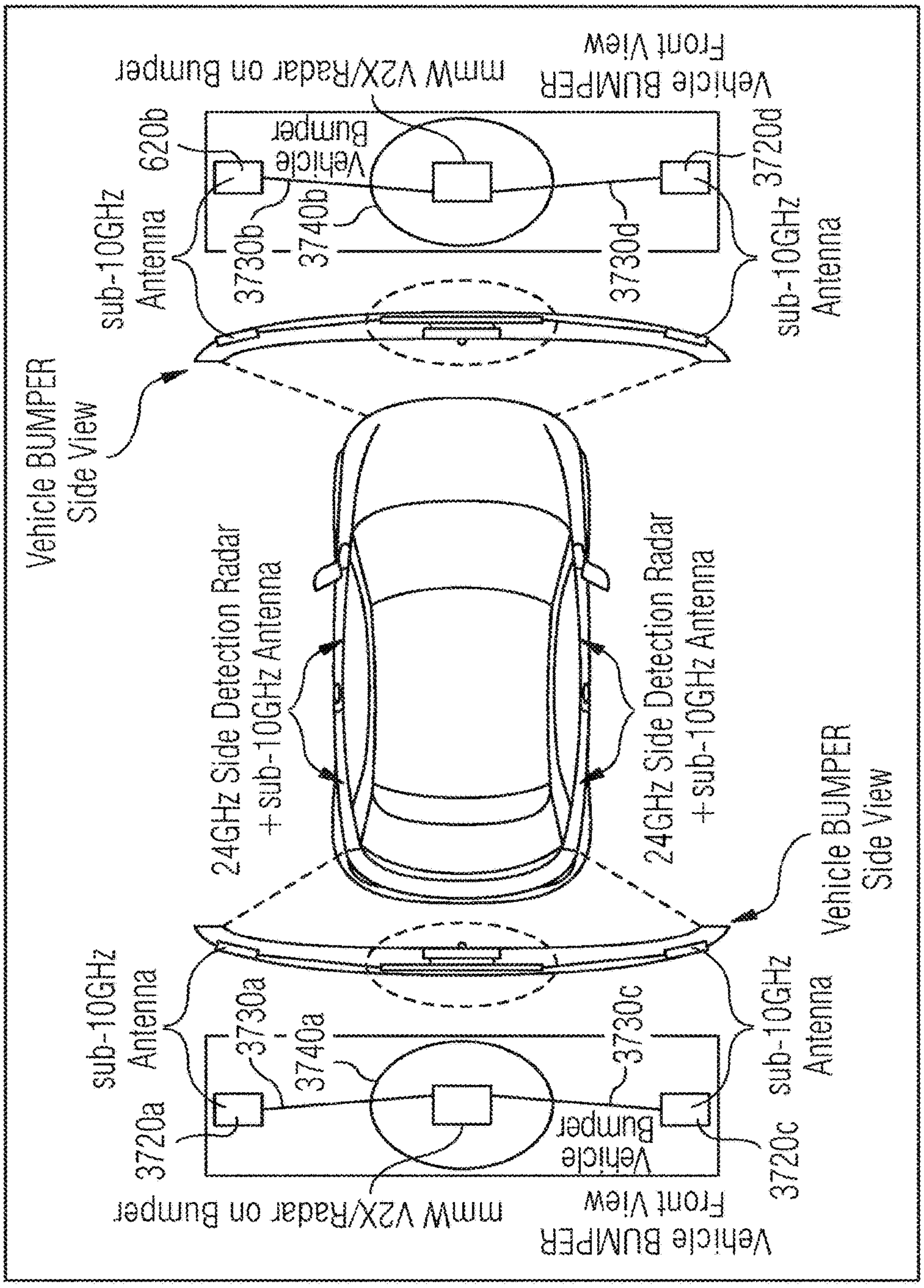
FIG. 37 is another schematic drawing illustrating an embedded antenna system including a mmW antenna system and a sub-10 GHz antenna system according to various aspects of the present disclosure.

FIG. 37 is another schematic drawing illustrating an embedded antenna system including a mmW antenna system and a sub-10 GHz antenna system. Specifically, FIG. 37 illustrates the co-existence of a plurality of sub-10 GHz antennas and a mmW antenna system at the front and back bumper of vehicles. The embedded antenna system shown in FIG. 37 is similar to the system described with respect to FIG. 32. For example, a mmW antenna system 3740*a-b* is positioned at a central location of a front bumper and/or rear bumper respectively. A pair of sub-10 GHz antennas 3730*a-d* are positioned at the left and right edges of the front and/or rear bumpers, respectively. The integrated circuits and backend connections for controlling the respective antenna systems are commonly located. For example, the integrated circuits and backend connections may be disposed in a central location with the mmW antenna system.

Additionally, antennas embedded in the front and rear bumpers of the vehicle can be integrated and coordinated with antennas embedded in other portions of the vehicle via the universal control bus 3550.

Additionally, for example, a 24 GHz side-detection-radar antenna system can be combined with sub-10 GHz antennas for communication coverage on one side of a car. For example, a radar antenna and a sub-10 Ghz may be placed in a panel of the car door. For another example, a radar antenna may be placed in a panel of the car door and a sub-10 Ghz may be placed is a side view mirror of the same car door.

FIG. 37 shows the co-existence of mmW (28 GHz, 39 GHz, 60 GHz. 73 GHz) communication system, radar system (24 GHz, 79 GHz), and sub-10 GHz radio system.

In the following, various aspects of this disclosure will be illustrated:

In Example 1, a retro-directive antenna array system for wireless communications including an antenna array including one or more antenna elements; and a negative refractive-index engineered material (NIM) deposited over at least one of the one or more antenna elements.

In Example 2, the subject matter of Example(s) 1 may include wherein the NIM has a permittivity of about −1 and a permeability of about −1.

In Example 3, the subject matter of Example(s) 1-2 may include a retro-directive antenna array circuitry operatively coupled to the antenna array.

In Example 4, the subject matter of Example(s) 3 may include wherein the retro-directive array circuity does not include phase conjugation circuitry configured to conjugate to perform phase conjugation of signals received by the antenna system.

In Example 5, the subject matter of Example(s) 1-4 may include wherein the retro-directive array circuity does not include a frequency mixer to conjugate phases of signals received by the antenna system with signals to be transmitted from the antenna system.

In Example 6, the subject matter of Example(s) 1-5 may include wherein the retro-directive array circuity does not include a harmonic or subharmonic mixer to conjugate phases of signals received by the antenna system with signals to be transmitted from the antenna system.

In Example 7, the subject matter of Example(s) 1-6 may include wherein the NIM is deposited over at least one of the one or more antenna elements so that signal received by the antenna system passes through the NIM material prior to being received by the antenna array.

In Example 8, the subject matter of Example(s) 1-7 may include wherein the NIM negatively refracts signals and provides the negatively refracted signals to the antenna array.

In Example 9, the subject matter of Example(s) 1-8 may include for a signal hitting the NIM at a first angle of θ degrees, wherein the first angle is defined with respect to an axis in a direction orthogonal to a surface of the NIM, the NIM is configured to invert the angle of the signal to be about −θ degrees as the signal passes through the NIM.

In Example 10, the subject matter of Example(s) 1-9 may include wherein the antenna array includes a first subset of antenna elements for reception and a second subset of antenna elements for transmission, wherein the NIM is deposited over the first subset of antenna elements.

In Example 11, the subject matter of Example(s) 10 may include wherein the NIM is deposited only over the first subset of antenna elements and not over the second subset of antenna elements.

In Example 12, the subject matter of Example(s) 1-9 may include wherein the antenna array includes a dual-polarized antenna with a first polarity in a reception direction for signals received by the antenna system and a second polarity in a transmission direction for signals transmitted from the antenna system, wherein the first polarity and the second polarity are different.

In Example 13, the subject matter of Example(s) 12 may include wherein the NIM is aligned with the antenna array so that only signals received by the antenna system are negatively refracted by the NIM.

In Example 14, the subject matter of Example(s) 13 may include wherein only phases of the signals received by the antenna system are reversed and phases of the signals transmitted from the antenna system remain are not reversed.

In Example 15, the subject matter of Example(s) 1-9 may include wherein the NIM has a tunable surface configured to be adjusted via application of a stimulus.

In Example 16, the subject matter of Example(s) 15 may include wherein the stimulus is at least one of an electric stimulus or a magnetic stimulus.

In Example 17, the subject matter of Example(s) 15-16 may include wherein a negative refraction property of the NIM is activated by the stimulus during signal reception and is not activated during signal transmission.

In Example 18, the subject matter of Example(s) 15-17 may include a switch configured to switch between transmission of signals and reception of signals based on the application of the stimulus.

In Example 19, the subject matter of Example(s) 1-18 may include wherein the antenna system is operatively coupled to a radio frequency circuitry of a wireless communication device.

In Example 20, the subject matter of Example(s) 19 may include wherein the radio frequency circuity includes a local oscillator.

In Example 21, the subject matter of Example(s) 1-20 may include wherein the antenna system is operatively coupled to a baseband processor of a wireless communication device.

In Example 22, the subject matter of Example(s) 1-21 may include wherein phases of signals received by the antenna array are reversed by the NIM prior to reception at the antenna array.

In Example 23, the subject matter of Example(s) 1-22 may include a mixer to up-convert a baseband signal, wherein the baseband signal is received from a baseband processor operatively coupled to the retro-directive antenna array system, with signals received by the antenna array via the NIM to produce a signal to be transmitted from the retro-directive antenna array system.

In Example 24, the subject matter of Example(s) 23 may include wherein the signal to be transmitted from the antenna system carries the baseband signal with reversed phase information to steer the signal to be transmitted toward a direction based on the signals received at the retro-directive antenna array system.

In Example 25, the subject matter of Example(s) 1-24 may include wherein the NIM includes a plurality of layers.

In Example 26, a method for producing a retro-directive antenna array system, the method including providing an antenna array including one or more antenna elements; and depositing a negative refractive-index engineered material (NIM) over at least one of the one or more antenna elements.

In Example 27, a combination antenna array structure for vehicular communications, the combination antenna array structure including a first antenna array including a phased array which is configured to be operatively coupled to one or more radio frequency integrated circuits; a second antenna array including a plurality of switched beam antenna array elements arranged around the first antenna array, wherein the plurality of switched beam antenna array elements are divided into one or more subsets of switched beam antenna array elements; and one or more switches, each of the one or more switches configured to provide an interface between a respective subset of the one or more subsets of switched beam antenna array elements and the one or more radio frequency circuits.

In Example 28, the subject matter of Example(s) 27 may include wherein the first antenna array is configured to provide radio frequency coverage in a first direction.

In Example 29, the subject matter of Example(s) 27-28 may include wherein the first antenna array is configured to provide radio frequency coverage in a hemispherical range, wherein a zenith of the hemispherical range lies in a direction orthogonal to the face of the phased array.

In Example 30, the subject matter of Example(s) 27-29 may include wherein the phased array includes a structure of M×N array elements, wherein each of M and N are integers.

In Example 31, the subject matter of Example(s) 27-30 may include wherein the phased array is configured to operate in a plurality of frequency bands.

In Example 32, the subject matter of Example(s) 27-31 may include wherein the second antenna array is configured to provide radio frequency coverage in an azimuthal direction around the combination antenna array structure.

In Example 33, the subject matter of Example(s) 32 may include wherein the azimuthal direction covers a direction which is orthogonal to the zenith of the hemispherical range provided by the first antenna array.

In Example 34, the subject matter of Example(s) 27-33 may include wherein the second antenna array is arranged around the first antenna array in a circle or elliptical to provide 360 degree radio frequency coverage in the azimuthal direction.

In Example 35, the subject matter of Example(s) 27-34 may include the second antennary array provides radio frequency coverage with a maximum beam coverage of about 30 degrees measured in an altitude direction.

In Example 36, the subject matter of Example(s) 27-35 may include wherein each of the one or more subsets of switched beam antenna array elements provide radio frequency coverage for a corresponding subset of the radio frequency coverage in the azimuthal direction.

In Example 37, the subject matter of Example(s) 27-36 may include wherein the plurality of switched beam antenna array elements are into four subsets of switched beam antenna array elements.

In Example 38, the subject matter of Example(s) 37 may include wherein each of the four subsets includes an equal number of switched beam antenna array elements.

In Example 39, the subject matter of Example(s) 37-38 may include wherein each of the four subsets includes eight switch beam antenna array elements.

In Example 40, the subject matter of Example(s) 27-39 may include wherein each of the plurality of switched beam antenna array elements is connected to the one or more switches via an interconnect.

In Example 41, the subject matter of Example(s) 27-40 may include wherein the switch is a single-pole-N-throw switch, wherein N is the number of switched beam antenna array elements that the switch is connected to.

In Example 42, the subject matter of Example(s) 27-41 may include wherein each of the plurality of switched beam antenna array elements includes two twin radiating structures, wherein each of the twin radiating structures includes a respective first prong and a respective second prong.

In Example 43, the subject matter of Example(s) 27-42 may include wherein each of the plurality of switched beam antenna array elements includes a first conductor and a second conductor.

In Example 44, the subject matter of Example(s) 43 may include wherein the first conductor and the second conductor are different.

In Example 45, the subject matter of Example(s) 43 may include wherein the first conductor and the second conductor are the same.

In Example 46, the subject matter of Example(s) 43-45 may include wherein the first conductor is arranged over the second conductor.

In Example 47, the subject matter of Example(s) 43-46 may include wherein a first prong of a first of the twin radiating structures overlaps a second prong of a second of the twin radiating structures.

In Example 48, the subject matter of Example(s) 43-47 may include wherein one or more substrate layers is between the first conductor and the second conductor.

In Example 49, the subject matter of Example(s) 27-48 may include a substrate on which the first antenna array and the second antenna array are arranged.

In Example 50, the subject matter of Example(s) 49 may include wherein the substrate is a multilayer substrate.

In Example 51, the subject matter of Example(s) 49-50 may include the substrate including a plurality of microvias through which the phased array and each of the one or more switches are connected to the radio frequency integrated chips.

In Example 52, the subject matter of Example(s) 49-51 may include the substrate including metal traces.

In Example 53, the subject matter of Example(s) 49-52 may include the one or more radio frequency circuits arranged on an opposite side of the substrate than the first antenna array and the second antenna array.

In Example 54, the subject matter of Example(s) 53 may include a heat sink arranged in contact with the one or more radio frequency circuits.

In Example 55, the subject matter of Example(s) 27-54 may include a housing configured to cover at least the second antenna array.

In Example 56, the subject matter of Example(s) 55 may include wherein the housing is further configured to cover the one or more switches.

In Example 57, the subject matter of Example(s) 55-56 may include wherein the housing includes a top reflecting structure arranged over the second antenna array.

In Example 58, the subject matter of Example(s) 55-57 may include wherein the housing includes a bottom reflective structured arranged under the second antenna array.

In Example 59, the subject matter of Example(s) 55-58 may include wherein the housing includes a directed structure arranged beyond an end of the second antenna array opposite to the one or more switches.

In Example 60, the subject matter of Example(s) 27-59 may include mechanical supports configured to support the plurality of switched beam antenna array elements.

In Example 61, a method of manufacturing a combination antenna array structure, the method including providing a first antenna array including a phased array which is configured to be operatively coupled to one or more radio frequency integrated circuits; arranging a second antenna array including a plurality of switched beam antenna array elements around the first antenna array, wherein the plurality of switched beam antenna array elements are divided into one or more subsets of switched beam antenna array elements; and connecting each of subsets of switched beam antenna array elements to a respective switch of one or more switches, wherein the one or more switches are configured to provide an interface between a respective subset of the one or more subsets of switched beam antenna array elements and the one or more radio frequency circuits.

Example 62 is an automotive lighting assembly cover including one or more translucent areas, the cover having a first side configured to face internally and a second side opposite to the first side and configured to face an external environment; and one or more antenna elements, wherein a portion of at least one of the one or more antennas elements are integrated within or are located against a portion of the cover.

Example 63 is the automotive lighting assembly cover of Example 62, further including one or more patterned grooves, wherein at least one of the one or more antenna elements are respectively disposed within the one or more grooves.

Example 64 is the lighting assembly of Example 63, wherein the one or more grooves of the front cover are located in an illuminated or high-radiant area of the cover.

Example 65 is the automotive lighting assembly cover of any of Examples 62 to 64, wherein one or portions of the one or more antenna elements are completely embedded within the front cover.

Example 66 is the automotive lighting assembly cover of any of Examples 62 to 65, wherein the one or more antenna elements at least partially protrude from within the first side of the cover.

Example 67 is the automotive lighting assembly cover of any of Examples 62 to 66, the cover further including a mesh area configured to reflect and diffuse light.

Example 68 is the automotive lighting assembly cover of Example 67, wherein at least a portion of the one or more antenna elements are located against at the front side of the cover behind the mesh area.

Example 69 is the automotive lighting assembly cover of Example 67 or 68, wherein the mesh is a conducting structure configured as a patch antenna so that one of the one or more antenna elements is the patch mesh.

Example 70 is the automotive lighting assembly cover of any of Examples 62 to 69, wherein the one or more antenna elements include an antenna array.

Example 71 is the automotive lighting assembly cover of any of Examples 62 to 70, wherein the one or more antenna elements are transparent or semi-transparent.

Example 72 is the automotive lighting assembly cover of any of Examples 62 to 71, wherein at least a portion of the one or more antennas elements are located behind in at least one dark region or non-illuminated region of the cover.

Example 73 is the automotive lighting assembly cover of any of Examples 62 to 72, wherein the cover includes at least one bending region including a vertex or corner, wherein at least one of the one or more antenna elements is disposed in and along a portion of the corner of the bent region.

Example 74 is the automotive lighting assembly cover of Example 73, wherein the at least one of the one or more antenna elements is disposed in and along at least a portion of the corner of the bending region includes a wire monopole antenna.

Example 75 is the automotive lighting assembly cover of any of Examples 62 to 74, wherein the cover includes an antenna radome.

Example 76 is the automotive lighting assembly cover of any of Examples 62 to 75, wherein the cover includes an RF waveguide.

Example 77 is the automotive light assembly cover of any of Examples 62 to 76, wherein the cover a one or plurality of front faces.

Example 78 is an automotive lighting assembly including a housing structure; one or more antenna elements, wherein at least a portion of at least one of the one or more antennas elements are integrated within or are located immediately adjacent to the housing structure.

Example 79 is the automotive lighting assembly of Example 78, the housing structure further including: a front cover including one or more translucent areas, the front cover having a first side configured to face internally and a second side opposite to the first side configured to face an external environment, wherein a portion of at least one of one or more antenna elements are integrated within or are located against the first side of the front cover.

Example 80 is the automotive lighting assembly of Example 79, the front cover including a conducting mesh area configured to reflect and diffuse light, wherein the mesh area is a patch antenna, and wherein one of the one or more antenna elements includes the patch antenna.

Example 81 is the automotive lighting assembly of any of Examples 78 to 80, further including an optical reflector configured as antenna, wherein the optical reflector is disposed within the housing structure.

Example 82 is the automotive lighting assembly of any of Examples 78 to 81, the housing structure further including a top housing member, the top housing member including at least one of one or more antenna elements.

Example 83 is the automotive lighting assembly of Example 82, wherein the at least of the one or more antenna elements of the top housing member includes an antenna array.

Example 84 is the automotive lighting assembly of Example 83, wherein the antenna array of the top housing member includes an end-launch antenna array.

Example 85 is the automotive lighting assembly of any of Examples 78 to 84, the housing structure including one or more side walls, the one or more sidewalls configured to reflect optical light and/or electromagnetic waves.

Example 86 is the automotive lighting assembly of any of Examples 78 to 85, the housing structure further including a bottom housing member, the bottom housing member including at least one of the one or more antenna elements.

Example 87 is the automotive lighting assembly of Example 86, wherein the at least one of the one or more antenna elements of the bottom housing member includes an antenna array.

Example 88 is the automotive lighting assembly of Example 87, wherein the antenna array of the bottom housing member includes an end-launch antenna.

Example 89 is the automotive lighting assembly of any of Examples 78 to 88, the lighting assembly further including a radio module including RF circuitry, the radio module connected to the one or more antenna elements.

Example 90 is the automotive lighting assembly of any of Examples 78 to 89, the lighting assembly further including a lighting source disposed within the housing structure.

Example 91 is the automotive lighting assembly of any of Examples 78 to 90, wherein the housing structure is a housing structure of a tail light.

Example 92 is the automotive lighting assembly of any of Examples 78 to 90, wherein the housing structure is a housing structure of a headlight.

Example 93 is the automotive lighting assembly of any of Examples 78 to 90, wherein the housing structure is a housing structure of a side light.

Example 94 is an automotive lighting structure including one or more microwave cavity radiator structures, each configured to transmit optical light and RF signals; and one or more light sources disposed within each of the one or more microwave cavity radiators.

Example 95 is the lighting structure of Example 94, further including at least one RF and/or light control circuitry disposed over the microwave cavity radiator structure.

Example 96 is the lighting structure of Example 94 or 95, wherein each of the one or more microwave cavity radiators structure further includes: a substrate, a top conducting plate arranged vertically over the substrate and a bottom conducting plate arranged vertically below the substrate, and one or more radiating faces for optical light and RF signals, the radiating faces located at a lateral periphery of the substrate.

Example 97 is the lighting structure of Example 96, wherein the substrate of at least one of the or more microwave cavity radiator structures includes a low-loss dielectric substrate.

Example 98 is the lighting structure of Example 96, wherein the substrate of at least one of the or more microwave cavity radiator structures includes a vacuum.

Example 99 is the lighting structure of any of Examples 96 to 98, wherein the substrate of the microwave cavity radiator structures includes a plurality of cavities.

Example 100 is the light assembly and communication structure of Example 99, wherein the plurality of cavities is arranged or aligned laterally.

Example 101 is the light assembly and communication structure of Example 99 or 100, wherein the cavities are separated by vertical via walls.

Example 102 is light assembly and communication structure of any of Examples 94 to 101, further including a first conducting sheet disposed over a top surface of the microwave cavity radiator structure and a second conducting sheet disposed over a bottom surface of the microwave cavity radiator structure.

Example 103 is the light assembly and communication structure of any of Examples 94 to 102, wherein the lighting sources include or are LEDs.

Example 104 is an automotive lighting and communication structure including a plurality of microwave cavity radiator structures configured to transmit optical light and RF signals, each of the plurality of microwave cavity radiator structures including one or more light sources disposed therein; wherein the plurality of microwave cavity radiator structures is arranged vertically; one or more optical reflectors, each of the one or more optical reflectors arranged between a pair vertically adjacent microwave cavity radiator structures of the plurality of microwave cavity radiator structures, wherein each of the one or more optical reflectors is configured as an antenna; and a translucent front cover extending between a topmost one of the microwave plurality of microwave cavity radiator structures and bottommost one of the plurality of microwave cavity radiator structure.

Example 105 is the integrated lighting and communication structure of Example 104, wherein the front cover includes one or more antenna elements integrated therein.

Example 106 is the integrated lighting and communication structure of Example 105, wherein the one or more antenna elements are concealed or partially concealed by the front cover from an external perspective.

Example 107 is the integrated lighting and communication structure of Example 105 or 106, wherein the one or more antenna elements are at least partially disposed within or against the front cover.

Example 108 is the integrated lighting and communication structure of any of Examples 105 to 107, wherein each of the one or more antennas elements of the front cover include one or more thin conducting strips.

Example 109 is the integrated lighting and communication structure of any of Examples 104 to 108, wherein the one or more optical reflectors include one or more metallized optical cavities.

Example 110 is the integrated lighting and communication structure of any of Examples 104 to 109, further including an RF circuitry module arranged over at least one of the plurality of microwave cavity radiator structures, the RF circuitry module connected to at least one of the one or more antenna elements.

Example 111 is the integrated lighting and communication structure of Example 110, wherein the one or more optical reflectors are directly connected to the RF circuitry module.

Example 112 is the integrated lighting and communication structure of any of Examples 104 to 111, further including one or more RF interconnects, each of the one or more RF interconnects respectively extending between a pair vertically adjacent microwave cavity radiator structures of the plurality of microwave cavity radiator structures.

Example 113 is an automotive wireless communication system for a vehicle, the system including one or more vehicular lighting and communication assemblies, each lighting and communication assembly comprising a radio subsystem integrated therein, the radio subsystem including RF circuitry and one or more antenna elements; an interconnect bus configured to be disposed within the vehicle and configured to connect to each radio subsystem of the one or more lighting and communication assemblies.

Example 114 is the vehicular wireless communication system of Example 114, further including a centralized radio control system including at least one processor and configured to control the at least the RF circuitry of each radio subsystem of the one or more vehicular lighting and communication assemblies, the centralized radio control system to each of the one or more vehicular lighting and communication assemblies through the interconnect bus.

Example 115 is the vehicular wireless communication system of Example 113 or 114, wherein at least one of the one or more vehicular lighting and communication assemblies includes a side light assembly.

Example 116 is the vehicular wireless communication system of any of Examples 113 to 115, wherein at least one of the one or more vehicular lighting and communication assemblies includes a headlight assembly.

Example 117 is the vehicular wireless communication system of any of Examples 113 to 116, wherein at least one of the one or more vehicular lighting and communication assemblies includes a stop light assembly.

Example 118 is the vehicular wireless communication system of any of Examples 113 to 117, wherein at least one of the one or more vehicular lighting and communication assemblies includes a tail light assembly.

Example 119 is the vehicular wireless communication system of any of Examples 113 to 118, wherein at least one of the one or more vehicular lighting and communication assemblies includes: a housing structure; and at least one of the one or more antennas elements integrated within or are located adjacent to the housing structure.

Example 120 is the vehicular wireless communication system of Example 119, the housing structure further including: a front cover comprising one or more translucent areas, the front cover having a first side configured to face internally and a second side opposite to the first side and configured to face an external environment, wherein a portion of the at least one of one or more antenna elements are embedded within or are located against a portion of the first side of the front cover.

Example 121 is the vehicular wireless communication system of Example 120, the front cover including a conducting mesh area configured to reflect and diffuse light, wherein the mesh area is a patch antenna, and wherein one of the one or more antenna elements includes the patch antenna.

Example 122, is the vehicular wireless communication system of any of Examples 119 to 121, wherein at least one of the one or more vehicular lighting and communication assemblies further includes an optical reflector configured as antenna, wherein the optical reflector is disposed within the housing structure.

Example 123 is the vehicular wireless communication system of any of Examples 119 to 122, the housing structure further including a top housing member, the top housing member including at least one of one or more antenna elements.

Example 124 is the vehicular wireless communication system of Example 123, wherein the at least of the one or more antenna elements of the top housing member comprises an antenna array.

Example 125 is the vehicular wireless communication system of Example 124, wherein the antenna array of the top housing member comprises an end-launch antenna array.

Example 126 is the vehicular wireless communication system of any of Examples 119 to 125, the housing structure including one or more side walls, the one or more backwalls configured to reflect at least optical light.

Example 127 is the vehicular wireless communication system of any of Examples 119 to 126, the housing structure further including a bottom housing member, the bottom housing member including at least one of the one or more antenna elements.

Example 128 is the vehicular wireless communication system of Example 127, wherein the at least one of the one or more antenna elements of the bottom housing member includes an antenna array.

Example 129 is the vehicular wireless communication system of Example 128, wherein the antenna array of the bottom housing member includes an end-launch antenna.

Example 130 is an automotive lighting assembly structure including a metallic component including an exposed surface at least partially facing externally, wherein the metallic component is configured as one or more antenna elements.

Example 131 is the lighting assembly of Example 130, wherein the metallic component includes an optical reflector configured as at least one antenna element.

Example 132 is the lighting assembly of Example 130 or 131, wherein the exposed surface is border between at least two subsections of the metallic component.

Example 133 is a vehicle antenna system. The vehicle antenna system may include a first antenna system configured to operate in a first frequency range provided on a portion of the vehicle, and a second antenna system configured to operate in a second frequency range provided on the portion of the vehicle, wherein the first frequency range and the second frequency range do not overlap.

In Example 134, the subject-matter of Example 133, can optionally include wherein the first antenna system includes at least one antenna element provided in a central location on the portion of the vehicle, wherein the second antenna system includes a plurality of antenna elements provided in peripheral locations on the portion of the vehicle.

In Example 135, the subject-matter of Example 134, can optionally include wherein the first antenna system further includes an integrated circuit provided in the central location and wherein the second antenna system further includes an integrated circuit provided in the central location.

In Example 136, the subject-matter of Example 135, can optionally include wherein the at least one antenna element of the first antenna system is provided on a PCB and wherein the plurality of antenna elements of the second antenna system are not provided on the PCB but are electrically coupled to the PCB.

In Example 137, the subject-matter of Example 135, can optionally include wherein the first antenna system is configured to operate in a frequency band greater than 10 GHz and the second antenna system is configured to operate in a frequency band less than 10 GHz.

In Example 138, the subject-matter of Example 135, can optionally include wherein the first antenna system includes plurality of omnidirectional antenna elements and the second antenna system includes a plurality of directional antenna elements.

In Example 139, the subject-matter of Example 138, can optionally include wherein the first antenna system is configured to provide full hemispherical coverage and the second antenna system is configured to provide circumferential coverage.

In Example 140, the subject-matter of Example 135, can optionally include wherein the first antenna system and the second antenna system share a common heat sink.

In Example 141, the subject-matter of Example 135, can optionally include wherein the first antenna system includes a phased array antenna element and a switched-beam antenna element.

In Example 142, the subject-matter of Example 135, can optionally include wherein the portion of the vehicle is a roof of the vehicle, a front bumper of the vehicle, or a rear bumper of the vehicle.

In Example 143, the subject-matter of Example 135, can optionally include wherein the first antenna system and the second antenna system are embedded into the portion of the vehicle In Example 144, the subject-matter of Example 135, can optionally include wherein the first antenna system and the second antenna system share a common backend interface.

In Example 145, the subject-matter of Example 144, can optionally include a universal bus, wherein the first antenna system and the second antenna system are coupled to the universal bus via the common backend interface.

It should be noted that one or more of the features of any of the examples above may be combined with any one of the other examples.

The foregoing description has been given by way of example only and it will be appreciated by those skilled in the art that modifications may be made without departing from the broader spirit or scope of the invention as set forth in the claims. The specification and drawings are therefore to be regarded in an illustrative sense rather than a restrictive sense.

The scope of the disclosure is thus indicated by the appended claims and all changes which come within the meaning and range of equivalency of the claims are therefore intended to be embraced.

What is claimed is:

1. A retro-directive antenna array system for wireless communications comprising:

an antenna array comprising one or more antenna elements;

a negative refractive-index engineered material (NIM) deposited over at least one of the one or more antenna elements; and a controller configured to control a switch configured to connect the one or more antenna elements to a transmission path and to a reception path, wherein the NIM has a tunable surface configured to be adjusted by the controller via application of a stimulus into a negative refraction mode when the one or more antenna elements are connected to the reception path and to be adjusted into a positive refraction mode when the one or more antenna elements are connected to the transmission path.

2. The retro-directive antenna array system of claim 1, wherein the antenna array does not include a harmonic or subharmonic mixer to conjugate phases of signals received by the retro-directive antenna array system with signals to be transmitted from the retro-directive antenna array system.

3. The retro-directive antenna array system of claim 1, wherein the NIM is deposited over at least one of the one or more antenna elements so that signal received by the retro-directive antenna array system passes through the NIM prior to being received by the antenna array.

4. The retro-directive antenna array system of claim 1, wherein the antenna array comprises a dual-polarized antenna with a first polarity in a reception direction for signals received by the retro-directive antenna array system and a second polarity in a transmission direction for signals transmitted from the retro-directive antenna array system, wherein the first polarity and the second polarity are different.

5. The retro-directive antenna array system for wireless communications of claim 1, wherein the NIM has a permittivity of about −1 and a permeability of about −1.

6. The retro-directive antenna array system for wireless communications of claim 1, further comprising a retro-directive antenna array circuitry operatively coupled to the antenna array.

7. The retro-directive antenna array system for wireless communications of claim 6, wherein the antenna array does not include phase conjugation circuitry configured to conjugate to perform phase conjugation of signals received by the retro-directive antenna array system.

8. The retro-directive antenna array system for wireless communications of claim 1, wherein the antenna array does not include a frequency mixer to conjugate phases of signals received by the retro-directive antenna array system with signals to be transmitted from the retro-directive antenna array system.

9. The retro-directive antenna array system for wireless communications of claim 1, wherein the NIM negatively refracts signals and provides the negatively refracted signals to the antenna array.

10. The retro-directive antenna array system for wireless communications of claim 1, wherein for a signal hitting the NIM at a first angle of θ degrees, the first angle is defined with respect to an axis in a direction orthogonal to a surface of the NIM, the NIM is configured to invert a received angle of the signal to be about −θ degrees as the signal passes through the NIM.

11. The retro-directive antenna array system for wireless communications of claim 1, wherein the antenna array includes a first subset of antenna elements for reception and a second subset of antenna elements for transmission, wherein the NIM is deposited over the first subset of antenna elements.

12. The retro-directive antenna array system for wireless communications of claim 11, wherein the NIM is deposited only over the first subset of antenna elements and not over the second subset of antenna elements.

13. The retro-directive antenna array system for wireless communications of claim 1, wherein the NIM is aligned with the antenna array so that only signals received by the retro-directive antenna array system are negatively refracted by the NIM.

14. The retro-directive antenna array system for wireless communications of claim 13, wherein only phases of the signals received by the retro-directive antenna array system are reversed and phases of the signals transmitted from the retro-directive antenna array system remain are not reversed.

15. The retro-directive antenna array system for wireless communications of claim 1, wherein the stimulus is at least one of an electric stimulus or a magnetic stimulus.

16. The retro-directive antenna array system of claim 1, further comprising:

a second negative refractive-index engineered material deposited over at least a second one of the one or more antenna elements, wherein the NIM is a first negative refractive-index engineered material, and wherein the first negative refractive-index engineered material and the second negative refractive-index engineered material have substantially different refraction properties.

17. The retro-directive antenna array system of claim 1, further comprising:

a second negative refractive-index engineered material deposited over a second one of the one or more antenna elements; and a signal distribution network configured to distribute signals between the one or more antenna elements, wherein the NIM is a first negative refractive-index engineered material, wherein the first negative refractive-index engineered material and the second negative refractive-index engineered material have substantially similar adjustable refraction properties, and wherein the signal distribution network comprises an equi-phase transmission line configured to match a signal phase between the at least one of the one or more antenna elements and the second one of the one or more antenna elements.

18. The retro-directive antenna array system of claim 17, wherein the equi-phase transmission line comprises an electrically length matched line.

19. A retro-directive antenna array system for wireless communications comprising:

an antenna array comprising one or more antenna elements;

a negative refractive-index engineered material (NIM) deposited over at least one of the one or more antenna elements; and a controller configured to control a switch that is configured to connect the one or more antenna elements to a transmission path and to a reception path, wherein the antenna elements comprise a dual-polarized antenna with a first polarity in a reception direction for signals received by the retro-directive antenna array system and a second polarity in a transmission direction for signals transmitted from the retro-directive antenna array system, wherein the first polarity and the second polarity are different, and wherein the NIM has a tunable surface configured to be adjusted, via application of a stimulus, into a negative refraction mode when a current polarity of the dual-polarized antenna is in the reception direction and to be adjusted into a positive refraction mode when the when the current polarity of the dual-polarized antenna in the transmission direction.

20. The retro-directive antenna array system of claim 1, wherein the tunable surface is configured to phase conjugate a received signal when in the negative refraction mode.

* * * * *